United States Patent [19]

Ito et al.

[11] Patent Number: 5,276,624
[45] Date of Patent: Jan. 4, 1994

[54] TURNING CONTROL APPARATUS FOR VEHICLE

[75] Inventors: Masayoshi Ito, Okazaki; Kiichi Yamada, Nagoya; Hiroaki Yoshida, Okazaki; Katsunori Otake, Nagoya; Yasunobu Miyata, Komaki; Masayuki Hashiguchi, Obu; Masanori Tani, Okazaki; Keiji Isoda, Nagoya; Toshio Shigehara, Okazaki; Hiroo Yuasa, Nagoya; Tadao Tanaka; Masayoshi Osaki, both of Okazaki; Hiroshi Yoshida, Toyokawa, all of Japan

[73] Assignee: Mitsubishi Jidosha Kogyo Kabushiki Kaisha, Tokyo, Japan

[21] Appl. No.: 980,425

[22] Filed: Nov. 23, 1992

Related U.S. Application Data

[63] Continuation of Ser. No. 645,961, Jan. 25, 1991, abandoned.

[30] Foreign Application Priority Data

| Jan. 25, 1990 | [JP] | Japan | 2-13553 |
| Jan. 30, 1990 | [JP] | Japan | 2-17821 |
| Jan. 30, 1990 | [JP] | Japan | 2-17823 |
| Jan. 30, 1990 | [JP] | Japan | 2-17825 |
| Jan. 30, 1990 | [JP] | Japan | 2-17831 |
| Jan. 30, 1990 | [JP] | Japan | 2-17835 |
| Jan. 30, 1990 | [JP] | Japan | 2-17836 |
| May 16, 1990 | [JP] | Japan | 2-124275 |
| May 16, 1990 | [JP] | Japan | 2-124277 |
| May 16, 1990 | [JP] | Japan | 2-124283 |
| May 16, 1990 | [JP] | Japan | 2-124286 |
| May 16, 1990 | [JP] | Japan | 2-124287 |
| May 16, 1990 | [JP] | Japan | 2-124293 |
| May 18, 1990 | [JP] | Japan | 2-127019 |

[51] Int. Cl.$^5$ .............................. B60K 28/10
[52] U.S. Cl. .............. 364/424.05; 180/282; 364/426.01
[58] Field of Search ............ 364/424.05, 426.01, 364/426.02, 426.03; 180/197, 282

[56] References Cited

U.S. PATENT DOCUMENTS

| 4,763,262 | 8/1988 | Leiber | 364/426.03 |
| 4,933,856 | 6/1990 | Leiber | 364/426.01 |
| 4,933,857 | 6/1990 | Hashiguchi et al. | 364/426.02 |
| 4,946,015 | 8/1990 | Browalski et al. | 364/426.03 X |
| 4,985,838 | 1/1991 | Hashiguchi et al. | 364/426.02 |
| 5,041,978 | 8/1991 | Nakayama et al. | 364/426.03 |
| 5,051,908 | 9/1991 | Shiraishi | 364/426.02 |

FOREIGN PATENT DOCUMENTS

0338588A2 10/1989 European Pat. Off. .

*Primary Examiner*—Thomas G. Black
*Assistant Examiner*—Collin W. Park

[57] ABSTRACT

In a turning control apparatus for a vehicle, a torque calculation unit calculates a target lateral acceleration of the vehicle according to detection signals from a steering angle sensor for detecting the direction of a steering wheel and a vehicle speed sensor for detecting the speed of the vehicle. It then sets target driving torque of the engine according to the target lateral acceleration. An electronic control unit controls the operation of a torque control device for reducing driving of the engine so that the driving torque of the engine is a target driving torque independent of manipulation by the driver. This thereby rapidly estimates lateral acceleration applied to the vehicle during turning and prevents control delay to enable stable and positive traveling through a curved road.

36 Claims, 43 Drawing Sheets

| Speed | ρ<sub>KI</sub> | ρ<sub>KP</sub> | ρ<sub>T</sub> |
|---|---|---|---|
| 1st speed | 1.0 | 1.0 | 1.0 |
| 2nd speed | 0.7 | 0.7 | 1.5 |
| 3rd speed | 0.7 | 0.7 | 1.5 |
| 4th speed | 0.7 | 0.7 | 1.5 |
| Reverse | 1.0 | 1.0 | 1.0 |

TURNING CONTROL APPARATUS FOR VEHICLE

This application is a continuation, of application Ser. No. 07/645,961 filed on Jan. 25, 1991, now abandoned.

Background of the Invention

This invention relates to a turning control apparatus for vehicle which rapidly reduces driving torque of an engine according a lateral acceleration generated during turning of the vehicle, thereby achieving easy and safe turning operation.

In a vehicle traveling along a curve, a centrifugal force generates according to a lateral acceleration in a direction perpendicular to the longitudinal direction of the vehicle. Further, if the traveling speed is too high relative to the curvature of the path, gripping force of the tires tends to become excessive and the vehicle tends to begin a lateral skid.

In a case, it is difficult to adequately reduce the output of an engine in order to safely run the vehicle along a curvature radius according to the curved road, especially when the exit of the curved road cannot be confirmed, or, when the curvature radius of the road gradually decreases, thereby requiring a highly skilled driving technique.

In a conventional vehicle which has a so-called under-steering tendency, it is necessary to gradually increase the amount of steering according to the lateral acceleration applied to the vehicle. When the lateral acceleration exceeds a value specific to the individual vehicle, safe travel along a curved road tends to become difficult or impossible, even by rapidly increasing the steering amount. In particular, as is well known, this tendency is remarkable for a front-engine front-wheel-drive type vehicle which has a marked under-steering tendency.

To prevent this, an output control apparatus can be used which detects the lateral acceleration of the vehicle and, before a turning limit is reached, where the vehicle becomes difficult or impossible to turn, forcibly reduces the output of the engine independent of the amount of pressure applied to an acceleration pedal by the driver. Further, an apparatus is proposed which allows selection of a running mode using the output control apparatus or a normal running mode, in which the output of the engine is controlled according to the amount of pressure applied to the accelerator pedal, selectable by the driver as necessary.

As an output control method according to this concept, an apparatus is known which controls the output of the engine according to, for example, the yaw rate of the vehicle.

Since yawing and the like, which occur mainly during high-speed turning of the vehicle, tend to rapidly increase as the vehicle speed becomes higher and the turning becomes sharper, driving torque of the engine is reduced when a yaw rate is detected by a vibration sensor or an acceleration sensor, or when these values exceed predetermined values.

With this output control apparatus, it is also possible to suppress skidding of driving wheels during the increasing of vehicle speed or reducing shocks during a speed shift by an automatic transmission.

In a known turning control apparatus which controls driving torque of the engine according to yawing rate or the like of the vehicle during turning, since the yaw rate or the like of the vehicle is detected by a vibration sensor or an acceleration sensor, driving torque of the engine cannot be controlled unless yaw rate or the like of the vehicle is actually generated.

Therefore, such a vehicle incorporating the known turning control apparatus inevitably involves a control delay. Therefore, it is sometimes impossible to safely and positively pass through a curved road while suppressing the lateral acceleration and maintaining the attitude of the vehicle.

OBJECT OF THE INVENTION

With a view toward obviating the defects of the known turning control apparatus, it is a first object of the present invention to provide a turning control apparatus for a vehicle which involves no control delay, operated by rapidly estimating a lateral acceleration generated during turning of the vehicle.

A second object of the present invention is to provide a turning control apparatus for a vehicle which allows a safe and positive turning operation of the vehicle which does not inhibit much of the driver's intention but does adequately maintaining the attitude of the vehicle.

A third object of the present invention is to provide a turning control apparatus for a vehicle which can set an adequate target driving torque which considers a road-load torque, a cornering drag, or the like.

A fourth object of the present invention is to provide a turning control apparatus for a vehicle which has a good drive feeling during turning, achieved by regulating changes in driving torque of the engine to reduce or eliminate speed change shocks occurring during turning control.

These and other objects of the present invention will become more readily apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

SUMMARY OF THE INVENTION

In general, when a running vehicle is entering a curved road at a high speed, the driver begins turning prior to reducing the engine to a lower speed. Naturally, changes in steering vary with time, that is, a rotation angular velocity of the steering shaft is greater when entering a curved road at a high speed than when entering a curved road at a low speed. In other words, the driver always forecasts traveling condition in advance and makes faster steering manipulation when turning a vehicle traveling at a high speed than when turning a vehicle traveling at a low speed.

Therefore, it is considered that the greater the rotational angular velocity of the steering shaft at initial turning of the vehicle, the greater the lateral acceleration of the vehicle generated during turning. The inventors have conducted various studies on the relationship between a magnitude of steering shaft rotational angular velocity at initial turning of the vehicle and a maximum value of lateral acceleration generated in the vehicle during turning, and found a correlationship as shown in FIG. 7.

The objects of the present invention, based on the above findings, are fulfilled by providing a first turning control apparatus for a vehicle comprising torque control means for reducing driving torque of an engine independent of manipulation by the driver, a steering angle sensor for detecting direction of a steering shaft, a vehicle speed sensor for detecting speed of the vehicle, a torque calculation unit for calculating target lateral acceleration of the vehicle according to detection signals from the steering angle sensor and the vehicle speed sensor and setting target driving torque of the vehicle according to the target lateral acceleration, and an electronic control unit for controlling operation of the torque control means so that driving torque of the engine is the target driving torque set by the torque calculation unit.

The objects are further fulfilled by providing, according to the present invention, a second turning control apparatus comprising torque control means for reducing driving torque of an engine independent of manipulation by the driver, a steering angle sensor for detecting direction of a steering shaft, a vehicle speed sensor for detecting speed of the vehicle, acceleration calculation means for calculating target lateral acceleration of the vehicle according to detection signals from the steering angle sensor and vehicle speed sensor and for calculating target longitudinal direction acceleration according to the target lateral acceleration, a torque calculation unit for setting target driving torque of the vehicle according to the target longitudinal direction acceleration, and an electronic control unit for controlling operation of the torque control means so that driving torque of the engine is target driving torque set by the torque calculation unit.

The objects are further fulfilled by providing, according to the present invention, a third turning control apparatus comprising torque means for reducing driving torque of an engine independent of manipulation by the driver, a steering angle sensor for detecting direction of a steering shaft, a pair of wheel speed sensors for detecting wheel speeds of right and left driven wheels, first lateral acceleration calculation means for calculating actual lateral acceleration applied to the vehicle according to detection signals from the pair of wheel speed sensors, second lateral acceleration calculation means for calculating target lateral acceleration of the vehicle according to detection signals from the steering angle sensor and the wheel speed sensors, friction coefficient estimation means for estimating friction coefficient of a road surface by comparing target lateral acceleration and actual lateral acceleration, a plurality of graphs representing relationship between the target lateral acceleration and target driving torque relative to friction coefficient of the road surface, torque calculation unit for selecting one of the plurality of graphs corresponding to estimation results of the friction coefficient estimation means from the plurality of graphs and setting target driving torque according to the target lateral acceleration, and an electronic control unit for controlling operation of the torque control means so that driving torque of the engine is the target driving torque set by the torque calculation unit.

The objects are further fulfilled by providing, according to the present invention, a fourth turning control apparatus comprising torque control means for reducing driving torque of an engine independent of manipulation by the driver, a steering angle sensor for detecting direction of a steering shaft, a pair of wheel speed sensors for detecting wheel speeds of right and left driven wheels, steering angle neutral position determination means for determining by learning a straightforward running condition of the vehicle according to detection signals from the pair of wheel speed sensors and the steering angle sensor, first lateral acceleration calculation means for calculating actual lateral acceleration applied to the vehicle according to detection signals from the pair of wheel speed sensors, second lateral acceleration calculation means for calculating target lateral acceleration of the vehicle according to detection signals from the steering angle sensor and the wheel speed sensors, torque calculation unit for setting target driving torque of the engine according to the lateral acceleration until a straightforward running condition of the vehicle is determined by the steering angle neutral position determination means and setting target driving torque of the vehicle according to the target lateral acceleration after a straightforward running condition of the vehicle is determined, and an electronic control unit for controlling operation of the torque control means so that driving torque of the engine is a target driving torque set by the torque calculation unit.

The torque control means for reducing the driving torque of the engine can be one which retards the ignition timings, one which reduces intake air amount or fuel supply, one which interrupts fuel supply, or, as a specific one, one which reduces the compression ratio of the engine.

When the vehicle enters a curved road, the driver begins steering control. At this time, the torque calculation unit forecast lateral acceleration applied to the vehicle during turning according to detection signals from the steering angle sensor and the vehicle speed sensor prior to turning of the vehicle, determine a target lateral acceleration according to which target driving torque of the engine is set. Further, the electronic control unit controls operation of the torque control means so that current driving of the engine is the target driving torque set by the torque calculation unit.

In the second turning control apparatus, the acceleration calculation means calculates target lateral acceleration and a target longitudinal direction acceleration according to this target lateral acceleration. Further, a target driving torque of the engine according to the target longitudinal direction is calculated by the torque calculation unit.

In the third turning control apparatus, the first lateral acceleration calculation means calculates actual lateral acceleration applied to the current vehicle according to detection signals from the pair of wheel speed sensors, the friction coefficient estimation means compares the target lateral acceleration with actual lateral acceleration to estimate the friction coefficient of the road surface, and the torque calculation unit selects a graph representing the relationship between target lateral acceleration and target driving torque according the estimated friction coefficient and sets a target driving torque according to the target lateral acceleration of the graph.

Furthermore, in the fourth turning control apparatus, the steering angle neutral position determination means determines by learning the straightforward running condition of the vehicle according to detection signals from the pair of wheel speed sensors and the steering angle sensor, and, until the straightforward running condition of the vehicle is determined by the steering angle neutral position determination means, the torque calculation unit sets a target driving torque of the engine according to lateral acceleration. After the straightforward running condition of the vehicle is determined by the steering angle neutral position determination means, it sets a target driving torque of the engine according the target lateral acceleration.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIGS. 21 to 24 are graphs showing the relationship between time after starting control and weighting factor.

DETAILED DESCRIPTION OF THE PREFERRED EMBODIMENTS

Figure 1:
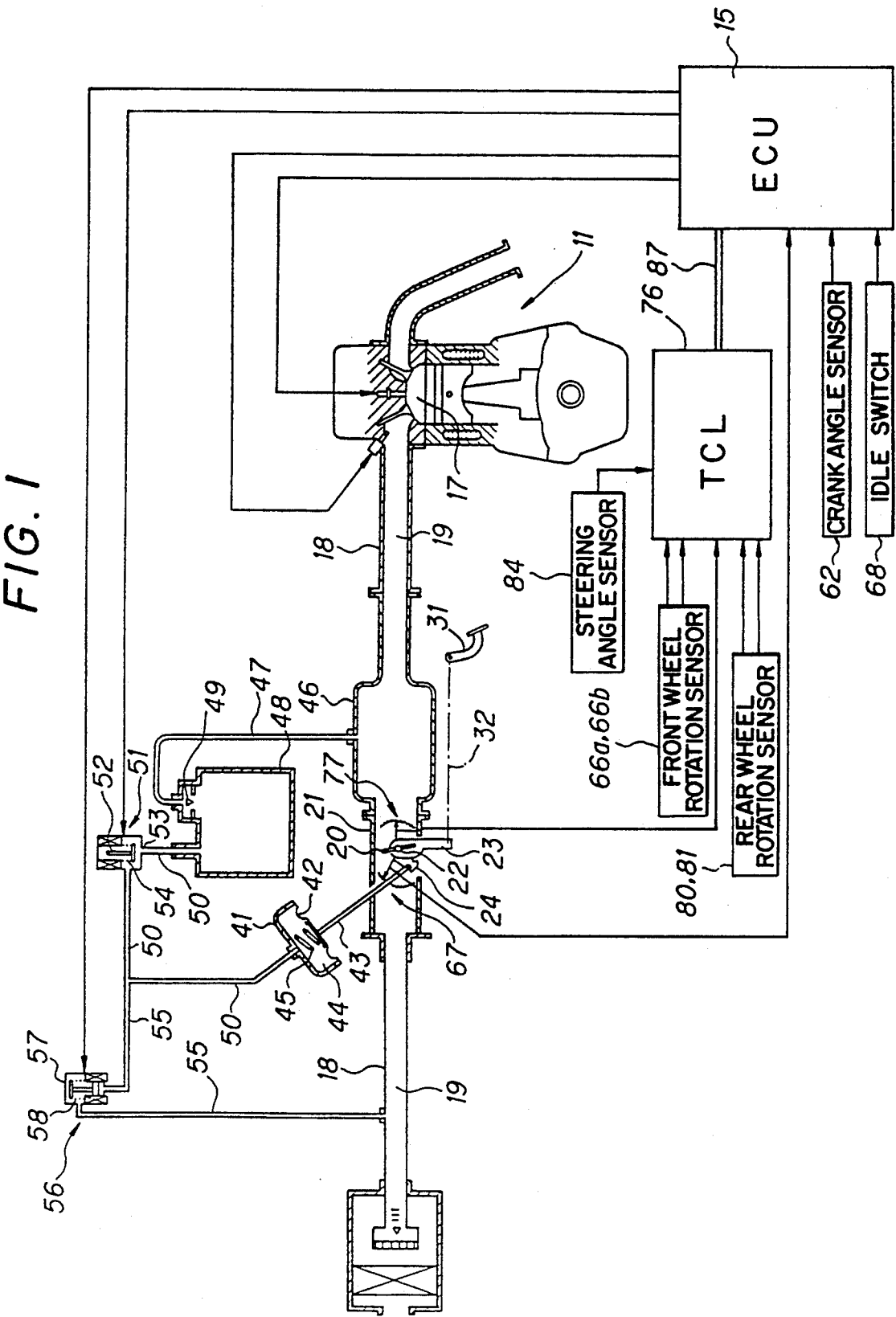
FIG. 1 is a schematic view showing an embodiment of a control system that enables the first turning control apparatus according to the present invention.
Figure 2:
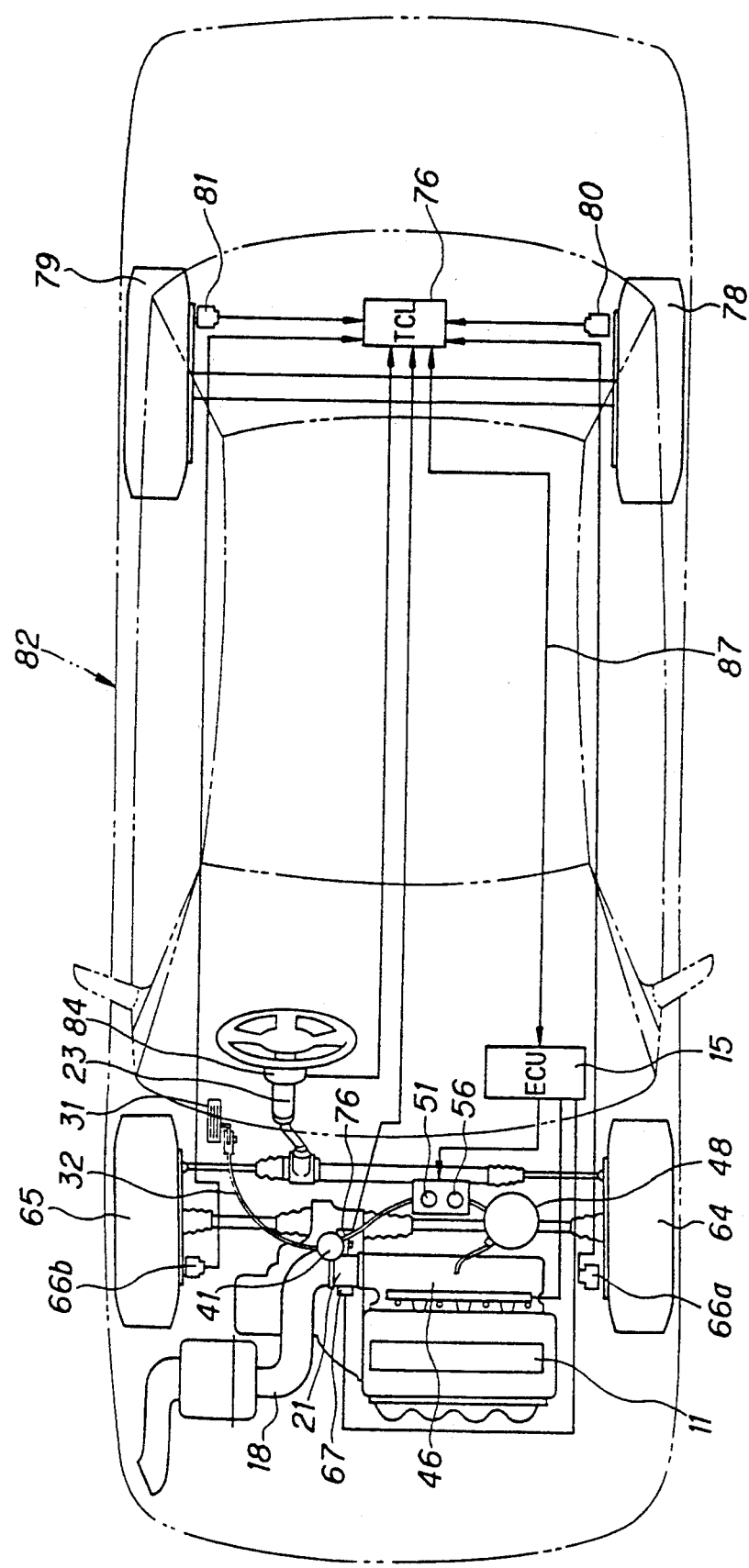
FIG. 2 is a schematic view of the first turning control apparatus.
Figure 3:
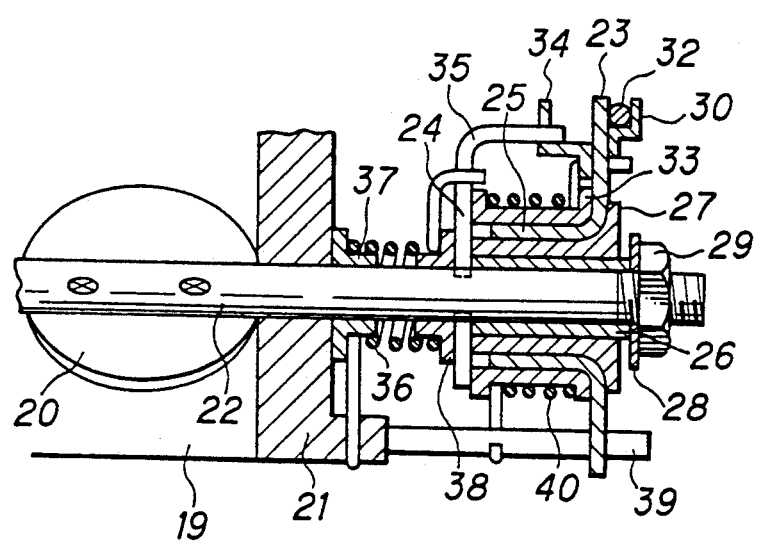
FIG. 3 is a schematic cross sectional view showing a drive mechanism of its throttle valve.

In the drawings and throughout the specification, like reference numerals indicate like elements. As shown in FIG. 1, which is a schematic view showing an embodiment in which the turning control apparatus according to the present invention is applied to a front-wheel-drive type vehicle, and FIG. 2 which is a schematic view of the vehicle, halfway through air intake pipe 18, connected to combustion chamber 17 of engine 11, is disposed throttle body 21 incorporating throttle valve 20. Throttle body 21, including throttle valve 20, varies the opening of air intake passage 19, formed by air intake pipe 18, and controls the amount of intake air supplied into combustion chamber 17. As shown in FIG. 1 and FIG. 3, FIG. 3 being a schematic enlarged view of the cross sectional structure of cylindrical throttle body 21, both ends of throttle shaft 22, integrally fixed within throttle valve 20, are rotatably supported on throttle body 21. One end of throttle shaft 22, protruding into air intake passage 19, is coaxially engaged with accelerator lever 23 and throttle lever 24.

Between throttle shaft 22 and the cylindrical portion 25 of accelerator lever 23, are disposed bushing 26 and spacer 27, whereby the accelerator lever 23 is rotatable with respect to the throttle shaft 22. Furthermore, with washer 28 and nut 29 mounted to one end of throttle shaft 22, accelerator lever 23 is prevented from coming out of throttle shaft 22. Moreover, cable receiver 30, which is integral with accelerator lever 23, is connected through cable 32 with accelerator pedal 31, which is operated by the driver, whereby accelerator lever 23 is rotated with respect to throttle shaft 22 according to the amount of pressure applied to accelerator pedal 31.

Throttle lever 24 is integrally mounted to throttle shaft 22. By operating throttle lever 24, throttle valve 20 is rotated with throttle shaft 22. Cylindrical portion 25 of the accelerator lever 23 is coaxially and integrally engaged with collar 33. At a front end of throttle lever 24 stopper 35 is formed, which can be stopped by claw 34 formed as part of collar 33. Claw 34 and stopper 35 are set to relative positions so that they are engaged with each other when throttle lever 24 is rotated in a direction to open throttle valve 20, or, when accelerator lever 23 is rotated in a direction to close throttle valve 20.

Between throttle body 21 and throttle lever 24 is disposed torsion coil spring 36 which pushes stopper 35 of throttle lever 24 against claw 34 of the accelerator lever 23. It urges throttle valve 20 in the opening direction, through a pair of cylindrical spring receivers 37 and 38 engaged with throttle shaft 22, coaxially with throttle shaft 22. Also, between stopper pin 39 protruding from throttle body 21 and accelerator lever 23 torsion coil spring 40 is disposed, which pushes claw 34 of accelerator lever 23 against stopper 35 of throttle lever 24 and urges throttle valve 20 in the closing direction. This creates a detent feeling to accelerator pedal 31, mounted to cylindrical portion 25 of accelerator lever 23 through collar 33 and coaxially with throttle shaft 22.

The front end of throttle lever 24 is connected to a front end of control bar 43 of which the rear end is mounted to diaphragm 42 of actuator 41. Pressure chamber 44 formed in actuator 41 is incorporated with compression coil spring 45 which, together with torsion coil spring 36, pushes stopper 35 of throttle lever 24 to claw 34 of accelerator lever 23 and urges throttle valve 20 in the opening direction. Further, the force of torsion coil spring 40 is set greater than the sum of the forces of two springs 36 and 45, whereby throttle valve 20 is not opened unless accelerator pedal 31 is pressed down, or pressure of pressure chamber 44 is caused to become a negative pressure greater than the sum of the forces of two springs 36 and 45.

Surge tank 46, connected at the downstream side of throttle body 21 and forming part of air intake passage 19, communicates with vacuum tank 48 through connection piping 47. Between vacuum tank 48 and connection piping 47 is disposed check valve 49 which allows air to move only from vacuum tank 48 to surge tank 46. This sets the pressure in vacuum tank 48 to a value nearly same as a minimum pressure of surge tank 46.

The vacuum tank 48 and pressure chamber 44 of actuator 41 communicate with each other through piping 50. A first torque control electromagnetic valve 51, which closes when unenergized, is provided halfway through piping 50. Thus, torque control electromagnetic valve 51 incorporates spring 54 which urges plunger 52 to valve seat 53 to close piping 50.

Piping 50 between first torque control electromagnetic valve 51 and actuator 41 is connected with piping 55 which communicates with air intake passage 19 at the upstream side of throttle valve 20. Second torque control electromagnetic valve 56, which opens when unenergized, is deposed halfway through piping 55. Thus, torque control electromagnetic valve 56 incorporates spring 58 which urges plunger 57 to open piping 55.

Two torque control electromagnetic valves 51 and 56 are individually connected to electronic control unit (hereinafter referred to as ECU) 15. Their ON/OFF operation is duty-controlled by instructions from ECU 15, forming a torque reduction means of the present invention.

For example, when the duty ratio of torque control electromagnetic valves 51 and 56 is 0%, the pressure of pressure chamber 44 of actuator 41 is that of atmospheric pressure, which is nearly same as the pressure in air intake passage 19 at the upstream side of throttle valve 20, and the opening of throttle valve 20 directly corresponds to the amount of pressure applied to the accelerator pedal 31. To the contrary, when the duty ratio of torque control electromagnetic valves 51 and 56 is 100%, pressure chamber 44 of actuator 41 becomes a negative pressure almost same as vacuum tank 48, control bar 43 is pulled up to the left, throttle valve 20 is closed independently of the amount of pressure applied to the accelerator pedal 31, and the driving torque of engine 11 is forcibly reduced. Thus, the duty ratio of torque control electromagnetic valves 51 and 56 can be controlled to vary the opening of throttle valve 20, independent of the amount of pressure applied to the accelerator pedal 31, and control the driving torque of engine 11.

ECU 15 is connected with crank angle sensor 62 mounted to engine 11 for detecting engine speed, throttle opening sensor 67 mounted to throttle body 21 for detecting the opening of throttle lever 24, and idle switch 68 for detecting a fully-closed condition of throttle valve 20. ECU 15 is supplied with output signals from crank angle sensor 62, throttle opening sensor 67, and idle switch 68.

To torque calculation unit (hereinafter referred to as "TCL") 76 for calculating target driving torque of engine 11, accelerator opening sensor 77 mounted to throttle body 21 with throttle opening sensor 67 and idle switch 68, front wheel rotation sensors 66a and 66b for individually detecting the rotation speed of a pair of front wheels 64 and 65 which are driving wheels, rear wheel rotation sensors 80 and 81 for individually detecting the rotation speeds of a pair of rear wheels 78 and 79 which are driven wheels, and steering angle sensor 84 for detecting the turning angle of steering shaft 83 during turning with respect to a straightforward running condition of vehicle 82 are connected. Further, output signals from these sensors 77, 66a, 66b, 80, 81, and 84 are individually transmitted.

ECU 15 and TCL 76 are connected through communication cable 87, and ECU 15 transmits operation condition information of engine 11 such as engine rotation speed, detection signal from idle switch 68, and intake air amount to TCL 76. Furthermore, TCL 76 transmits information about the target driving torque calculated by TCL 76 to ECU 15.

Figure 4:
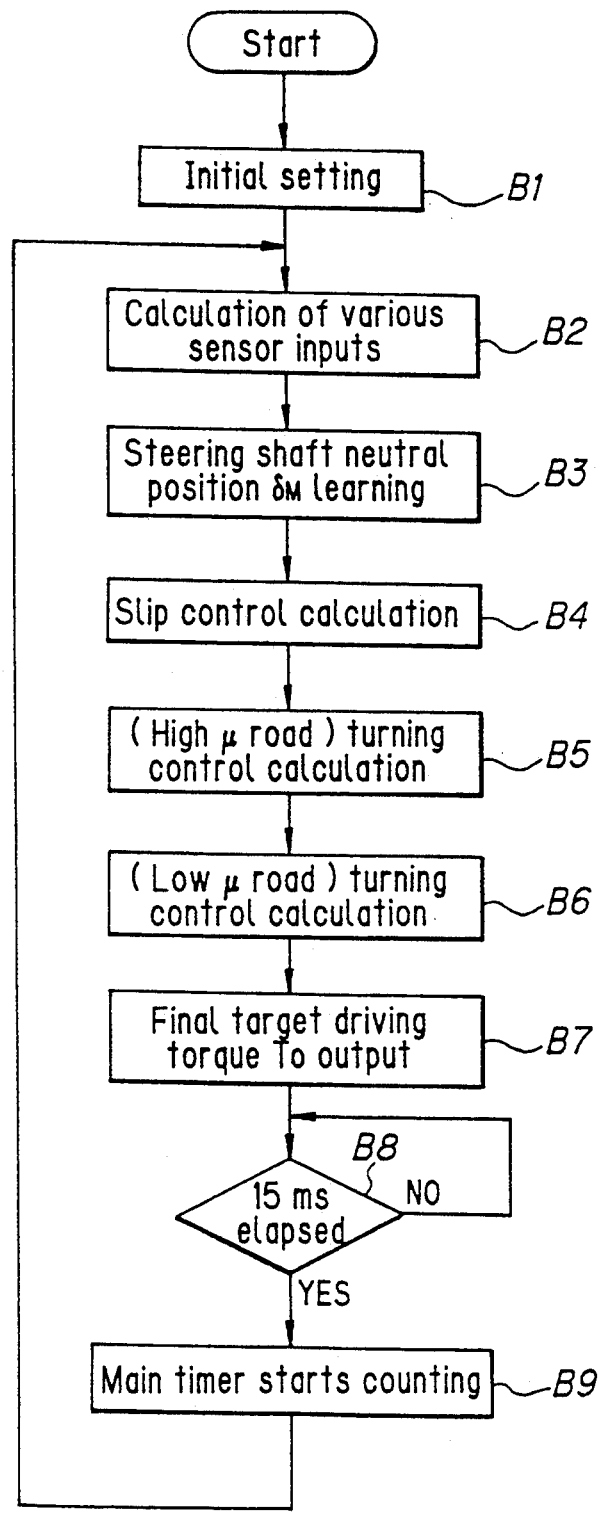
FIG. 4 is a flow chart showing the entire flow of control.

As shown in FIG. 4, showing a rough control flow of this embodiment, in this embodiment turning control is performed separately for a road surface with relatively high friction coefficient, such as a dry road, and for a road surface with relatively low friction coefficient, such as a frozen road or a wet road. Furthermore, in addition to the turning control, slip control to control slip amount of front wheels 64 and 65 during acceleration of vehicle 82 is also performed. Target driving torque $T_{OS}$ of engine 11 when slip control is performed, target driving torque $T_{OH}$ of engine 11 when turning control is performed on a road surface with a relatively high friction coefficient (hereinafter referred to as high $\mu$ road) such as a dry road, and target driving torque $T_{OL}$ of engine 11 when turning control is performed on a road surface with a relatively low friction coefficient (hereinafter referred to as low $\mu$ road) such as a frozen road or a wet road, are always calculated by TCL 76 in parallel. Further, the optimum final target driving torque $T_O$ is selected from these three target driving torques $T_{OS}$, $T_{OH}$, and $T_{OL}$ to reduce the driving torque of engine 11 as needed.

Specifically, the control program of this embodiment is started by turning on an ignition key switch (not shown), and initial settings such as the reading of initial value $\delta_{m(o)}$ of steering shaft turning position, the resetting of various flags, and the starting of counting of a main timer of every 15 milliseconds which is a sampling period of this control, are performed in B1.

In B2, TCL 76 calculates vehicle speed V and the like according to detection signals from various sensors, and then learns and corrects neutral position $\delta_M$ of steering shaft 83 in M3. Initial value $\delta_{m(o)}$ of neutral position $\delta_M$ of steering shaft 83 of vehicle 82 is read every time the ignition key is turned on, the initial value $\delta_{m(o)}$ is learning corrected only when vehicle 82 meets the straightforward running condition (described later). Further, the initial value $\delta_{m(o)}$ is learning corrected until the ignition key is turned off.

Then, in B4, TCL 76 calculates target driving torque $T_{OS}$ when slip control is performed, to regulate the driving torque of engine 11 according to a difference in rotation between front wheels 64 and 65 and rear wheels 78 and 79. In B5, TCL 76 calculates target driving torque $T_{OH}$ of engine 11 when turning control is performed on a high $\mu$ road. In B6, TCL 76 calculates target driving torque $T_{OL}$ of engine 11 when turning control is performed on a low $\mu$ road.

Subsequently, in B7, TCL 76 selects the optimum final target driving torque $T_O$ from target driving torques $T_{OS}$, $T_{OH}$, and $T_{OL}$ by a method which will be described later, and ECU 15 controls the duty ratio of a pair of torque control electromagnetic valves 51 and 56 so that the driving torque of engine 11 is the final target driving torque $T_O$, thereby achieving the safe running of vehicle 82.

Thus, in B8, the driving torque of engine 11 is controlled until counting down of every 15 seconds of the main timer is completed. Thereafter, counting down of the main timer is restarted in B9, and steps from B2 to B9 are repeated until the ignition key is turned off.

The reason why neutral position $\delta_M$ of steering shaft 83 is learned and corrected in step B3 is that the neutral position of steering shaft 83 may vary due to toe-in adjustment of front wheels 64 and 65 during setting up of vehicle 82 or the abrasion of a steering gear (not shown) over time. A difference may occur between the turning amount of steering shaft 83 and the actual steering angle $\delta$ of the front wheels 64 and 65, which are steering wheels.

Figure 5:
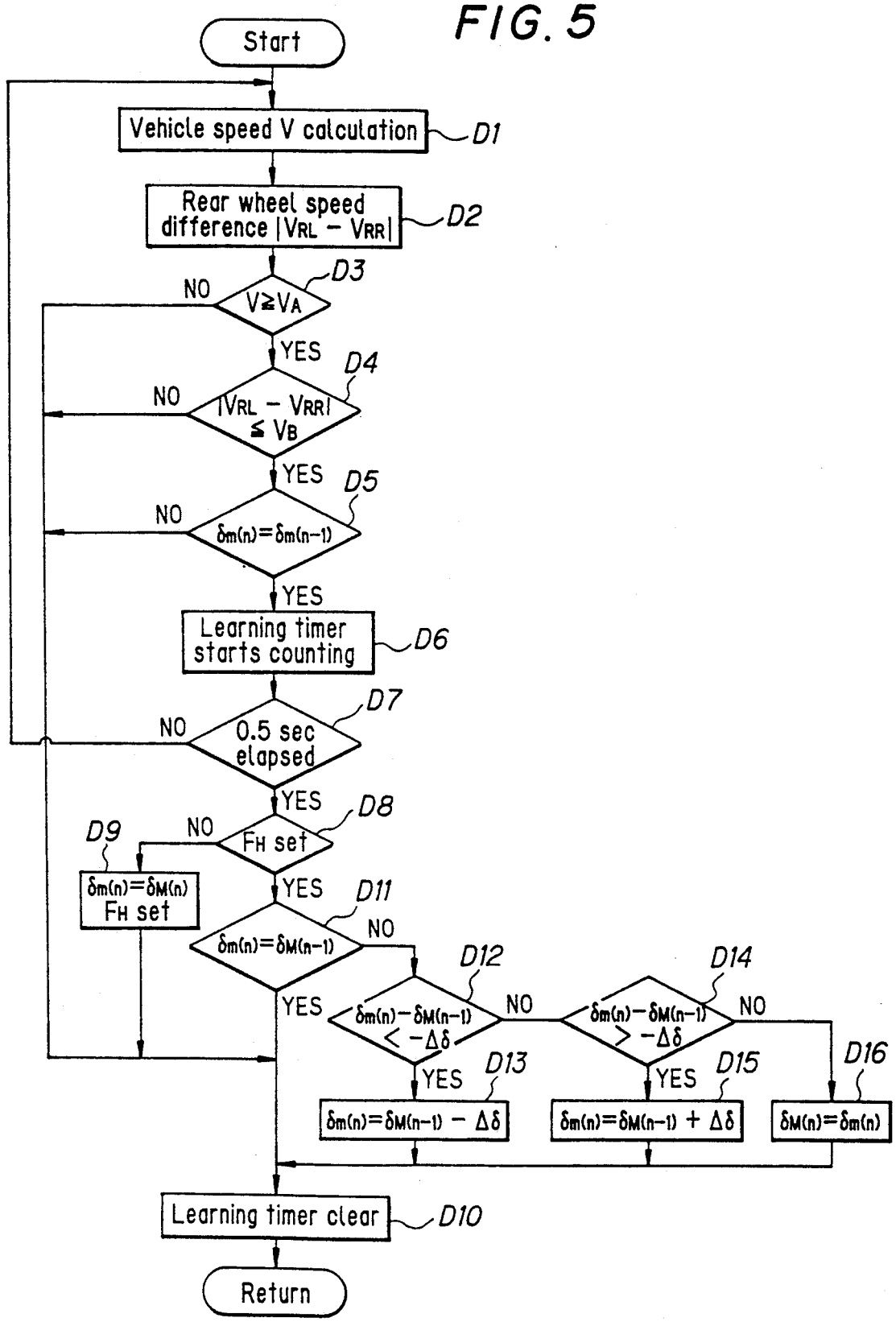
FIG. 5 is a flow chart showing neutral position learning correction control of a steering shaft.

As shown in FIG. 5, illustrating a learning correction procedure of neutral position $\delta_M$ of steering shaft 83, TCL 76 calculates vehicle speed V in D1 according to detection signals from rear wheel rotation sensors 80 and 81 by the following equation (1):

$$V = \frac{V_{RL} + V_{RR}}{2} \tag{1}$$

wherein, $V_{RL}$ and $V_{RR}$ are individual peripheral speeds of the pair of rear wheels 78 and 79.

Then, TCL 76, in D2, calculates a difference in peripheral speed between rear wheel speeds 78 and 79 (hereinafter referred to as "rear wheel speed difference"), $|V_{RL} - V_{RR}|$.

Thereafter, TCL 76, in D3, determines whether or not vehicle speed V is greater than predetermined threshold value $V_A$. This procedure is necessary because rear wheel speed difference $|V_{RL} - V_{RR}|$ associated with the steering operation cannot be detected unless vehicle 82 runs at a speed higher than a certain value. Threshold value $V_A$ is set, through experiments on the running characteristics of vehicle 82, for example, to 20 km per hour.

When it is determined that vehicle speed V is greater than threshold value $V_A$, TCL 76, in step D4, determines whether or not the rear wheel speed difference $|V_{RL} - V_{RR}|$ is smaller than a predetermined threshold value $V_B$, for example, 0.1 km per hour. That is, it determines whether or not vehicle 82 is running straightforward. The reason why threshold value $V_B$ is not set to 0 km per hour is that, when tire air pressures of rear wheels 78 and 79 are not equal to each other, peripheral speeds $V_{RL}$ and $V_{RR}$ of right and left rear wheels 78 and 79 differ from each other, in spite of the straightforward running of vehicle 82.

When it is determined that rear wheel speed difference |V$_{RL}$−V$_{RR}$| is smaller than the threshold value V$_B$ in step D4, TCL 76 determines in D5 whether or not present steering shaft turning position δm(n) is equal to previous steering shaft turning position δm(n−1) detected by steering angle sensor 84. In this case, it is preferable to set the turning detection resolution of steering shaft 83, by steering angle sensor 84, to approximately 5 degrees.

In this step D5, when it is determined that present steering shaft turning position δm(n) is equal to previous steering shaft turning position δm(n−1), TCL 76 determines present vehicle 82 as running straightforward, starts the counting of a learning timer (not shown) built in TCL 76, which is continued, for example, for 0.5 seconds.

Then TCL 76 determines whether or not 0.5 seconds has elapsed from starting of counting of the learning timer in D7, that is, whether or not the straightforward running of vehicle 82 has continued for 0.5 seconds. In this case, since in initial running of vehicle 82, 0.5 seconds has not elapsed from starting counting of the learning timer, steps D1 through D7 are repeated during initial running of vehicle 82.

When it is determined that 0.5 seconds has elapsed from the starting of counting of the learning timer, TCL 76 determines in D8 whether or not steering angle neutral position learned flag F$_H$ is set, that is, whether or not the present learning control is occurring for the first time.

In step D8, when it is determined that the steering angle neutral position learned flag F$_H$ is not set, present steering shaft turning position δm(n) is regarded as a new neutral position δM(n) of steering shaft 83 and is read into a memory of TCL 76, and steering angle neutral position learned flag F$_H$ is set.

After new neutral position δM(n) of steering shaft 69 is thus set, turning angle δH of steering shaft 83 is calculated with respect to neutral position δM(n) of steering shaft 69. Further, in D10, the count of the learning timer is cleared, and steering angle neutral position learning is performed again.

When, in step D8, it is determined that steering angle neutral position learned flag F$_H$ is set, that is, the steering angle neutral position learning is occurring for the second time or more, TCL 76 determines in D1 whether or not current steering shaft turning position δm(n) is equal to previous neutral position δM(n−1) of steering shaft 83, that is, δm(n)=δM(n−1).

When it is determined that the present steering shaft turning position δm(n) is equal to the previous neutral position δM(n−1) of steering shaft 83, the procedure reverts back to step D10 where next steering angle neutral position learning is performed.

When, in step D11, it is determined that present steering shaft turning position δm(n) is not equal to previous neutral position δM(n−1) of steering shaft 83 due to play or the like within the steering system, in this embodiment, present steering shaft turning position δm(n) is not regarded as it is as neutral position δM(n) of steering shaft 69. However, the absolute value of a difference between these values is greater than a predetermined correction limit Δδ, correction limit Δδ is substracted from or added to previous turning position δm(n−1) of steering shaft 83 to obtain new neutral position δM(n) of steering shaft 83, which is stored in a memory of TCL 76.

Thus, in D12, TCL 76 determines whether or not the present steering shaft turning position δm(n) subtracted by the previous neutral position δM(n−1) of steering shaft 83 is smaller than a predetermined negative correction limit −Δδ. When, in step D12, it is determined that the substracted value is smaller than negative correction limit −Δδ, in D13, a new neutral position δM(n) of steering shaft 83 is changed to δM(n)=δM(n−1)−Δδ, from previous neutral position δM(n−1) of steering shaft 69 and negative correction limit −Δδ, to prevent the learning and correction amount from unconditionally becoming a large negative value at any one time.

With this arrangement, even when an abnormal signal is outputted from steering angle sensor 84 for some reason, neutral position δM of steering shaft 83 does not change rapidly, and thus measures to correct this abnormality can be taken immediately.

On the other hand, when, in step D12, it is determined that the subtracted value is greater than negative correction limit −Δδ, it is determined in D14 whether or not present steering shaft turning position δm(n) subtracted by previous neutral position δM(n−1) of steering shaft 83, is greater than positive correction limit Δδ. When, in step D14, it is determined that the subtracted value is greater than positive correction limit Δδ, in D15, new neutral position δM(n) of steering shaft 83 is changed to δM(n)=δM(n−1)+Δδ, from previous neutral position δM(n−1) of steering shaft 69 and positive correction limit Δδ, to prevent the learning and correction amount from unconditionally becoming a large positive value at any one time.

With this arrangement, even when an abnormal signal is outputted from steering angle sensor 84 for some reason, neutral position δM of steering shaft 83 does not change rapidly, and measures to correct this abnormality can be taken immediately.

However, when, in step D14, it is determined that the subtracted value is smaller than positive correction limit Δδ, in D16, present steering shaft turning position δm(n) is read, as it is, as new neutral position δM(n) of steering shaft 83.

Figure 6:
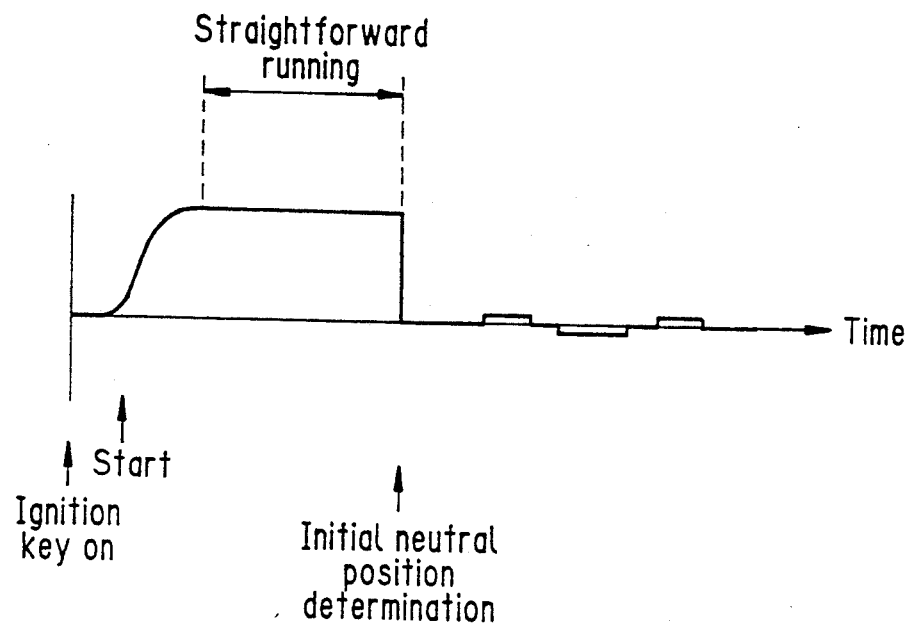
FIG. 6 is a graph showing an example of a correction condition of a leaning value when the neutral position of the steering shaft is learning corrected.

Therefore, when standstill vehicle 82 starts with front wheels 64 and 65 in a turning condition, as shown in FIG. 6 showing an example of changes in neutral position δM of steering shaft 83 at this time, when learning control of neutral position δM of steering shaft 83 occurs for the first time, the correction value of the steering shaft turning position in B1, from its initial value δm(n), is very large. However, neutral position δM of steering shaft 83, occurring for the second time or more, is limited by operation in steps D13 and D15.

After neutral position δM of steering shaft 83 is learning corrected, target driving torque T$_{OS}$ for slip control to regulate driving torque of engine 11 is calculated according to a difference between vehicle speed V and peripheral speeds V$_{FL}$ and V$_{FR}$ of front wheels 64 and 65.

Figure 7:
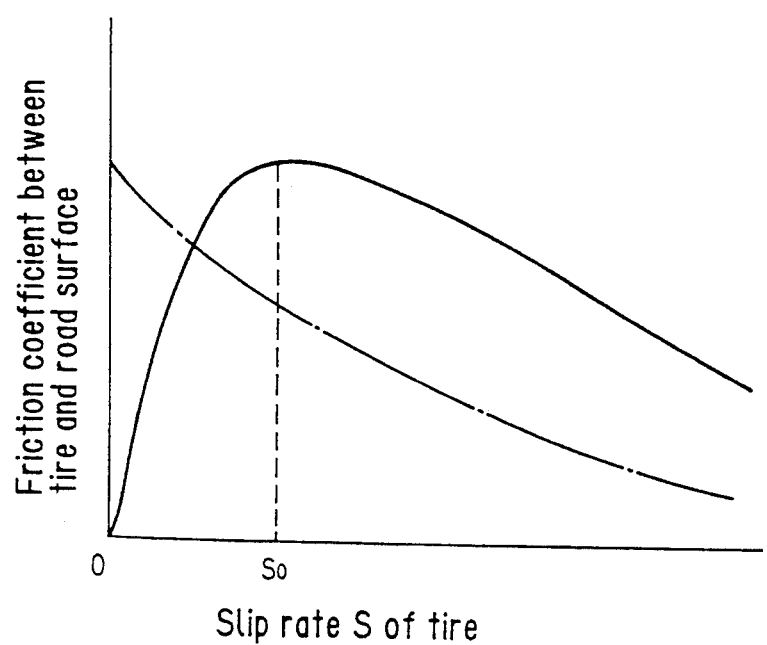
FIG. 7 is a graph showing the relationship between the friction coefficient between tire and road surface and the slip amount of the tire.

In order to efficiently utilize the driving torque generated by engine 11, as shown in FIG. 7 showing the relationship between the friction coefficient between tire and road surface and slip rate of this tire, it is preferable to adjust slip rate s of front wheels 64 and 65 so that the slip rate S of the tires of front wheels 64 and 65 during running is the target slip rate So corresponding to a maximum value of the friction coefficient between the tire and road surface, or its vicinity.

Slip rate S of the tire is $$S = \frac{\frac{V_{FL} + V_{FR}}{2} - V}{V}.$$

Target driving torque $T_{OS}$ of engine 11 is set so that slip rate S is the target slip rate So corresponding to a maximum value of the friction coefficient between tire and road surface or within its vicinity, wherein the calculation procedure is as follows:

First, TCL 76 calculates present longitudinal direction acceleration $G_X$ of vehicle 82 from present vehicle speed $V_{(n)}$ calculated by equation (1) and previously calculated vehicle speed $V_{(n-1)}$, by the following equation:

$$G_X = \frac{V_{(n)} - V_{(n-1)}}{3.6 \cdot \Delta t \cdot g}$$

wherein, $\Delta t$ is 15 milliseconds which is a sampling period of the main timer, and g is a gravitational acceleration.

Figure 8:
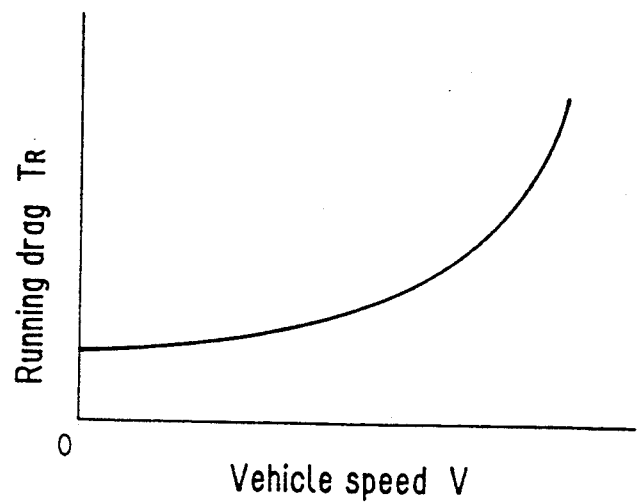
FIG. 8 is a graph showing the relationship between vehicle speed and running drag.

Reference driving torque $T_B$ of engine 11 at this time is calculated by the following equation (2):

$$T_B = G_{XF} \cdot W_b \cdot r + T_R \quad (2)$$

wherein, $G_{XF}$ is a corrected longitudinal direction acceleration, which is longitudinal direction acceleration $G_X$ passed through a low-pass filter to delay changes. Since longitudinal direction acceleration $G_X$ of vehicle 82 can be regarded as equivalent to the friction coefficient between the tire and the road surface, the low-pass filter functions to correct longitudinal direction acceleration $G_X$ so that slip rate S of the tires is maintained at a target slip rate So corresponding to a maximum value of the friction coefficient between the tire and the road surface or within its vicinity, even when longitudinal direction acceleration $G_X$ of vehicle 82 varies and slip rate S of the tire is going to come out of target slip rate So corresponding to a maximum value of the friction coefficient between the tire and the road surface or within its vicinity. $W_b$ is a body weight, r is an effective radius of front wheels 64 and 65, and $T_R$ is a running drag. Running drag $T_R$ can be calculated as a function of vehicle speed V, but, in this embodiment, it is determined from a graph as shown in FIG. 8.

Figure 9:
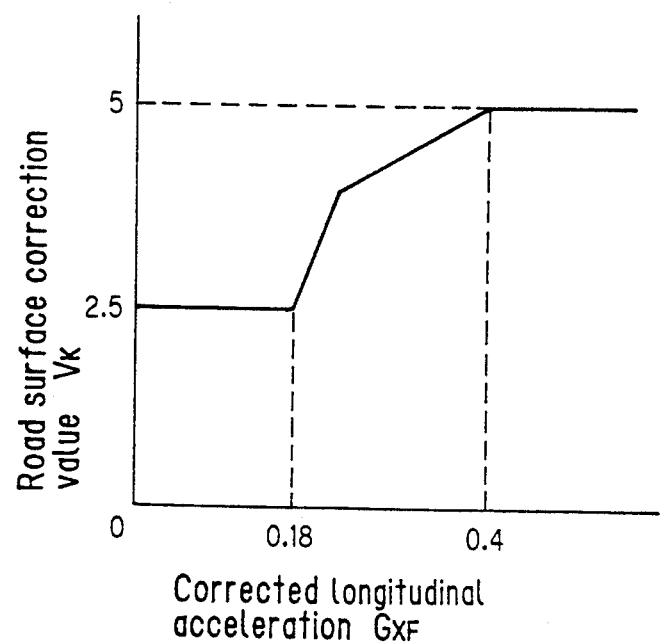
FIG. 9 is a graph showing relationship between corrected longitudinal direction acceleration and speed correction value.

On the other hand, it is normal that a slip amount of about 3% is always generated in the wheels relative to the road surface during acceleration of vehicle 82, and, when running on a rough road such as a gravel road, the maximum value of the friction coefficient between tire and road surface corresponding to target slip rate So is generally greater than that occurring when running on a low μ road. Therefore, target driving wheel speed $V_{FO}$ which is a target peripheral speed of front wheels 64 and 65 is calculated by the following equation (3) in view of the slip amount and road surface condition:

$$V_{FO} = 1.03 \cdot V + V_K \quad (3)$$

wherein, $V_K$ is a road surface correction amount predetermined according to corrected longitudinal direction acceleration $G_{XF}$, which tends to gradually increase as the value of corrected longitudinal direction acceleration $G_{XF}$. However, in this embodiment, road surface correction amount $V_K$ is determined from a graph as shown in FIG. 9, which is prepared through running experimental tests and the like.

Then, slip amount s, which is a difference between vehicle speed V and target driving wheel speed $V_{FO}$, is calculated according to equations (1) and (3) by the following equation (4):

$$s = \frac{V_{FL} + V_{FR}}{2} - V_{FO}. \quad (4)$$

As shown in the following equation (5), slip amount s is integrated while being multiplied by integration coefficient $K_1$ every sampling period of the main timer, to calculate integration correction torque $T_1$ ($T_1 \leq 0$) for enhancing safety of control to target driving torque $T_{OS}$.

$$T_1 = \sum_{i=1}^{n} K_1 \cdot s(i) \quad (5)$$

Similarly, by the following equation (6), proportional correction torque $T_P$ to ease control delay to target driving torque $T_{OS}$, proportional to slip amount s, is calculated by multiplying s by proportional coefficient $K_P$.

$$T_P = K_P \cdot s \quad (6)$$

Then, target driving torque $T_{OS}$ of engine 11 is calculated by the following equation (7) using above equations (2), (5), and (6):

$$T_{OS} = \frac{T_B - T_1 - T_P - T_R}{\rho_m \cdot \rho_d} \quad (7)$$

wherein, $\rho_m$ is a gear ratio of a power transmission (not shown), and $\rho_d$ is a reduction ratio of a differential gear.

Vehicle 82 is provided with a manual switch (not shown) to select slip control by the driver. When the driver operates this switch to select slip control, slip control operation is carried out as described below.

Figure 10:
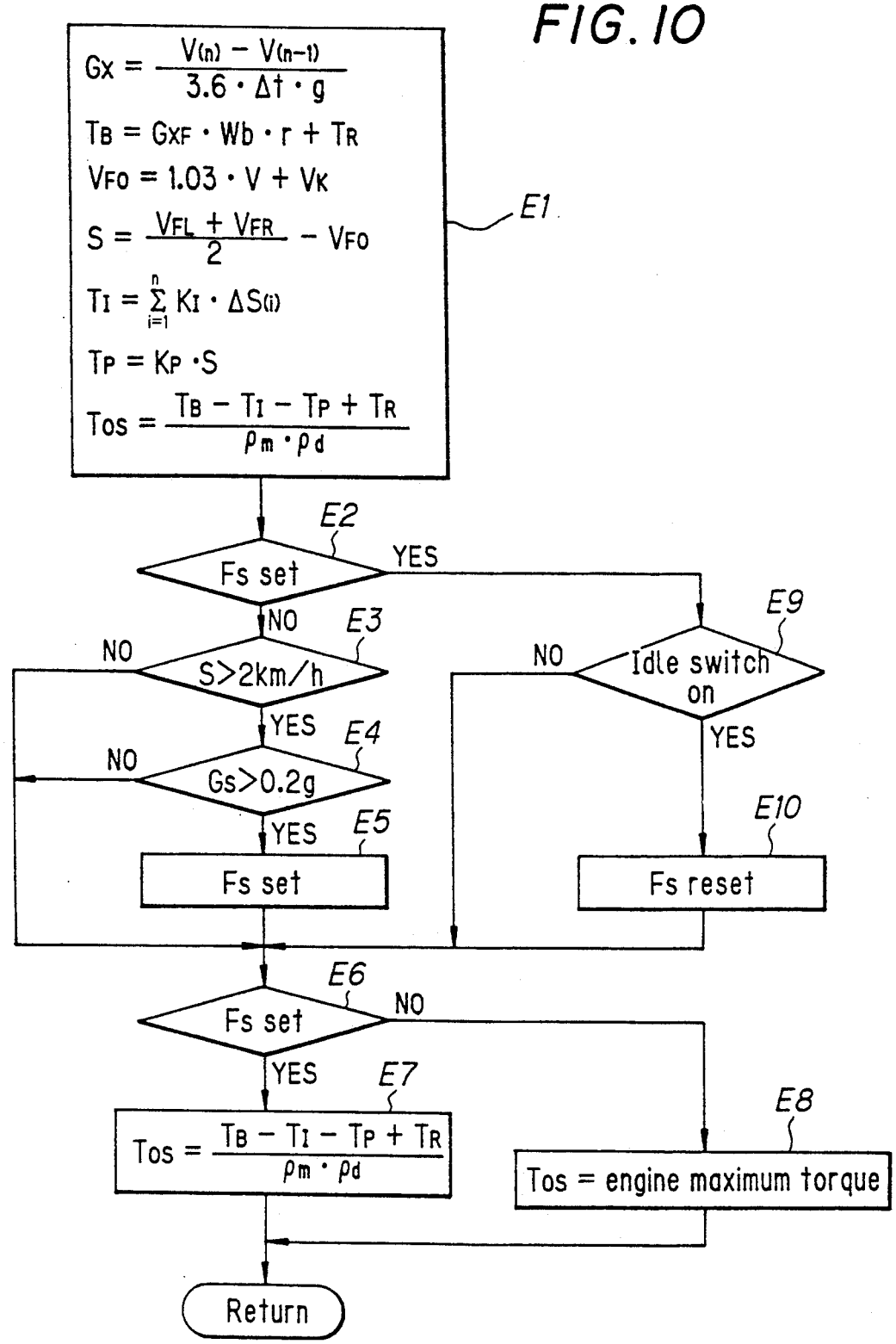
FIG. 10 is a flow chart showing slip control flow.

Referring to FIG. 10 showing the slip control flow, TCL 76 in E1 calculates target driving torque $T_{OS}$ by detection and calculation processing of various data, which is performed independently of operation of the manual switch.

Then, a determination is made in E2 as to whether or not slip control flag $F_S$ is set, but, initially, since the slip control flag $F_S$ is not set, TCL 76 determines in E3 whether or not slip amount s of front wheels 64 and 65 is greater than a predetermined threshold value, for example, 2 km per hour.

When, in step E3, it is determined that slip amount s is greater than 2 km per hour, TCL 76 in E4 determines whether or not changing rate $G_S$ of slip amount s is greater than 0.2 g.

When, in step E4, it is determined that slip amount changing rate $G_S$ is greater than 0.2 g, slip control flag Fs is set in E5, and a determination is again made in E6 as to whether or not slip control flag Fs is set.

When, in step E6, it is determined that slip control flag Fs is set, in E7, slip control target driving torque Tos, previously calculated by equation (7), is adopted as target driving torque Tos of engine 11.

When, in step E6, it is determined that slip control flag Fs is reset, TCL 76 outputs a maximum torque of engine 11 as target driving torque Tos in E8, whereby ECU 15 reduces duty ratio of torque control electromagnetic valves 51 and 56 to the 0% side, and engine 11 outputs a driving torque according to the amount of pressure applied to the accelerator pedal 31 by the driver.

The reason why in step E8 TCL 76 outputs the maximum torque of engine 11 is that ECU 15 is always operated in a direction to reduce energy to torque control electromagnetic valves 51 and 56 in view of control safety, so that engine 11 positively generates a driving torque according to the amount of pressure applied to the accelerator pedal 31 by the driver.

When, in step E3, it is determined that slip amount s of front wheels 64 and 65 is smaller than 2 km per hour, or, in step E4, when it is determined that slip amount changing rate Gs is smaller than 0.2 g, the processing goes to step E6. In step E8, TCL 76 outputs a maximum torque of engine 11 as target driving torque Tos, whereby ECU 15 reduces the duty ratio of torque control electromagnetic valves 51 and 56 to the 0% side, and engine 11 generates a driving torque according to the amount of pressure applied to the accelerator pedal 31 by the driver.

On the other hand, when, in step E2, it is determined that slip control flag Fs is set, a determination is made in E9 as to whether or not idle switch 68 is ON, that is, throttle valve 20 is fully closed.

When, in step E9, it is determined that idle switch 68 is on, since the driver does not press down accelerator pedal 23, slip control flag Fs is reset in E10, and processing goes to step E6.

When, in step E9, it is determined that idle switch is off, a determination is again made in step E6 as to whether or not slip control flag Fs is set.

When the driver does not operate the manual switch to select slip control, TCL 76 calculates target driving torque Tos for slip control as described above, and then calculates target driving torque of engine 11 for turning control.

During turning control of vehicle 82, TCL 76 calculates target lateral acceleration $G_{YO}$ of vehicle 82 from steering shaft turning angle $\delta_H$ and vehicle speed V, and an acceleration in the longitudinal direction of vehicle 82, of a non-extreme under-steering, that is, target longitudinal direction acceleration $G_{XO}$, is set according to the target lateral acceleration $G_{YO}$. Further, a target driving torque of engine 11, corresponding to this target longitudinal direction acceleration $G_{XO}$, is calculated.

Lateral acceleration $G_Y$ of vehicle 82 can be actually calculated using rear wheel speed difference $|V_{RL} - V_{RR}|$. However, since lateral acceleration $G_Y$ applied to vehicle 82 can be forecast using steering shaft turning angle $\delta_H$, rapid control can be achieved.

However, only the determination of target driving torque of engine 11 from steering shaft turning angle $\delta_H$ and vehicle speed V does not at all reflect the driver's intention, which will be dissatisfactory for the driver in view of the drivability of vehicle 82. Then, it is desirable to determine the required driving torque Td of engine 11, demanded by the driver, from the amount of pressure applied to the accelerator pedal 31. Further, target driving torque of engine 11 is set in consideration of required driving torque Td. Furthermore, when fluctuation of target driving torque of engine 11 set every 15 milliseconds is very large, shocks tend to generate, in association with retardation and acceleration of vehicle 82, which may deteriorate the drive feeling. Therefore, when fluctuation of target driving torque of engine 11 becomes so large that it tends to cause a deteriorated drive feeling of the vehicle 82, such fluctuation of target driving torque is to be regulated.

Furthermore, when target driving torque of engine 11 is not changed according to the road surface condition, high $\mu$ road or low $\mu$ road, for example, when, during running on a low $\mu$ road, engine 11 is operated with a target driving torque for high $\mu$ road, front wheels 64 and 65 tend to slip, making it impossible to achieve safe running, it is desirable that TCL 76 calculates both target driving torque $T_{OH}$ for high $\mu$ road and target driving torque $T_{OL}$ for low $\mu$ road.

Figure 11:
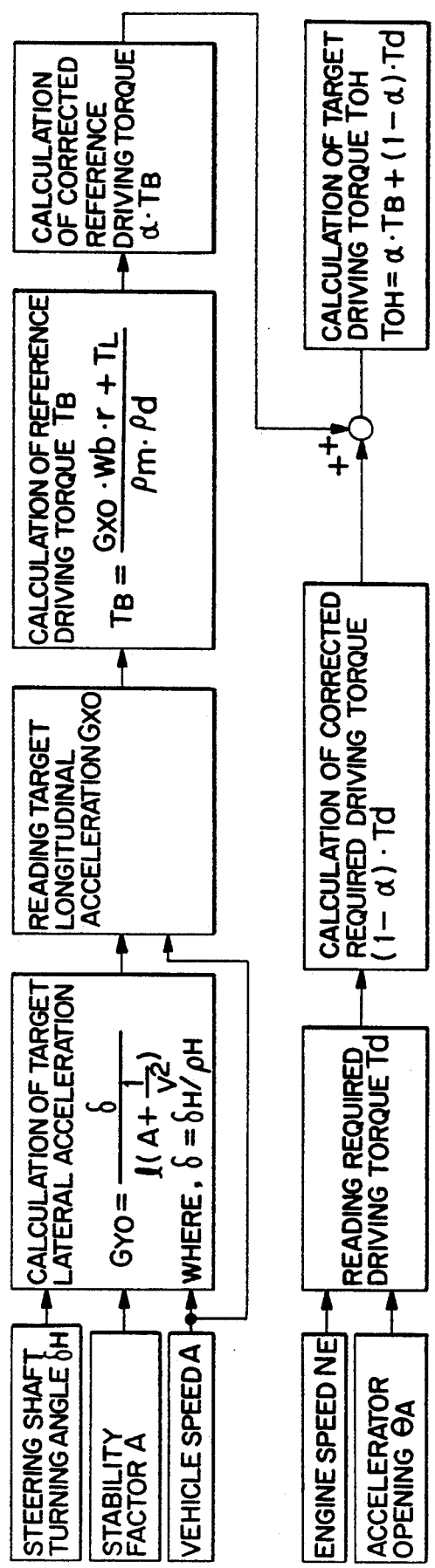
FIG. 11 is a block diagram showing target torque calculation procedure for a road with a high friction coefficient ($\mu$).

Referring to FIG. 11 showing a calculation block for turning control for high $\mu$ road in consideration of the above findings, TCL 76 calculates vehicle speed V by equation (1) from outputs of a pair of rear wheel rotation sensors 80 and 81 and steering angle $\delta$ of front wheels 64 and 65 by the following equation (8) according to a detection signal from steering angle sensor 84. Further, target lateral acceleration $G_{YO}$ at this time is calculated by the following equation (9):

$$\delta = \frac{\delta_H}{\rho_H} \tag{8}$$

$$G_{YO} = \frac{\delta}{l \cdot \left(A + \frac{1}{V^2}\right)} \tag{9}$$

wherein, $\rho_H$ is a steering gear ratio, l is a wheel base of vehicle 82, and A is a stability factor of the vehicle.

Figure 12:
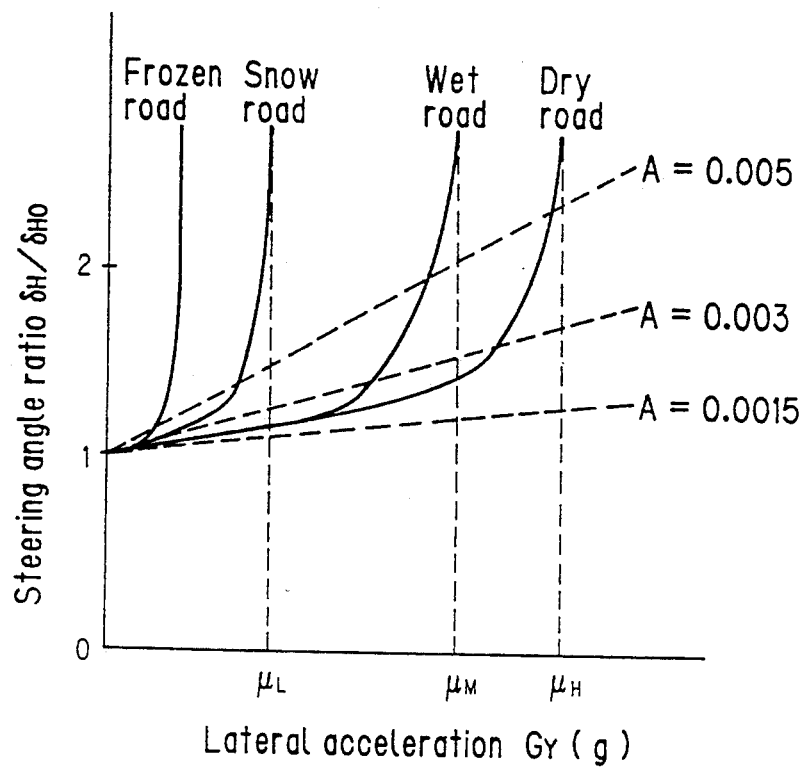
FIG. 12 is a graph showing relationship between lateral acceleration and steering angle for explaining stability factor.

The stability factor A, as is well known, is determined by the suspension arrangement of vehicle 82 or known characteristics of tires. Specifically, it is represented as the gradient of a tangential line in the graph, for example, as shown in FIG. 12, which shows the relationship between actual lateral acceleration $G_Y$ generated in vehicle 82 during steady circular turning and steering angle ratio $\delta_H/\delta_{HO}$ of steering shaft 83 at that time (ratio of turning angle $\delta_H$ of steering shaft 83 at an acceleration to turning angle $\delta_{HO}$ of steering shaft 83 under extremely low-speed running condition where lateral acceleration $G_Y$ is in the vicinity of zero with respect to neutral position $\delta_M$ of steering shaft 83). Thus, in the area where lateral acceleration $G_Y$ is small and vehicle speed V is not so high, stability factor A is almost constant. However, when lateral acceleration $G_Y$ becomes greater according to the road surface condition, stability factor A rapidly increases, and vehicle 82 exhibits a very strong understeering tendency.

As described above, when running on a high $\mu$ road, stability factor A is set to 0.002, and the driving torque of engine 11 is controlled so that target lateral acceleration $G_{YO}$ of vehicle 82 calculated by equation (9) is less than 0.6 g.

Figure 13:
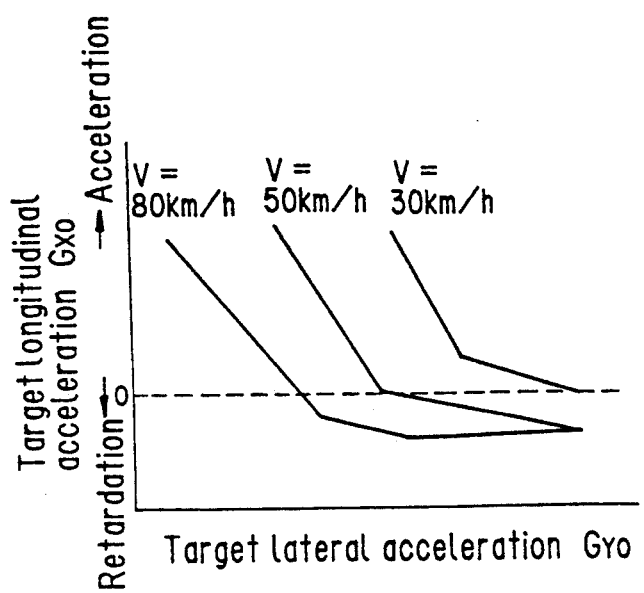
FIG. 13 is a graph showing the relationship between target lateral acceleration, target longitudinal direction acceleration and vehicle speed.
Figure 14:
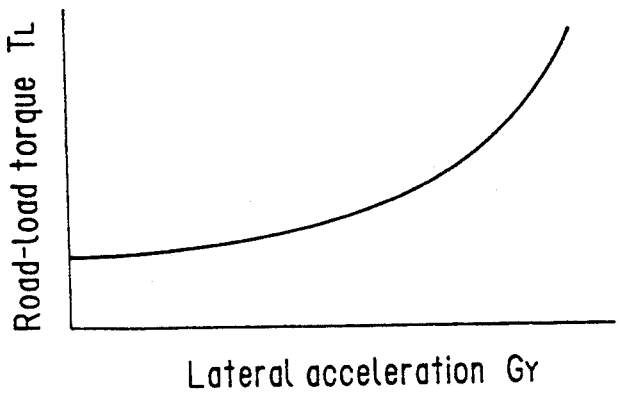
FIG. 14 is a graph showing the relationship between lateral acceleration and road-load torque.
Figure 15:
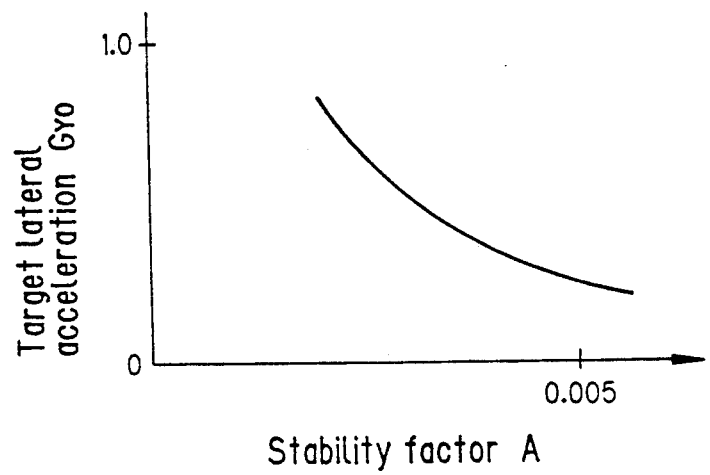
FIG. 15 is a graph showing the relationship between stability factor and target lateral acceleration.

After target lateral acceleration $G_{YO}$ is calculated, target longitudinal direction acceleration $G_{XO}$ of vehicle 82 previously set according to the magnitude of target lateral acceleration $G_{YO}$ and vehicle speed V, is read from a graph as shown in FIG. 13 previously stored in TCL 76, a plurality of graphs being provided according to the road surface condition (graphs for high $\mu$ road and low $\mu$ road provided in this embodiment). Further, reference driving torque $T_B$ of engine 11 is calculated from target longitudinal direction acceleration $G_{XO}$ by equation (10):

$$T_B = \frac{G_{XO} \cdot W_b \cdot r + T_L}{pm \cdot pd} \tag{10}$$

wherein, $T_L$ is a road-load torque which is a resistance of road surface determined as a function of lateral acceleration $G_Y$ of vehicle 82, and, in this embodiment, determined from a graph as shown in FIG. 14.

Other than the above-described embodiment, it is also possible to calculate reference driving torque $T_B$ as follows.

Specifically, TCL 76 calculates vehicle speed V by equation (1) from outputs of a pair of rear wheel rotation sensors 80 and 81 and actual lateral acceleration $G_Y$ applied to vehicle 82 by the following equation (11):

$$G_Y = \frac{|V_{RR} - V_{RL}|}{b} \cdot V \tag{11}$$

wherein, b is a tread of rear wheels 78 and 79.

Then, lateral acceleration $G_Y$ is filtered to obtain corrected lateral acceleration $G_{YF}$, steering angle $\delta$ of front wheels 64 and 65 is calculated by equation (8) according to a detection signal from steering angle sensor 84, and stability factor A is calculated by the following equation (12):

$$A = \frac{\delta}{G_{YF} \cdot l} - \frac{1}{V^2} \tag{12}$$

TCL 76 stores graphs showing the relationship between stability factor A and target lateral acceleration $G_{YO}$, target lateral acceleration $G_{YO}$ corresponding to stability factor A calculated by equation (12) from the graph, and target longitudinal direction acceleration $G_{XO}$ is calculated by equation (13):

$$G_{XO} = K \cdot V \cdot \left( \frac{G_{YO}}{G_{YF}} - 1 \right) \tag{13}$$

Furthermore, longitudinal direction acceleration $G_X$ of vehicle 82 is calculated by equation (2), and reference driving torque $T_B$ of engine 11 is calculated according to these longitudinal direction acceleration $G_X$ and target longitudinal direction acceleration $G_{XO}$ by equation (14) or equation (15):

$$T_B = \frac{G_{XO} \cdot W_b \cdot r + T_L + K_P \cdot (G_{XO} - G_X)}{pm \cdot pd} \tag{14}$$

$$T_B = \frac{G_{XO} \cdot W_b \cdot r + T_L + K_P \cdot (G_{XO} - G_X) + \Sigma K_1 (G_{XO} - G_X)}{pm \cdot pd} \tag{15}$$

Thus, equation (14) uses a proportional correction term $K_P(G_{XO}-G_X)$ for proportional control, and equation (15) further uses an integration correction term $\Sigma K_1(G_{XO}-G_X)$, thereby calculating more exact reference driving torques $T_B$.

To determine an adoption ratio of the thus calculated reference driving torque $T_B$, reference torque $T_B$ is multiplied by weighting factor $\alpha$ to obtain a corrected reference driving torque. Weighting factor $\alpha$ is experimentally set by turning test of vehicle 82, to approximately 0.6 for a high $\mu$ road.

Figure 16:
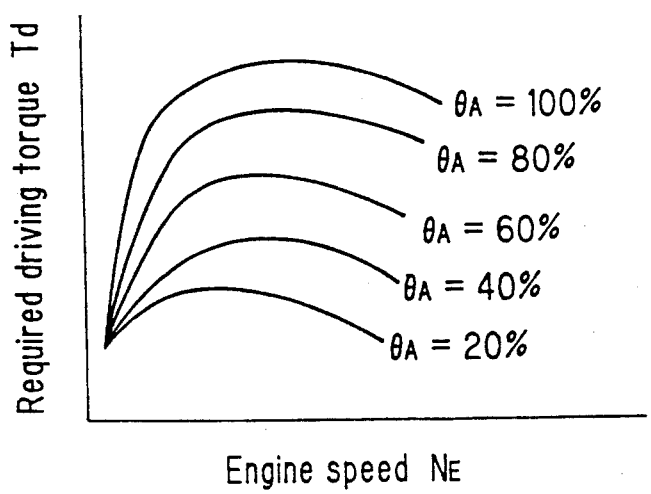
FIG. 16 is a graph showing the relationship between engine speed, accelerator opening and required driving torque.
Figure 17:
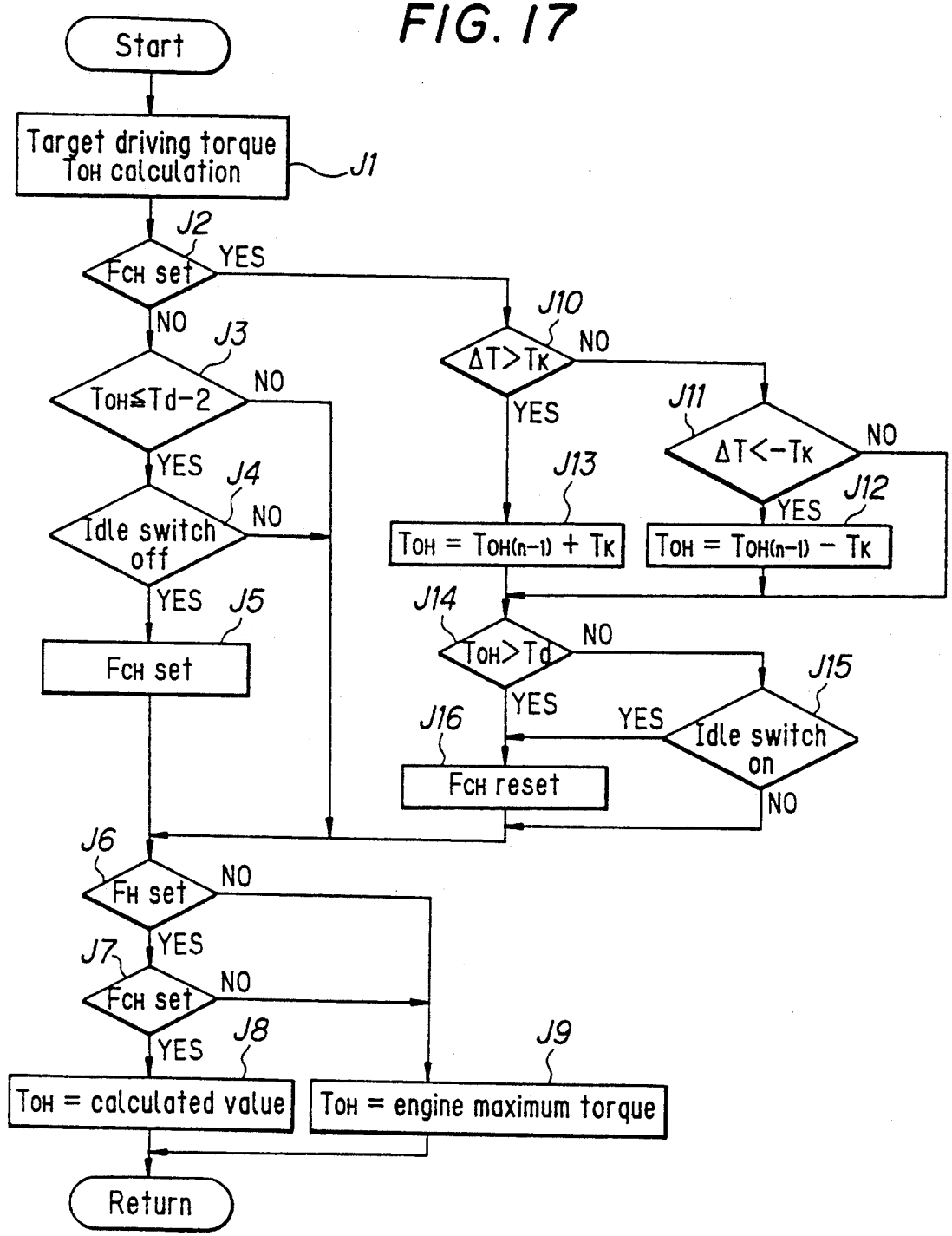
FIG. 17 is a flow chart showing turning control flow for a road with a high friction coefficient ($\mu$).

Required driving torque $T_d$ required by the driver is determined from a graph as shown in FIG. 16 according to engine speed $N_E$ detected by crank angle sensor 62 and accelerator opening $\theta_A$ detected by accelerator opening sensor 77. Then a corrected required driving torque according to weighting factor $\alpha$ is calculated by multiplying required driving torque $T_d$ with $(1-\alpha)$. For example, when $\alpha=0.6$, the adoption ratio of reference driving torque $T_B$ and required driving torque $T_d$ is 6:4.

Thus, reference driving torque $T_{OH}$ of engine 11 is calculated by equation (16):

$$T_{OH} = \alpha \cdot T_B + (1-\alpha) \cdot T_d \tag{16}$$

Vehicle 82 is provided with a manual switch (not shown) for the driver to select turning control for high $\mu$ road. When the driver operates this manual switch to select turning control for high $\mu$ road, the following high $\mu$ road turning control operation is performed.

Referring to FIG. 16 showing control flow to determine target driving torque $T_{OH}$ for high $\mu$ road turning control, target driving torque $T_{OH}$ is calculated in J1 by detection and calculation of various data, but this operation is performed independently of operation of the manual switch.

Then, in J2, a determination is made as to whether or not vehicle 82 is under turning control for high $\mu$ road, that is, whether or not high $\mu$ road turning control flag $F_{CH}$ is set. Initially, high $\mu$ road turning control flag $F_{CH}$ is determined as being reset since high $\mu$ road turning control is not performed, and a determination is made in J3 as to whether or not target driving torque $T_{OH}$ is smaller than a predetermined threshold value, for example, ($T_d-2$). Therefore, target driving torque $T_{OH}$ can be calculated even during straightforward running of vehicle 82, but the value is generally far greater than the required driving torque $T_d$ of the driver. However, since required driving torque $T_d$ generally becomes smaller during turning of vehicle 82, the time when target driving torque $T_{OH}$ is smaller than threshold value ($T_d-2$) is determined as the starting condition for turning control.

This threshold value is set to ($T_d-2$) as a hysteresis to prevent hunting of control.

When, in step J3, it is determined that target driving torque $T_{OH}$ is smaller than threshold value ($T_d-2$), TCL 76 determines in J4 that idle switch 68 is off.

When, in step J4, it is determined that idle switch 68 is off, that is, pressure to the accelerator pedal 31 is applied by the driver, high $\mu$ road turning control flag $F_{CH}$ is set in J5. Then, a determination is made in J6 as to whether or not steering angle neutral position learned flag $F_H$ is set, that is, authenticity of steering angle $\delta$ detected by steering angle sensor 84 is determined.

When, in step J6, it is determined that steering angle neutral position learned flag $F_H$ is set, a determination is made again in step J7 as to whether or not high $\mu$ road turning control flag $F_{CH}$ is set.

In the above procedures, since high μ road turning control flag F$_{CH}$ is set in step J5, it is determined that in step J7 that high μ road turning control flag F$_{CH}$ is set, and target driving torque T$_{OH}$ previously calculated in J1 is adopted in J8 as target driving torque T$_{OH}$.

On the other hand, when it is determined in step J6 that steering angle neutral position learned flag F$_H$ is not set, target driving torque T$_{OH}$ calculated by equation (16) is not adopted since steering angle δ calculated by equation (8) is incredible. TCL 76 outputs in J9 a maximum torque of engine 11 as target driving torque T$_{OH}$, which causes ECU 15 to reduce the duty ratio of torque control electromagnetic valves 51 and 56 to the 0% side. Thus, engine 11 generates a driving torque according to the amount of pressure applied to the accelerator pedal 31 by the driver.

When, in step J3, it is determined that target driving torque T$_{OH}$ is smaller than threshold value (T$_d$−2), the processing does not go to the turning control, but goes from step J6 or J7 to step J9, where TCL 76 outputs a maximum torque of engine 11 as target driving torque T$_{OH}$. This causes ECU 15 to reduce the duty ratio of torque control electromagnetic valves 51 and 56 to the 0% side, and engine 11 generates a driving torque according to the amount of pressure applied to the accelerator pedal 31 by the driver.

Similarly, when it is determined in step J4 that idle switch 68 is on, that is, pressure is not applied to the accelerator pedal 31 by the driver, TCL 76 outputs a maximum driving torque of engine 11 as target driving torque T$_{OH}$. This causes ECU 15 to reduce the duty ratio of torque control electromagnetic valves 51 and 56 to the 0% side, and engine 11 generates a driving torque according to the amount of pressure applied to the accelerator pedal 31 by the driver, and does not go to turning control.

When, in step J2, it is determined that high μ road turning control flag F$_{CH}$ is set, a determination is made in J10 as to whether or not difference ΔT between presently calculated target driving torque T$_{OH}$ and previously calculated target driving torque T$_{OH(n-1)}$ is greater than a predetermined change allowance T$_K$. This predetermined change allowance T$_K$ is a torque change such that the passenger feels no speed change shock, for example, when a target longitudinal direction acceleration of vehicle 82 is to be suppressed to 0.1 g per second, it is given by equation (10) as $$T_K = 0.1 \cdot \frac{W_b \cdot r}{\rho m \cdot \rho d} \cdot \Delta t.$$

When, in step J10, it is determined that difference ΔT between presently calculated target driving torque T$_{OH}$ and previously calculated target driving torque T$_{OH(n-1)}$ is greater than predetermined change allowance T$_K$, a determination is made in J11 as to whether or not difference ΔT between presently calculated target driving torque T$_{OH}$ and previously calculated target driving torque T$_{OH(n-1)}$ is greater than negative change allowance T$_K$.

When, in step J11, it is determined that difference ΔT between present target driving torque T$_{OH}$ and previously calculated target driving torque T$_{OH(n-1)}$ is greater than negative change allowance T$_K$, since the absolute value of difference |ΔT| between presently calculated target driving torque T$_{OH}$ and previously calculated target driving torque T$_{OH(n-1)}$ is smaller than change allowance T$_K$, presently calculated target driving torque T$_{OH}$ is adopted as target driving torque T$_{OH}$ in step J8.

When, in step J11, it is determined that difference ΔT between presently calculated target driving torque T$_{OH}$ and previously calculated target driving torque T$_{OH(n-1)}$ is not greater than negative change allowance T$_K$, present target driving torque T$_{OH}$ is corrected in J12 by the following equation, and adopted as calculated value in J8:

$$T_{OH} = T_{OH(n-1)} - T_K.$$

That is, decrease to a previously calculated target driving torque T$_{OH(n-1)}$ is regulated by change allowance T$_K$ to reduce retardation shock associated with decreasing driving torque of engine 11.

On the other hand, when, in step J10, it is determined that difference ΔT between presently calculated target driving torque T$_{OH}$ and previously calculated target driving torque T$_{OH(n-1)}$ is greater than change allowance T$_K$, present target driving torque T$_{OH(n)}$ is corrected in J13 by the following equation, and adopted as calculated value in J8.

In the case of increasing driving torque, similar to the case of decreasing driving torque described above, when difference ΔT between presently calculated target driving torque T$_{OH}$ and previously calculated target driving torque T$_{OH(n-1)}$ exceeds change allowance T$_K$, increase to previously calculated target driving torque T$_{OH(n-1)}$ is regulated by change allowance T$_K$ to reduce acceleration shock associated with increasing driving torque of engine 11.

Figure 18:
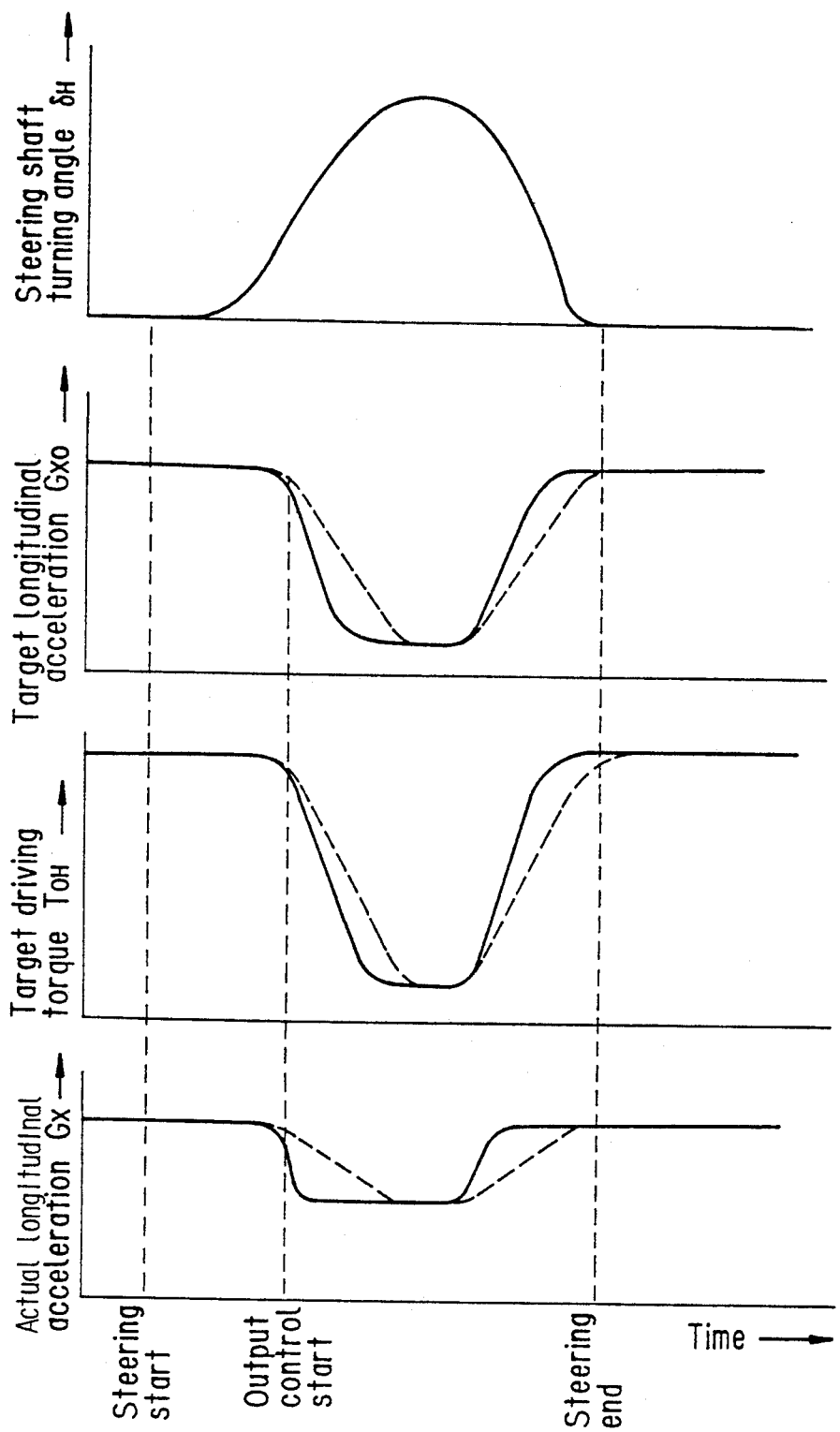
FIG. 18 is a graph showing the relationship between steering shaft turning angle, target driving torque and longitudinal direction acceleration.

As shown in FIG. 18 in which changes in steering shaft turning angle δ, target longitudinal direction acceleration G$_{XO}$, target driving torque T$_{OH}$ and actual longitudinal direction acceleration G$_X$ when changes in target driving torque T$_{OH}$ are regulated are, indicated by broken lines, it can be seen that changes in actual longitudinal direction acceleration G$_X$ are smooth and speed change shocks are eliminated, as compared to the case where changes in target driving torque T$_{OH}$ are not regulated, indicated by solid lines.

Once target driving torque T$_{OH}$ is set, TCL 76 determines whether or not this target driving torque T$_{OH}$ is greater than the driving torque T$_d$ required by the driver.

Since target driving torque T$_{OH}$ is not greater than driving torque T$_d$ required by the driver when high μ road turning control flag F$_{CH}$ is set, a determination is made in J15 as to whether or not idle switch 68 is on.

When, in step J15, it is determined that idle switch 68 is on, processing goes to step J6 because turning control is required.

When, in step J14, it is determined that target driving torque T$_{OH}$ is greater than driving torque T$_d$ required by the driver, which means completion of turning control of vehicle 82, in J16, TCL 76 resets high μ road turning control flag F$_{CH}$. Similarly, when it is determined in step J15 that idle switch 68 is on, that is, the accelerator pedal is not pressed down, processing goes to step J16 where high μ road turning control flag F$_{CH}$ is reset.

When, in step J16, high μ road turning control flag F$_{CH}$ is reset, TCL 76 outputs a maximum driving torque of engine 11 as target driving torque T$_{OH}$, which causes ECU 15 to reduce the duty ratio of torque control electromagnetic valves 51 and 56 to the 0% side, and engine 11 generates driving torque according to the amount of pressure applied to the accelerator pedal 31 by the driver.

In this embodiment, target driving torque T$_{OH}$ of engine 11 is calculated from target lateral acceleration G$_{YO}$ of vehicle 82, which is compared with predetermined threshold value (Td−2), and turning control is started when target driving torque T$_{OH}$ is below threshold value (Td−2). However, it is of course possible that target lateral acceleration G$_{YO}$ of vehicle 82 is directly compared with a predetermined reference value, for example, 0.6 g, and turning control is started when target lateral acceleration G$_{YO}$ is greater than the reference value of 0.6 g.

After target torque T$_{OH}$ for high μ road turning control is calculated, TCL 76 calculates target driving torque T$_{OL}$ for low μ road turning control as follows.

Since target lateral acceleration G$_{YO}$ is greater than actual lateral acceleration G$_Y$ on a low μ road, a determination is made as to whether or not target lateral acceleration G$_{YO}$ is greater than a predetermined threshold value. Further, when target lateral acceleration G$_{YO}$ is greater than this threshold value, it is determined that vehicle 68 is running on a low μ road, and turning control may be performed as needed.

Figure 19:
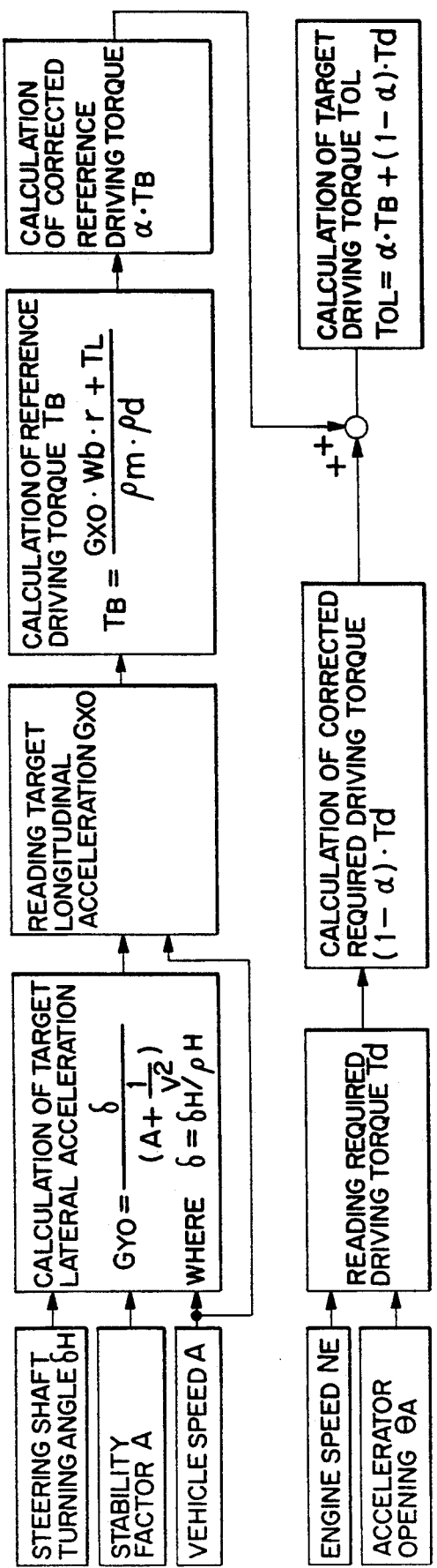
FIG. 19 is a block diagram showing a target driving torque calculation procedure for a road with a low friction coefficient ($\mu$).

As shown in FIG. 19 showing a calculation block for low μ turning control, target lateral acceleration G$_Y$ is determined by equation (9) from steering shaft turning angle δH and vehicle speed V, in which stability factor A is set, for example, to 0.005.

Figure 20:
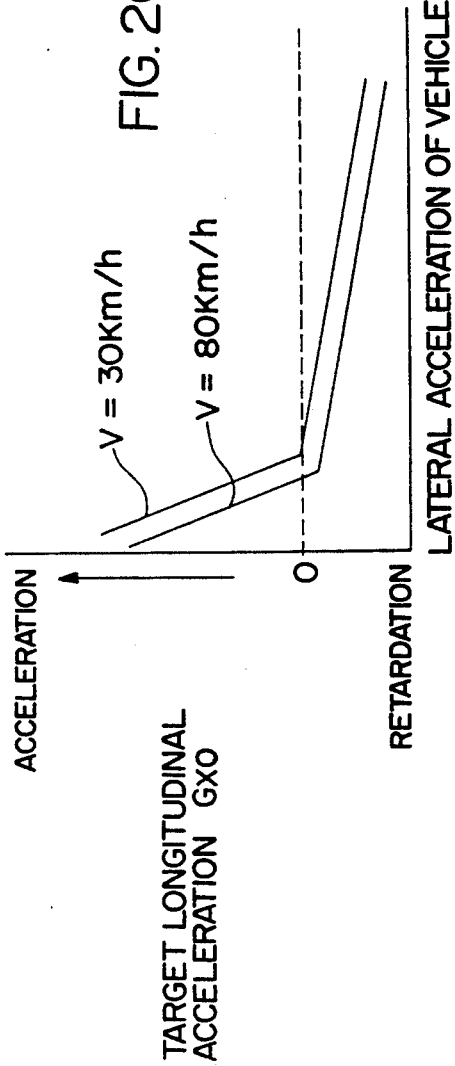
FIG. 20 is a graph showing the relationship between target lateral acceleration, target longitudinal direction acceleration and vehicle speed.
Figure 21:
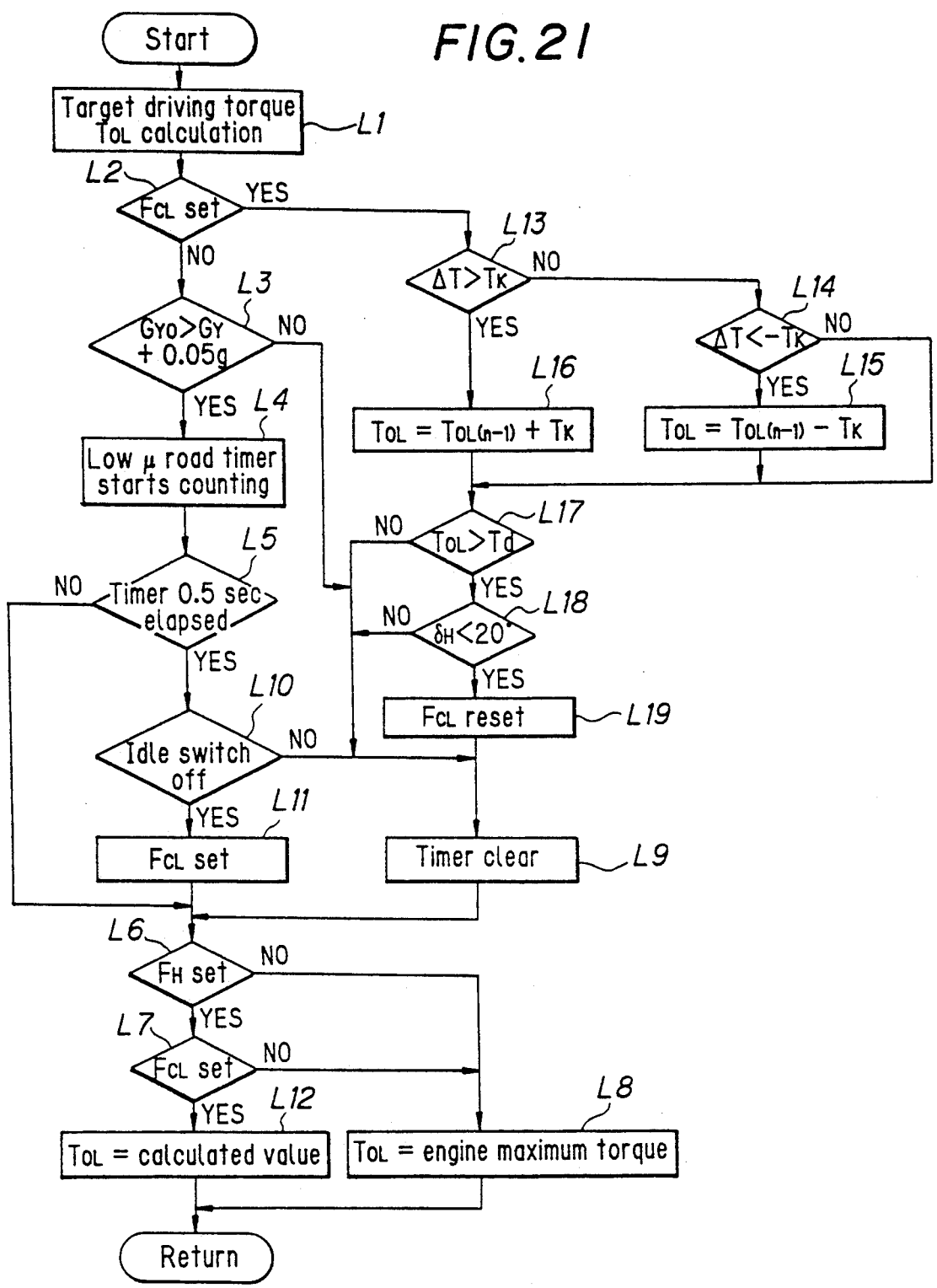
FIG. 21 is a flow chart showing turning control flow for a road with a low friction coefficient ($\mu$).

Then, target longitudinal direction acceleration G$_{XO}$ is determined from target lateral acceleration G$_{YO}$ and vehicle speed V. However, in this embodiment, target longitudinal direction acceleration G$_{XO}$ is read from a graph as shown in FIG. 20. This graph shows the target longitudinal direction acceleration G$_{XO}$ at which vehicle 82 can run safely relative to the vehicle speed V, set from running test results or the like.

Adoption ratio of reference driving torque T$_B$ is determined by calculating reference driving torque T$_B$ by equation (10) according to target longitudinal direction acceleration G$_{XO}$ or by reading from a graph. In this case, weighting factor α is greater than that for high μ road factor α, for example, set as α=0.8, which reduces the rate of reflection to the driver's demand on a low μ road, thereby enabling safe and positive turning on a dangerous low μ road.

On the other hand, as required, driving torque Td by the driver is an adopted one which is calculated for high μ road. Therefore, target driving torque T$_{OL}$ which is based on reference driving torque T$_B$ in consideration of required driving torque Td is calculated by equation (17) which is similar to equation (16).

$$T_{OL}=\alpha \cdot T_B+(1-\alpha)\cdot T_d \quad (17)$$

Vehicle 82 is provided with a manual switch (not shown) for the driver to select turning control for low μ road. When the driver operates this manual switch to select turning control for low μ road, the following low μ road turning control operation is performed.

Referring to FIG. 20 showing control flow to determine target driving torque T$_{OL}$ for low μ road turning control, target driving torque T$_{OL}$ is calculated in L1 by detection and calculation of various data. This operation is performed independently of operation of the manual switch.

Then, in L2, a determination is made as to whether or not vehicle 82 is under turning control for low μ road, that is, whether or not low μ road turning control flag F$_{CL}$ is set. Initially, low μ road turning control flag F$_{CL}$ is determined as being reset since low μ road turning control is not performed, and a determination is made in L3 as to whether or not target lateral acceleration G$_{YO}$ is greater than a predetermined threshold value by adding 0.05 g to actual lateral acceleration G$_Y$ calculated from rotational speed difference between rear wheels 78 and 79. Thus, since target lateral acceleration G$_{YO}$ is greater than actual lateral acceleration G$_Y$ on a low μ road, a determination is made as to whether or not target lateral acceleration G$_{YO}$ is greater than the threshold value. Further, when target lateral acceleration G$_{YO}$ is greater than the threshold value, vehicle 82 is determined as running on a low μ road.

When, in step L3, it is determined that target lateral acceleration G$_{YO}$ is greater than threshold value (G$_Y$+0.05 g), that is, vehicle 82 is turning on a low μ road, TCL 76 counts up a built-in low μ road timer (not shown), the count time of which is, for example, 5 milliseconds. Processing then proceeds to step L6 and until completion of counting of the low μ road timer. Target lateral acceleration G$_{YO}$ by equation (9) and actual lateral acceleration G$_Y$ by equation (11) are calculated every 15 milliseconds to repeat determination operation of L3.

Thus, processing goes through steps L6 and L7 to step L8 until 0.5 seconds elapses after starting of the counting of the low μ road timer. TCL 76 outputs a maximum torque of engine 11 as target driving torque T$_{OL}$, which causes ECU 15 to reduce the duty ratio of torque control electromagnetic valves 51 and 56 to the 0% side, and engine 11 generates driving torque according to pressing amount of accelerator pedal 31 by the driver.

When the condition that target lateral acceleration G$_{YO}$ is greater than threshold value (G$_Y$+0.05 g) does not continue for 0.5 seconds, TCL 76 determines vehicle 82 as not running on a low μ road, and, in L9, clears the count of the low μ road timer, and proceeds to steps L6-L8.

When the condition of target lateral acceleration G$_{YO}$ greater than threshold value (G$_Y$+0.05 g) continues for 0.5 seconds, a determination is made in L10 as to whether or not idle switch 68 is off. When it is determined that idle switch 68 is on, that is, accelerator pedal 31 is not pressed down by the driver, processing does not go to low μ road turning control and the count of the low μ road timer is cleared. Processing then proceeds to steps L6-L8 where TCL 76 outputs a maximum torque of engine 11 as target driving torque T$_{OL}$, which causes ECU 15 to reduce the duty ratio of torque control electromagnetic valves 46 and 51 to the 0% side, and engine 11 generates driving torque according to amount of pressure applied to the accelerator pedal 31 by the driver.

When, in step L10, it is determined that idle switch 68 is off, that is, accelerator pedal 31 is pressed down by the driver, in L11, low μ road turning control flag F$_{CL}$ is set. Then, a determination is made in L6 as to whether or not steering angle neutral position learned flag F$_H$ is set, that is, authenticity of steering angle δ detected by steering angle sensor 84 is determined.

When, in step L6, it is determined that steering angle neutral position learned flag F$_H$ is set, a determination is made again in L7 as to whether or not low μ road turning control flag F$_{CL}$ is set. When it is determined in step L11 that low μ road turning control flag F$_{CL}$ is set, in step L12, target driving torque $T_{OL}$ previously calculated is adopted as it is.

When, in step L6, it is determined that steering angle neutral position learned flag $F_H$ is not set, processing goes to step L8 because steering angle $\delta$ is incredible. Target driving torque $T_{OL}$ previously calculated by equation (17) is not adopted in L1. TCL 76 outputs a maximum torque of engine 11 as target driving torque $T_{OL}$, which causes ECU 15 to reduce the duty ratio of torque control electromagnetic valves 46 and 51 to the 0% side, and engine 11 generates driving torque according to the amount of pressure applied to the accelerator pedal 31 by the driver.

On the other hand, when, in step L2, it is determined that low $\mu$ road turning control flag $F_{CL}$ is set, processing goes to step L13.

In steps L13–L16, as in the case of high $\mu$ road turning control, a determination is made as to whether or not difference $\Delta T$ between presently calculated target driving torque $T_{OL}$ and previously calculated target driving torque $T_{OL(n-1)}$ is greater than change allowance $T_K$. Further, when it is within change allowance $T_K$, whether an increase or a decrease, presently calculated target driving torque $T_{OL}$ is adopted as it is. When $\Delta T$ exceeds change allowance $T_K$, the target driving torque is regulated by change allowance $T_K$.

Thus, when target driving torque $T_{OL}$ is decreased, in L15, present target driving torque $T_{OL(n)}$ is corrected as $$T_{OL(n)} = T_{OL(n-1)} - T_K$$

which is adopted as the calculated value in L12. To the contrary, when target driving torque $T_{OL}$ is increased, in L16, present driving torque $T_{OL(n)}$ is corrected as $$T_{OL(n)} = T_{OL(n-1)} + T_K$$

which is adopted as the calculated value in L12.

Once target driving torque $T_{OL}$ is set as above, TCL 76 determines in L17 whether or not this target driving torque $T_{OL}$ is greater than driving torque $T_d$ required by the driver.

In this case, when low $\mu$ road turning control flag $F_{CL}$ is set, since target driving torque $T_{OL}$ is not greater than required driving torque $T_d$, processing goes to step L9 where the count of the low $\mu$ road timer is cleared and processing goes to steps L6 and L7. When it is determined that steering angle neutral position learned flag $F_H$ is set, and low $\mu$ road turning control flag $F_{CL}$ is set, the calculated value adopted in L1 or L15 or L16 is selected as driving torque $T_{OL}$ for low $\mu$ road turning control.

Even when, in step L17, it is determined that target driving torque $T_{OL}$ is greater than driving torque $T_d$ required by the driver, when it is determined in L18 that steering shaft turning angle $\delta_H$ is, for example, not smaller than 20 degrees, turning control is continued since vehicle 82 is under a turning operation.

When, in step L17, it is determined that target driving torque $T_{OL}$ is greater than driving torque $T_d$ required by the driver, and it is determined in L18 that steering shaft turning angle $\delta_H$ is, for example, not smaller than 20 degrees, which means the completion of the turning of vehicle 82 has occurred, TCL 76 resets low $\mu$ road turning control flag $F_{CL}$ in L19.

When, in step L19, low $\mu$ road turning control flag $F_{CL}$ is reset, since counting of the low $\mu$ road timer is unnecessary, the count of the low $\mu$ road timer is cleared, and processing goes to steps L6 and L7. Since, in step L7, it is determined that low $\mu$ road turning control flag $F_{CL}$ is reset, processing goes to step L8 where TCL 76 outputs a maximum driving torque of engine 11 as target driving torque $T_{OL}$. This causes ECU 15 to reduce the duty ratio of torque control electromagnetic valves 46 and 51 to the 0% side, and engine 11 generates driving torque according to the amount of pressure applied to the accelerator pedal 31 by the driver.

Figure 22:
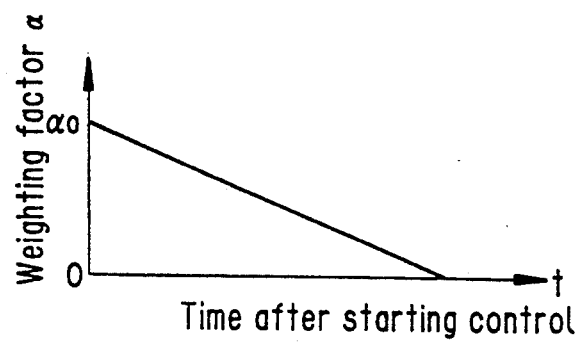
Figure 23:
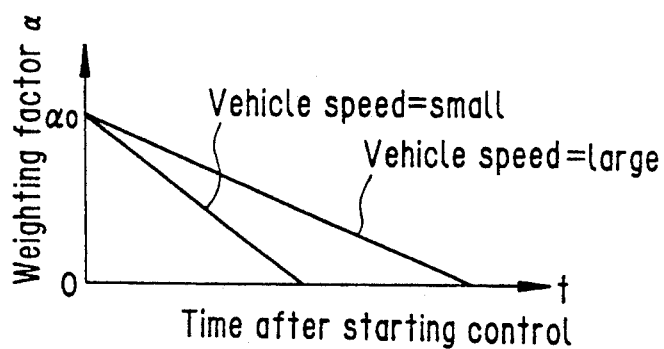
Figure 24:
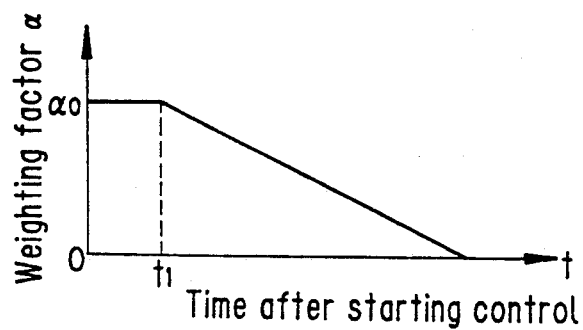

It is of course possible to ignore the driving torque $T_d$ required by the driver in order to simplify the above-described turning control procedure. In this case, reference driving torque $T_B$, which can be calculated by equation (10), (14) or (15), may be adopted as a target driving torque. Furthermore, even when driving torque $T_d$ required by the driver is taken into consideration as in this embodiment, rather than constant weighting factor $\alpha$, factor $\alpha$ may be gradually decreased with time as shown in FIG. 22. As shown in FIG. 23, factor $\alpha$ may be gradually decreased with vehicle speed, and the ratio of required driving torque $T_d$ may be gradually increased. Similarly, as shown in FIG. 24, factor $\alpha$ may remain constant for a period of time after the beginning of control, and then can be decreased. Alternatively, factor $\alpha$ may be increased by increasing steering shaft turning amount $\delta_H$, especially to run vehicle 82 safely along a turning road of which the curvature radius gradually decreases.

In the above-described calculation method, target driving torques $T_{OH}$ and $T_{OL}$ are calculated, while being regulated by change allowance $T_K$, in order to prevent speed change shocks due to rapid changes in driving torque of engine 11. However, this regulation may alternatively be applied to target longitudinal direction acceleration $G_{XO}$. For change allowance $G_K$ at this time, the calculation procedure for target longitudinal direction acceleration $G_X$ at an n'th time is as follows:

When $G_{XO(n)} - G_{XO(n-1)} > G_K$ (a)
$G_{XO(n)} = G_{XO(n-1)} + G_K$

When $G_{XO(n)} - G_{XO(n-1)} < -G_K$ (b)
$G_{XO(n)} = G_{XO(n-1)} - G_K$.

When sampling time of the main timer is set to 15 milliseconds and changes in target longitudinal direction acceleration should be suppressed to 0.1 g per second, $G_K = 0.1 \cdot \Delta t.$ In the above-described embodiment, two types of turning control target driving torques for high $\mu$ road and low $\mu$ road are calculated. However, in addition, a target driving torque corresponding to a medium road surface between high $\mu$ road and low $\mu$ road is calculated, and a final target driving torque may be selected from these target driving torques. To determine the condition of the road surface on which the vehicle is running, a high $\mu$ road, a low $\mu$ road, or one which has a friction coefficient between the two (hereinafter referred to as medium $\mu$ road), the following method may be used. In FIG. 12, where a friction coefficient of a high $\mu$ road is $\mu_H$, that of a medium $\mu$ road is $\mu_M$, and that of a low $\mu$ road is $\mu L$, lateral acceleration $G_Y$ applied to vehicle 82 cannot exceed these friction coefficients $\mu H$, $\mu M$, and $\mu L$.

Figure 25:
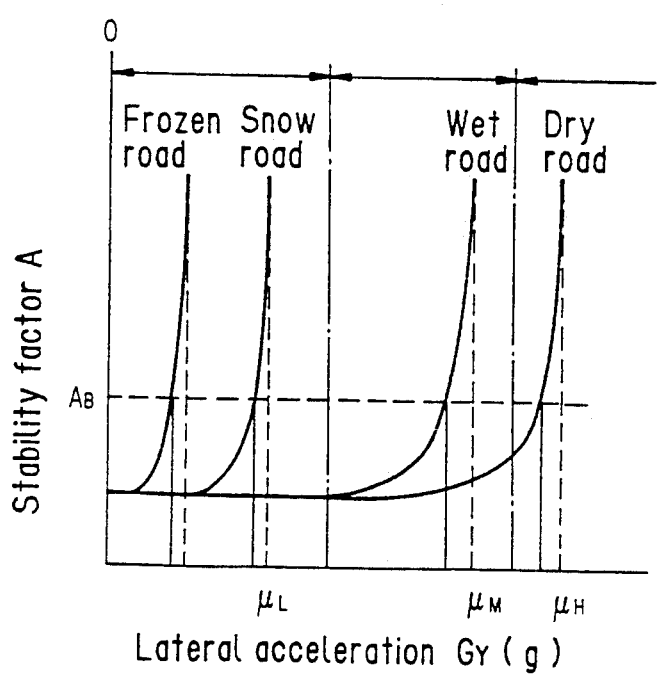
FIG. 25 is a graph showing the relationship between lateral acceleration and stability factor.

As shown in FIG. 25 which illustrates a relationship between lateral acceleration $G_Y$ applied to vehicle 82 and stability factor A, when lateral acceleration $G_Y$ of vehicle 82 is calculated for reference stability factor $A_S$ (e.g. 0.005), which is greater than areas where stability factor A maintains a constant value independent of lateral acceleration $G_Y$. These are very close to friction coefficients $\mu H$, $\mu M$, and $\mu L$ of the road surface.

Therefore, steering angle $\delta$ and lateral acceleration $G_Y$ and vehicle speed V of vehicle 82 are detected, stability factor A calculated by equation (12) is compared with reference stability factor $A_S$, and detected lateral acceleration $G_Y$, at which both coincide with each other can be estimated as a friction coefficient of the road surface.

After target driving torque $T_{OL}$ for low $\mu$ road turning control is calculated as above, TCL 76 selects optimum final target driving torque $T_O$ among from these three target driving torques $T_{OS}$, $T_{OH}$ and $T_{OL}$, and outputs this to ECU 15. In this case, the smallest target driving torque is preferentially outputted in view of running safety of vehicle 82. However, in general, since slip control target driving torque $T_{OS}$ is always smaller than low $\mu$ road turning control target driving torque $T_{OL}$, final target driving torque $T_O$ may be selected in the order of slip control, low $\mu$ road turning control, and high $\mu$ road turning control.

Figure 26:
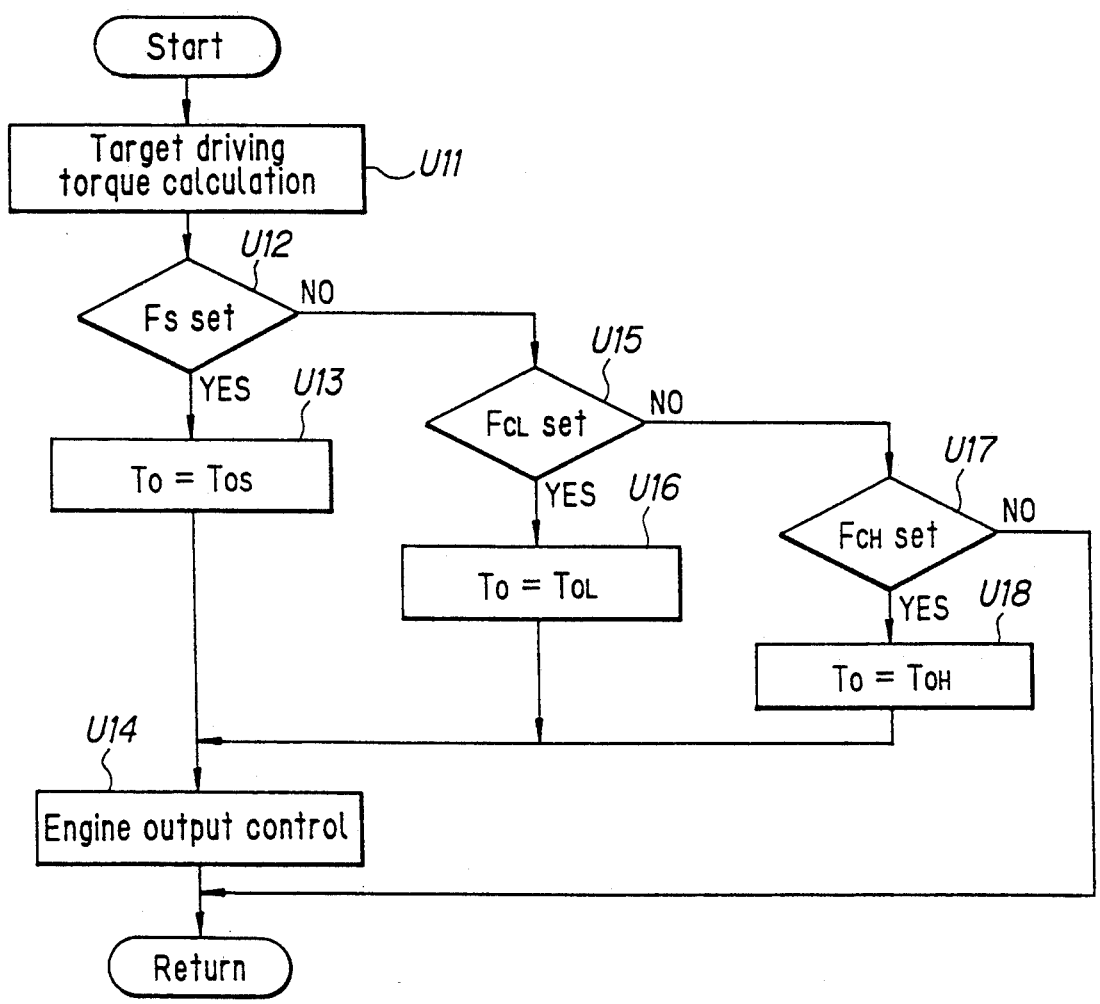
FIG. 26 is a flow chart showing an example of the final target torque selection procedure.

As shown in FIG. 26 which shows this processing flow, after above-described three target driving torques $T_{OS}$, $T_{OH}$ and $T_{OL}$ are calculated in U11, a determination is made in U12 as to whether or not slip control flag $F_S$ is set.

When, in step U12, it is determined that slip control flag $F_S$ is set, TCL 76 selects in U13 slip control target driving torque $T_{OS}$ as a final target driving torque $T_O$, and outputs this to ECU 15.

ECU 15 stores graphs to determine throttle opening $\theta_T$ from engine speed $N_E$ and driving torque of engine 11 as parameters, which, in U14, reads target throttle opening $\theta_{TO}$ corresponding to present engine speed $N_E$ and target driving torque $T_{OS}$ from the graph. Then ECU 15 determines deviation between target throttle opening $\theta_{TO}$ and actual throttle opening $\theta_T$ outputted from throttle opening sensor 67, sets the duty ratio of the pair of torque control electromagnetic valves 51 and 56 to a value according to the deviation to supply current to solenoids of plungers 52 and 57 of individual torque control electromagnetic valves 51 and 56, and controls actual throttle opening $\theta_T$ to target value $\theta_{TO}$ by the operation of actuator 41.

When, in step U12, it is determined that slip control flag $F_S$ is not set, a determination is made in U15 as to whether or not low $\mu$ road turning control flag $F_{CL}$ is set.

When, in step U15, it is determined that low $\mu$ road turning control flag $F_{CL}$ is set, low $\mu$ road turning control target driving torque $T_{OL}$ is selected in U16 as final target driving torque $T_O$, and processing goes to step U14.

When, in step U15, it is determined that low $\mu$ road turning control flag $F_{CL}$ is not set, a determination is made in U17 as to whether or not high $\mu$ road turning control flag $F_{CH}$ is set.

When, in step U17, it is determined that high $\mu$ road turning control flag $F_{CH}$ is set, high $\mu$ road turning control target driving torque $T_{OH}$ is selected in U18 as final target driving torque $T_O$, and processing goes to step U14.

On the other hand, when, in step U17, high $\mu$ road turning control flag $F_{CH}$ is not set, TCL 76 outputs a maximum torque of engine 11 as final target driving torque $T_O$. This causes ECU 15 to reduce the duty ratio of torque control electromagnetic valves 51 and 56 to the 0% side, and engine 11 generates driving torque according to the amount of pressure applied to the accelerator pedal 31 by the driver. In this case, in this embodiment, the duty ratio of the pair of torque control electromagnetic valves 51 and 56 is not unconditionally set to 0%, but ECU 15 compares actual accelerator opening $\theta_A$ with a maximum throttle opening regulation value. Further, when the accelerator opening $\theta_A$ exceeds the maximum throttle opening regulation value, the duty ratio of the pair of torque control electromagnetic valves 51 and 56 is determined so that the throttle opening is the maximum throttle opening regulation value to drive plungers 52 and 57. This maximum throttle opening regulation value is a function of engine speed $N_E$, which is set to fully closed state or its vicinity for over a certain value (for example, 2,000 rpm). However, in an area of lower speeds, it is set so that it is gradually decreased with decreasing engine speed $N_E$ to an opening of several 10%.

The reason for such regulation to throttle opening $\theta_T$, is to enhance the control response when TCL 76 determines a necessity to reduce the driving torque of engine 11. Current design concept of vehicle 76 tends to use a very large bore diameter of throttle body 21 to improve acceleration and maximum output of vehicle 82, which, when engine 11 is in a low speed region, intake air amount tends to saturate at a throttle opening $\theta_T$ of several 10%. Therefore, rather than setting throttle opening $\theta_T$ to full open or somewhere in that vicinity, according to the amount of pressure applied to the accelerator pedal 31, it can be regulated to a predetermined position to reduce deviation between target throttle opening $\theta_{TO}$ and actual throttle opening $\theta_T$ when a driving torque reduction instruction is applied, thereby quickly reducing to target throttle opening $\theta_{TO}$.

In the above-described embodiment, two types of turning control target driving torques for high $\mu$ road and low $\mu$ road are calculated. Alternatively, a single turning control target driving torque $T_{OC}$ is calculated, and, since during slip control, slip control target driving torque $T_{OS}$ is generally always smaller than target driving torque $T_{OC}$, it is of course possible to select slip control target driving torque $T_{OS}$ preferentially over turning control target driving torque $T_{OC}$.

Figure 27:
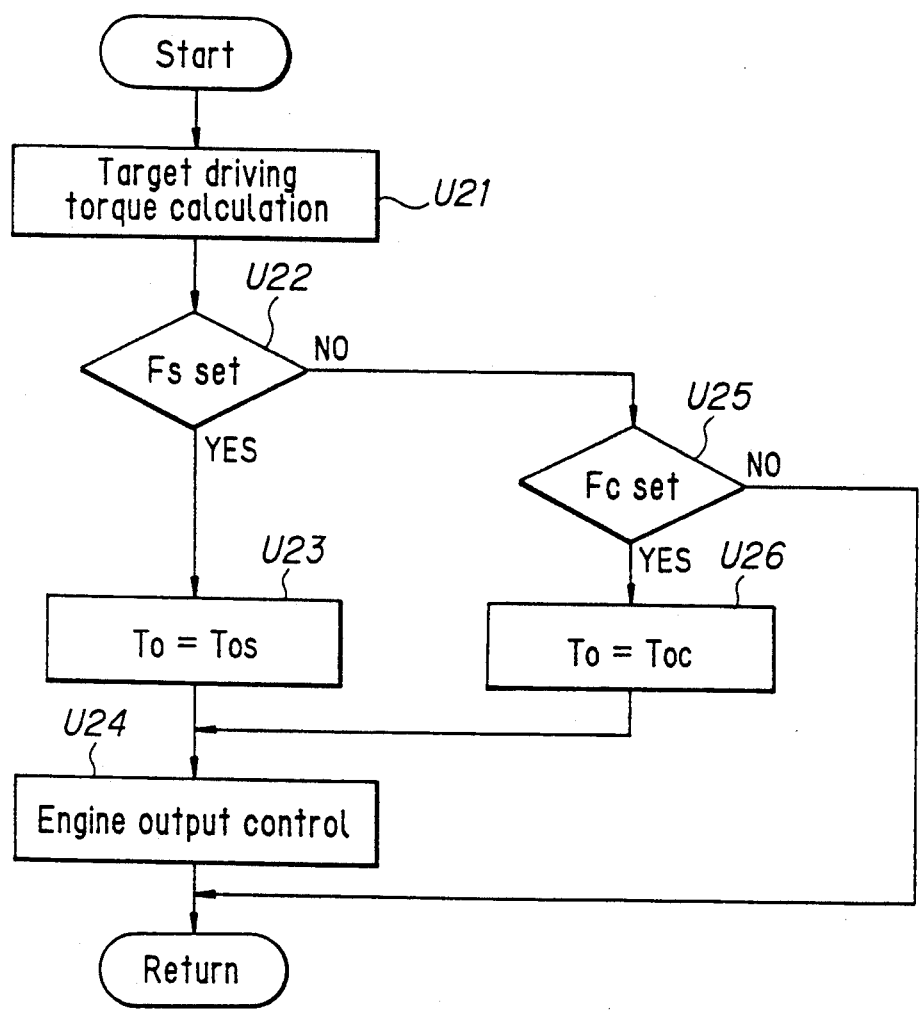
FIG. 27 is a flow chart showing another example of the final target torque selection procedure.

As shown in FIG. 27, which shows processing flow of another embodiment according to the present invention, after slip control target driving torque $T_{OS}$ and turning control target driving torque $T_{OC}$ are calculated in U21 by the method as described above, a determination is made in U22 as to whether or not slip control flag $F_S$ is set.

When, in step U22, it is determined that slip control flag $F_S$ is set, slip control target driving torque $T_{OS}$ is selected in U23 as final target driving torque $T_O$. ECU 15 in U24 reads target throttle opening $\theta_{TO}$ corresponding to present engine speed $N_E$, and target driving torque $T_{OS}$ from a graph stored in ECU 15, determines a deviation between target throttle opening $\theta_{TO}$ and actual throttle opening $\theta_T$ outputted from throttle opening sensor 67, sets the duty ratio of the pair of torque control electromagnetic valves 51 and 56 to a value according to the deviation to supply current to solenoids of plungers 52 and 57 of individual torque control electromagnetic valves 51 and 56, and controls actual throttle opening $\theta T$ to decrease to target throttle opening $\theta TO$ by the operation of actuator 41.

When, in step U22, it is determined that slip control flag Fs is not set, a determination is made in U25 as to whether or not turning control flag Fc is set.

When, in step U25, it is determined that turning control flag Fc is set, turning control target driving torque ToC is selected in U26 as final target driving torque To, and processing goes to step U24.

On the other hand, when, in step U25, it is determined that turning control flag Fc is not set, TCL 76 outputs a maximum torque of engine 11 as final target driving torque To. This causes ECU 15 to reduce the duty ratio of torque control electromagnetic valves 51 and 56 to the 0% side, and engine 11 generates driving torque according to the amount of pressure applied to the accelerator pedal 31 by the driver.

Then, another embodiment of the present invention will now be described in which the turning control apparatus for a vehicle according to the present invention is applied to a front-wheel-drive type vehicle incorporated with an automatic transmission of four forward speeds and a single reverse speed.

The same description as previously discussed in the foregoing embodiments will be briefly described. Members and parts with the same functions as those previously discussed are indicated by the same reference numbers in the foregoing embodiments.

Figure 28:
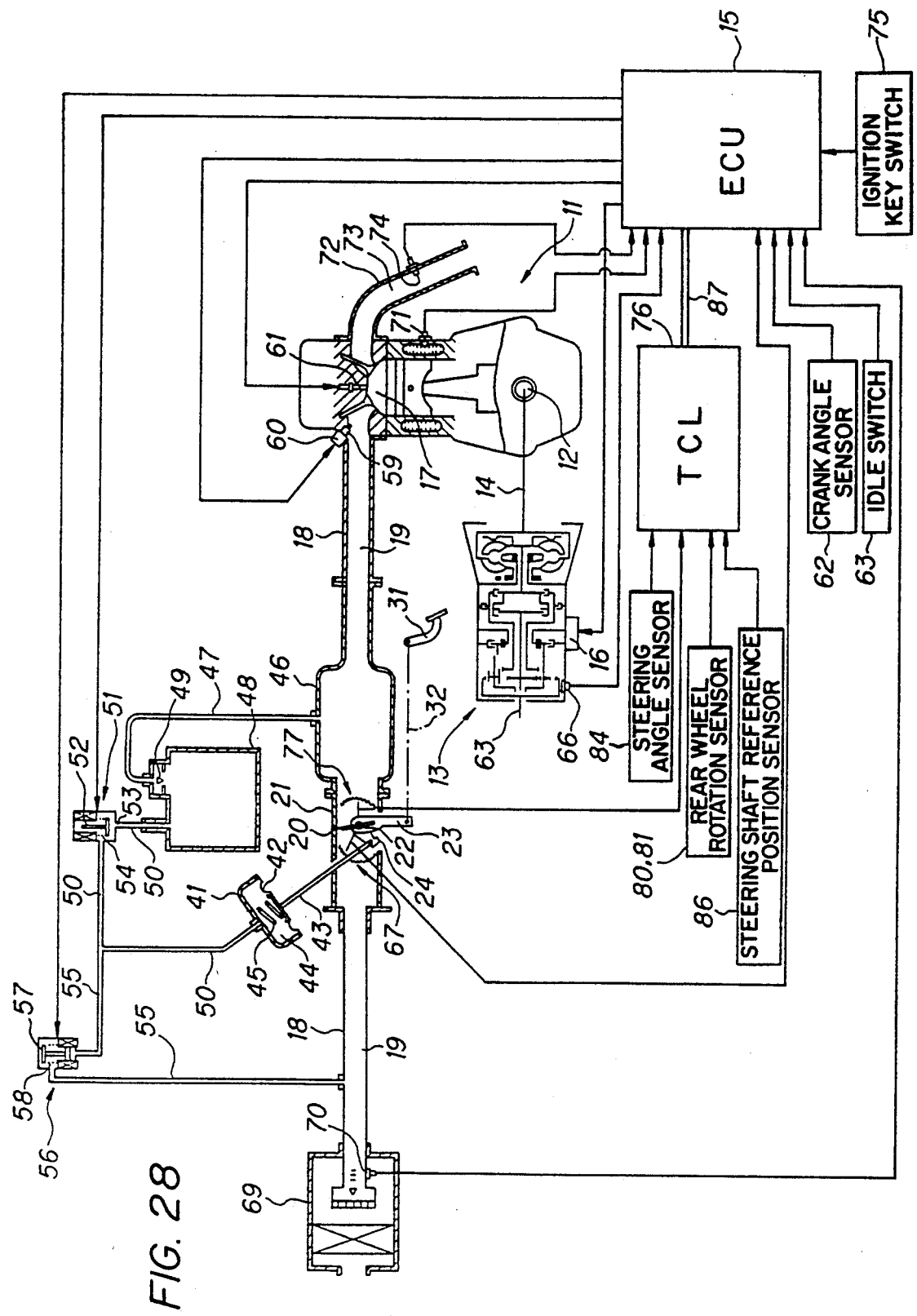
FIG. 28 is a schematic view of an embodiment of the output control apparatus for a vehicle according to the present invention incorporated in a front-wheel-drive vehicle incorporated with a hydraulic automatic transmission of four forward speeds and a single reverse speed.
Figure 29:
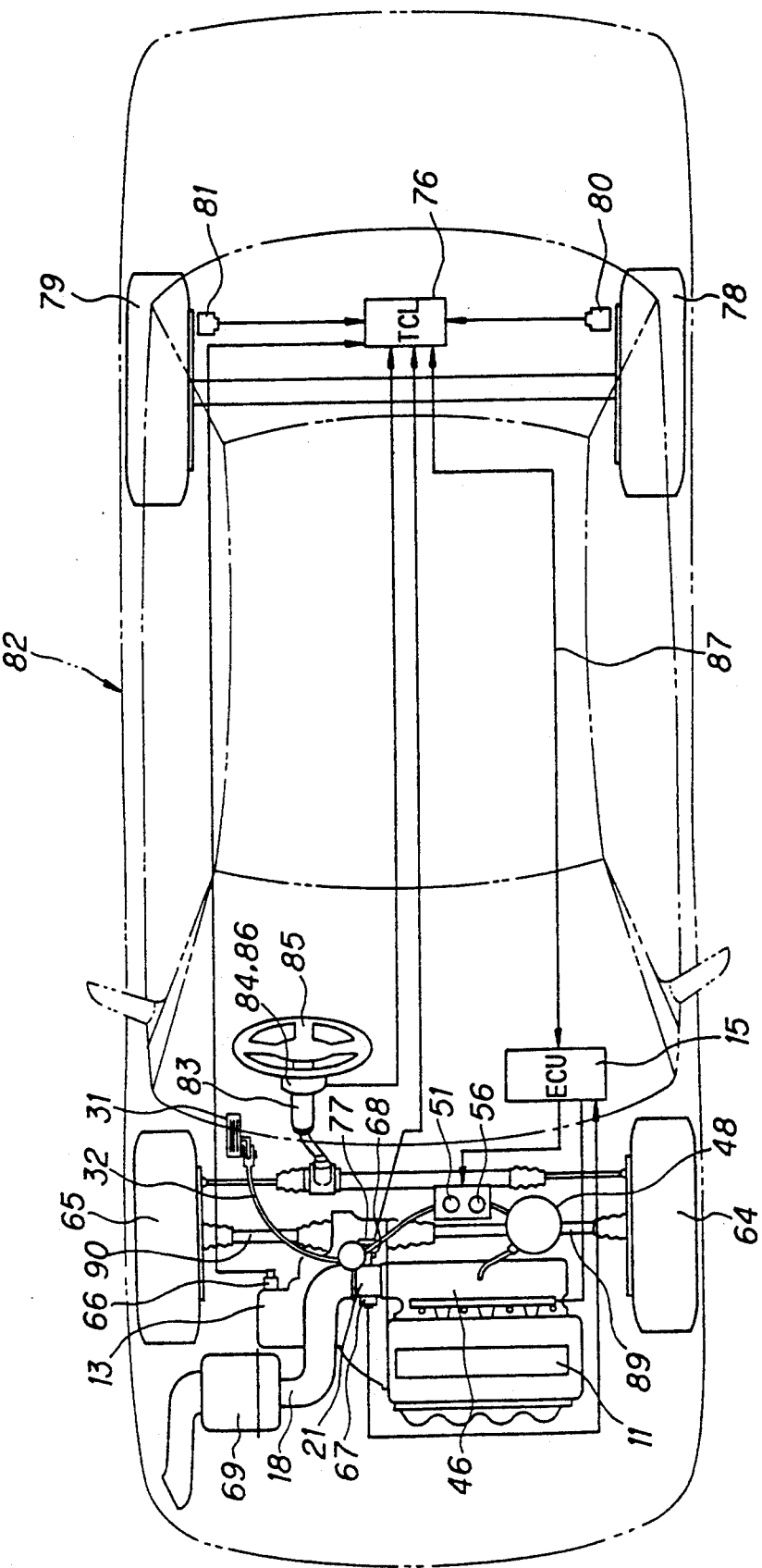
FIG. 29 is a schematic view of its structure.

As shown in FIG. 28 which is a schematic view of this embodiment and FIG. 29 which is a schematic view showing structure of the vehicle, output shaft 12 of engine 11 is connected with input shaft 14 of hydraulic automatic transmission 13. This hydraulic automatic transmission 13 automatically selects a predetermined gear through hydraulic control device 16 according to an instruction from ECU 15, which controls the operation condition of engine 11 according to the position of select lever (not shown) and the operation condition of the vehicle. Detailed structure and functions of hydraulic automatic transmission 13 have already been described, for example, in Japanese Patent Publication Laid-open 58-54270/1983 and Japanese Patent Publication Laid-open 61-31749/1986, hydraulic control device 16 incorporates a pair of shift control electromagnetic valves (not shown) for engagement and releasing of a plurality of frictional engaging elements forming part of hydraulic automatic transmission 13. Further, ECU 15 controls ON/OFF operation of current to these shift control electromagnetic valves to achieve smooth shift operation to a gear of the four forward speeds and single reverse speed.

In this embodiment, the opening of throttle valve 20 is controlled simultaneously by accelerator pedal 31 and actuator 41. However, alternatively, two throttle valves may be connected in series in air intake passage 19, one throttle valve connected to only accelerator pedal 31 and the other throttle valve connected to only actuator 41, so that these throttle valves are controlled independently of one another.

At the downstream end side of air intake pipe 18, fuel injection nozzles 59 of a fuel injection device to inject fuel (not shown) into combustion chamber 17 of engine 11 are provided to the individual cylinders (this embodiment assumes a 4-cylinder internal combustion engine). These are supplied with fuel through electromagnetic valve 60 duty controlled by ECU 15. Thus, the amount of fuel supplied to combustion chamber 17 is controlled by controlling the opening time of electromagnetic valve 60 to a predetermined air/fuel ratio, and the fuel is ignited by ignition plug 61 in the combustion chamber 17.

ECU 15 is connected to crank angle sensor 62 which is mounted to engine 11 to detect the rotation speed of the engine, front wheel rotation sensor 66 which detects the rotation speed of output shaft 63 of hydraulic automatic transmission apparatus 13 to calculate an average peripheral speed of a pair of front wheels 64 and 65 which are driving wheels, throttle opening sensor 67 which is mounted to throttle body 21 to detect the opening of throttle lever 24, idle switch 68 to detect a fully-closed condition of throttle valve 20, air-flow sensor 70 such as a Karman vortex meter incorporated in air cleaner 69 at the front end of air intake pipe 18 to detect the amount of air flowing to combustion chamber 17 of engine 11, water temperature sensor 71 mounted to engine 11 to detect the cooling water temperature of engine 11, exhaust temperature sensor 74 mounted halfway through exhaust pipe 72 to detect the temperature of exhaust gas flowing in exhaust passage 73, and ignition key switch 75.

Output signals from crank angle sensor 62, front wheel rotation sensor 66, throttle opening sensor 67, idle switch 68, air flow sensor 70, water temperature sensor 71, exhaust temperature sensor 74, and ignition key switch 75 are individually transmitted to ECU 15.

To TCL 76 for calculating target driving torque of engine 11, throttle opening sensor 67, accelerator opening sensor 77 mounted to throttle body 21 with throttle opening sensor 67 and idle switch 68, rear wheel rotation sensors 80 and 81 for individually detecting the rotation speeds of a pair of rear wheels 78 and 79 which are driven wheels, steering angle sensor 84 for detecting turning angle of steering shaft 83 during turning with respect to straightforward condition of vehicle 82, and steering shaft reference position sensor 86 for detecting normal phase (including a phase for nearly straightforward running of vehicle 82) at every 360 degrees of steering wheel 85, which is integral with steering shaft 83, are connected, and output signals from these sensors 77, 80, 81, 84, and 86 are individually transmitted.

ECU 15 and TCL 76 are connected through communication cable 87, and ECU 15 transmits operation condition information of engine 11 such as engine rotation speed, rotation speed of output shaft 63 of hydraulic automatic transmission apparatus 13, and detection signal from idle switch 68 to TCL 76. Furthermore, TCL 76 transmits the target driving torque and the regard angle ratio of ignition timing calculated by TCL 76 to ECU 15.

In this embodiment, when slip amounts in the longitudinal direction of front wheels 64 and 65 which are driving wheels are greater than predetermined values, the driving torque of engine 11 is reduced to ensure the operability. Further, a target driving torque of engine 11, when slip control to prevent energy loss is performed, and a target driving torque of engine 11, when turning control is performed, are individually calculated by TCL 76, and an optimum final target driving torque is selected from these two target driving torques, to reduce the driving torque of engine 11 as needed. Also by a full-closing operation of throttle valve 20 through actuator 41, the target retard angle of ignition timing is set, taking into consideration a case when output reduction of engine 11 is not fast enough, to rapidly reduce the driving torque of engine 11.

Figure 30:
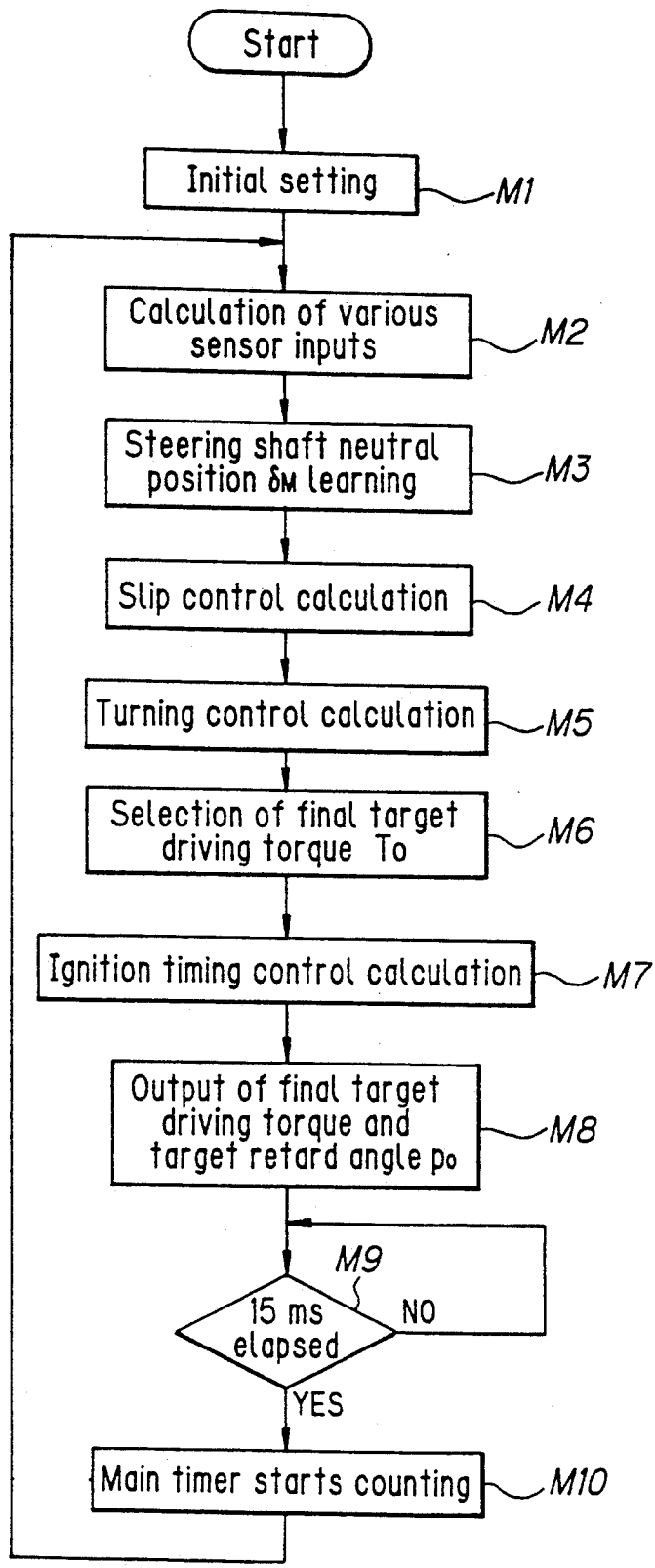
FIG. 30 is a flow chart showing the entire control flow.

As shown in FIG. 30 showing a rough control flow in this embodiment, target driving torque $T_{OS}$, when slip control is performed, and target driving torque $T_{OC}$ of engine 11, when turning control is performed, are always calculated in parallel by TCL 76, and optimum final target driving torque $T_O$ is selected from two target driving torques $T_{OS}$ and $T_{OC}$ to reduce the driving torque of engine 11 as needed.

Specifically, the control program of this embodiment is started by turning on ignition key switch 75, and initially setting such things as the reading of initial value $\delta_{m(o)}$ of steering shaft turning position, resetting of various flags, and starting the counting of a main timer of every 15 milliseconds which is a sampling period of this control, performed in M1.

In M2, TCL 76 calculates vehicle speed V and the like according to detection signals from various sensors, and then learning corrects neutral position $\delta_M$ of steering shaft 83 in M3. Since neutral position $\delta_M$ of steering shaft 83 of vehicle 82 is not stored in a memory (not shown) in ECU 15 or TCL 76, initial value $\delta_{m(o)}$ is read every time ignition key switch 75 is turned on, and learning corrected only when vehicle 82 satisfies a straightforward running condition (described later). Further, initial value $\delta_{m(o)}$ is learning corrected until ignition key switch 75 is turned off.

Then, in M4, TCL 76 calculates target driving torque $T_{OS}$ when slip control is performed to regulate the driving torque of engine 11 according to a detection signal from front wheel rotation sensor 66 and detection signals from rear wheel rotation sensors 80 and 81. In M5, TCL 76 calculates target driving torque $T_{OC}$ of engine 11 when turning control is performed to regulate the driving torque of engine 11 according to detection signals from rear wheel rotation sensors 80 and 81 and a detection signal from steering angle position sensor 84.

Then, in M6, TCL 76 selects optimum final target driving torque $T_O$ from target driving torques $T_{OS}$ and $T_{OC}$ by a method which will be described later, mainly in consideration of safety. Furthermore, when the vehicle starts abruptly or the road condition suddenly changes from a dry state to a frozen state, since output reduction of engine 11 may not occur fast enough when fully closing throttle valve 20 through actuator 41, in M7, a retard angle ratio to correct reference retard angle pB is selected according to change rates Gs of slip amounts of front wheels 64 and 65. Finally, data on final target driving torque $T_O$ and the retard angle ratio of reference retard angle pS, is outputted to ECU 15 in M8.

When the driver prefers slip control or turning control by operating a manual switch (not shown), ECU 15 controls duty ratios of the pair of torque control electromagnetic valves 51 and 56 so that the driving torque of engine 11 is final target driving torque $T_O$, calculates target retard angle pO according to data on retard angle ratio of reference retard angle pS, and retards ignition timing P by target retard angle pO as needed, thereby achieving stable and safe running of vehicle 82.

When the driver does not prefer slip control or turning control and operates a manual switch (not shown), ECU 15 sets duty ratios of the pair of torque control electromagnetic valves 51 and 56 to 0% side, and vehicle 82 is set to an ordinary driving condition according to the amount of pressure applied by the driver to the accelerator pedal 31.

Thus, in M9, the driving torque of engine 11 is controlled until counting down of every 15 seconds, that is, until the sampling period of the main timer is completed. Afterwards, steps from M2 to M10 are repeated until ignition key switch 75 is turned off.

Figure 31:
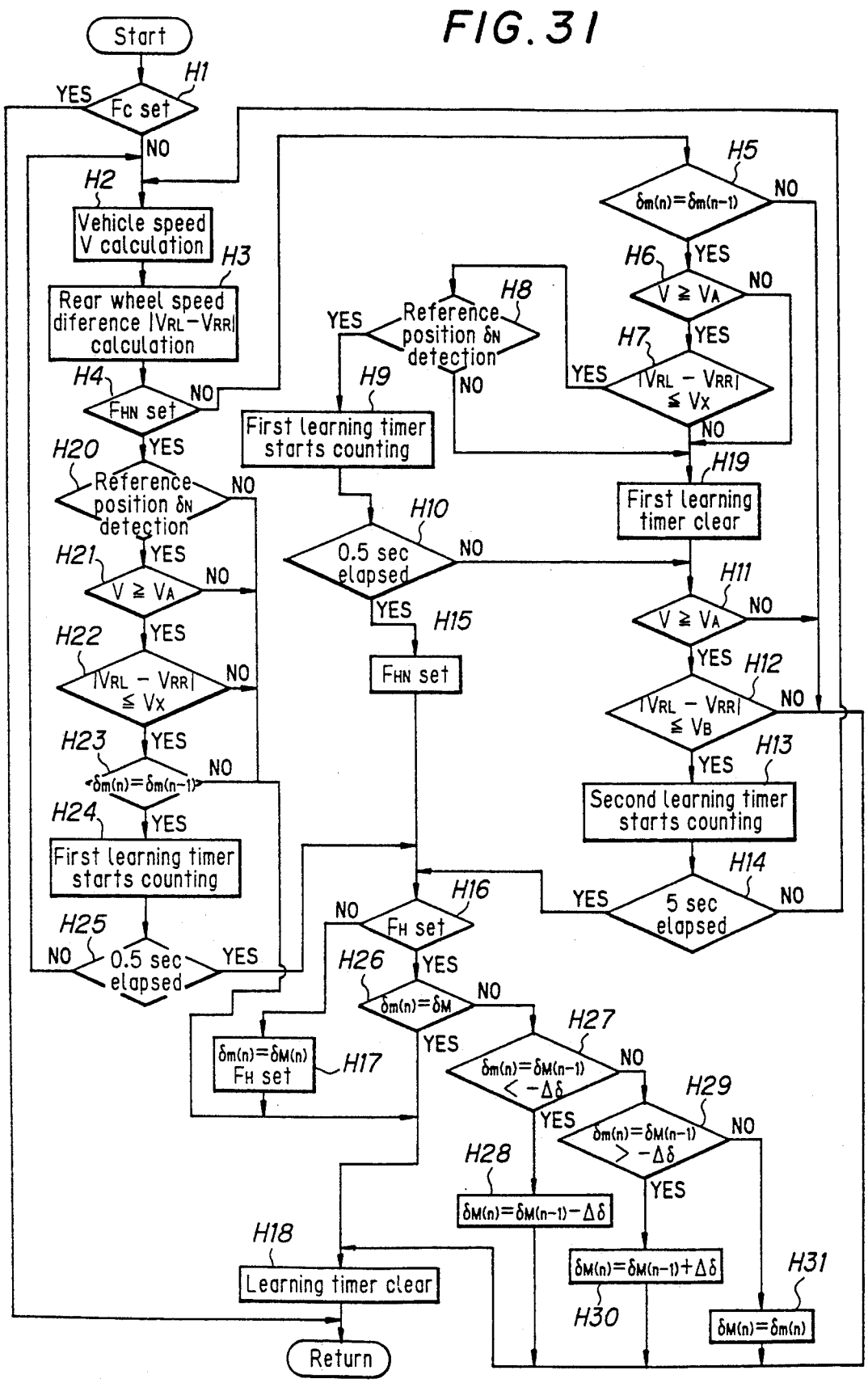
FIG. 31 is a flow chart showing the steering shaft neutral position learning correction flow.

Referring to FIG. 31 showing the procedure of learning and correction of neutral position $\delta_M$ of steering shaft 83, TCL 76 determines in H1 whether or not turning control flag $F_C$ is set. When vehicle 82 is determined as performing turning control in H1, since output of engine 11 may abruptly change due to learning and correction of neutral position $\delta_M$ of steering shaft 83, which may deteriorate drive feeling, learning and correction of neutral position $\delta_M$ of steering shaft 83 is not performed.

On the other hand, when, in step H1, vehicle 82 is determined as not performing turning control, since no deterioration occurs even with learning correction of neutral position $\delta_M$ of steering shaft 83, in H2, TCL 76 learns neutral position $\delta_M$ and calculates vehicle speed V for turning control which will be described later, according to detection signals from rear wheel rotation sensors 80 and 81 by equation (1) above. Then, TCL 76, in H3, calculates rear wheel speed difference $|V_{RL}-V_{RR}|$, and then, determines in H4 whether or not neutral position $\delta_M$ is learning corrected with reference position $\delta_N$ of steering shaft 83 detected by steering shaft reference position sensor 86. That is, it determines whether or not steering angle neutral position learned flag $F_{HN}$, with reference position $\delta_N$ of steering shaft 83 detected, is set.

Immediately after ignition key switch 75 is turned on, since steering angle neutral position learned flag $F_{HN}$ is not set, that is, learning of neutral position $\delta_M$ is that of the first time, it is determined in H5 whether or not presently calculated steering shaft turning position $\delta_{m(n)}$ is equal to previously calculated steering shaft turning position $\delta_{m(n-1)}$. In this case, it is preferable that turning detection resolution of steering angle sensor 84 is set to approximately 5 degrees, so as to minimize effects of driver manipulation error or the like.

When, in step H5, it is determined that presently calculated steering shaft turning position $\delta_{m(n)}$ is equal to previously calculated steering shaft turning position $\delta_{m(n-1)}$, a determination is made in H6 as to whether or not vehicle speed V is greater than a predetermined threshold value $V_A$. This operation is necessary because rear wheel speed difference $|V_{RL}-V_{RR}|$ and the like cannot be detected unless vehicle 82 runs at a high speed, and threshold value $V_A$ is set adequately, for example, to 10 km per hour, through experiments on the running characteristics of vehicle 82.

When, in step H6, it is determined that vehicle speed V is greater than threshold value $V_A$, TCL 76 determines in step H7 whether or not rear wheel speed difference $|V_{RL}-V_{RR}|$ is smaller than predetermined threshold value $V_X$, for example, 0.3 km per hour. That is, it determines whether or not vehicle 82 is running straightforward. The reason why threshold value $V_X$ is not set to 0 km per hour is that, when tire air pressures of rear wheels 78 and 79 are not equal to each other, peripheral speeds $V_{RL}$ and $V_{RR}$ of right and left rear wheels 78 and 79 differ and vehicle 82 is determined as not running straightforward, despite straightforward running of vehicle 82.

Figure 32:
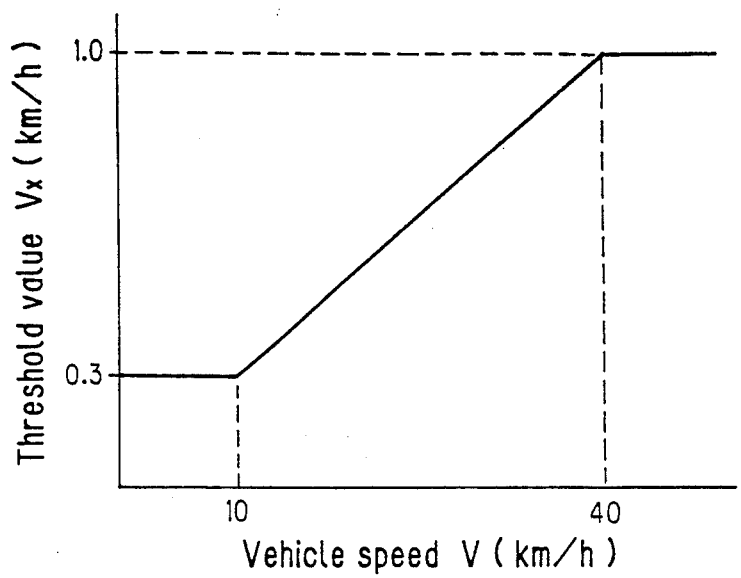
FIG. 32 is a graph showing the relationship between vehicle speed and variable threshold value.

When tire air pressures of right and left rear wheels 78 and 79 are not equal to each other, since rear wheel speed difference $|V_{RL}-V_{RR}|$ tends to increase in proportion to vehicle speed V, threshold value Vx may be graphed, for example, as shown in FIG. 32 and threshold value Vx be read from the graph according to vehicle speed V.

When it is determined in step H7 that rear wheel speed difference $|V_{RL}-V_{RR}|$ is smaller than threshold value Vx, a determination is made in H8 as to whether or not steering shaft reference position sensor 86 detects reference position $\delta_N$ of steering shaft 83. When, in step H8, it is determined that steering shaft reference position sensor 86 detects reference position $\delta_N$ of steering shaft 83, that is, vehicle 82 is determined as running straightforward, counting of a first learning timer (not shown) built in TCL 76 is started in H9.

Then TCL 76 determines in H10 whether or not 0.5 seconds has elapsed from the starting of counting of the first learning timer, that is, whether or not straightforward running of vehicle 82 has continued for 0.5 seconds. When 0.5 seconds has not elapsed from the starting of counting of the first learning timer, a determination is made in H11 as to whether or not vehicle speed V is greater than threshold value $V_A$. When it is determined in H11 that vehicle speed V is greater than threshold value $V_A$, a determination is made in H12 as to whether or not rear wheel speed difference $|V_{RL}-V_{RR}|$ is smaller than threshold value $V_B$, such as 0.1 km per hour. When, in step H12, it is determined that rear wheel speed difference $|V_{RL}-V_{RR}|$ is smaller than threshold value $V_B$, that is, when vehicle 82 is determined as running straightforward, counting of a second learning timer (not shown) built in TCL 76 is started in H13.

Then, in H14, a determination is made as to whether or not 5 seconds has elapsed from the starting of counting of the second learning timer, that is, whether or not straightforward running of vehicle 82 has continued for 5 seconds. When 5 seconds has not elapsed from the starting of counting of the second learning timer, the procedure reverts back to step H2 and procedures from step H2 to step H14 are repeated.

In step H8, halfway through the repetition, when it is determined that steering shaft reference position sensor 86 detects reference position $\delta_N$ of steering shaft 83, the first learning timer starts counting in H9. When it is determined in H10 that 0.5 seconds has elapsed from the starting of counting of the first learning timer, that is, the straightforward running of vehicle 82 has continued for 0.5 seconds, steering angle neutral position learned flag $F_{HN}$ is set in H15 with reference position $\delta_N$ of steering shaft 83 detected. Subsequently, in H16, a determination is made as to whether or not steering angle neutral position learned flag $F_H$ is set with reference position $\delta_N$ of steering shaft 83 not detected. Also, when it is determined in step H14 that 5 seconds has elapsed from the starting of counting of the second learning timer, processing proceeds to step H16.

Since, in the above procedures, steering angle neutral position learned flag $F_H$ is not set in the state where reference position $\delta_N$ is not detected, in step H16, it is determined that steering angle neutral position learned flag $F_H$ is not set in the state where reference position $\delta_N$ is not detected. Thus, learning of neutral position $\delta_M$ is, for the first time, in the state where reference position $\delta_N$ of steering shaft 83 is not detected. In H17, present steering shaft turning position $\delta_{m(n)}$ is regarded as neutral position $\delta_{M(n)}$ of steering shaft 83, which is stored in a memory in TCL 76. Further, steering angle neutral position learned flag $F_H$, in the state where reference position $\delta_N$ of steering shaft 83 is not detected, is set.

After neutral position $\delta_{M(n)}$ of steering shaft 83 is set, turning angle $\delta_H$ of steering shaft 83 is calculated with respect to neutral position $\delta_M$ of steering shaft 83. The count of learning timer is then cleared in H18. Finally, steering angle neutral position learning is again performed.

When it is determined, in step H5, that presently calculated steering shaft turning position $\delta_{m(n)}$ is not equal to previously calculated steering shaft turning position $\delta_{m(n-1)}$; or, when it is determined in step H11 that vehicle speed V is not above threshold value $V_A$, that is, rear wheel speed difference $|V_{RL}-V_{RR}|$ calculated in step H12 is not reliable; or, when it is determined in step H12 that rear wheel speed difference $|V_{RL}-V_{RR}|$ is greater than threshold value $V_B$, it is determined that vehicle 82 is not running straight forward, and processing proceeds to step H18.

When it is determined in step H7 that rear wheel speed difference $|V_{RL}-V_{RR}|$ is greater than threshold value Vx; or, when it is determined in step H8 that steering shaft reference position sensor 86 does not detect reference position $\delta_N$ of steering shaft 83, count of the first learning timer is cleared in H19, and processing proceeds to step H11. Further, when it is determined in step H6 that vehicle speed V is smaller than threshold value $V_A$, since the vehicle 82 cannot be determined as running straightforward, processing also proceeds to step H11.

On the other hand, when it is determined in step H4 that steering angle neutral position learned flag $F_{HN}$ is set with reference position $\delta_N$ of steering shaft 83 detected, that is, the learning of neutral position $\delta_H$ is that of at least the second time, a determination is made in H20 as to whether or not steering shaft reference position sensor 86 detects reference position $\delta_N$ of steering shaft 83. When it is determined in step H20 that steering shaft position sensor 86 detects reference position $\delta_N$ of steering shaft 83, a determination is made in H21 as to whether or not vehicle speed V is greater than predetermined threshold value $V_A$.

When it is determined in step H21 that vehicle speed V is greater than threshold value $V_A$, TCL 76 determines in step H22 whether or not rear wheel speed difference $|V_{RL}-V_{RR}|$ is smaller than threshold value Vx, that is, whether or not vehicle 82 is running straightforward. When it is determined in step H22 that rear wheel speed difference $|V_{RL}-V_{RR}|$ is smaller than threshold value Vx, a determination is made in H23 as to whether or not presently calculated steering shaft turning position $\delta_{m(n)}$ is equal to previously calculated steering shaft turning position $\delta_{m(n-1)}$. When it is determined in step H23 that presently calculated steering shaft turning position $\delta_{m(n)}$ is equal to previously calculated steering shaft turning position $\delta_{m(n-1)}$, the first learning timer starts counting in H24.

Then, TCL 76 in H25 determines whether or not 0.5 seconds has elapsed from the staring of counting of the first learning timer, that is, whether or not the straightforward running of vehicle 82 has continued for 0.5 seconds. When 0.5 seconds has not elapsed from the starting of counting of the first learning timer, the procedure reverts back to step H2, and steps H2 to H4, and H20 to H25 are repeated. To the contrary, when 0.5 seconds has elapsed from the starting of counting of the first learning timer, the procedure proceeds to step H16.

When it is determined in step H20 that steering shaft reference position sensor 86 does not detect reference position δN of steering shaft 83; or, when it is determined in step H21 that vehicle speed V is not greater than threshold value VA, that is, rear wheel speed difference |VRL−VRR| calculated in step H22 is not reliable; or, when it is determined in step H22 that rear wheel speed difference |VRL−VRR| is greater than threshold value VX; or, in step H23 it is determined that presently calculated steering shaft turning position δm(n) is not equal to previously calculated steering shaft turning position δm(n−1), the procedure proceeds to step H18.

When, in step H16, it is determined that steering angle neutral position learned flag FH is set, that is, learning of neutral position δM is that of at least the second time, TCL 76 determines in H26 whether or not present steering shaft turning position δm(n) is equal to previous neutral position δM(n−1) of steering shaft 83. In other words, it is determined whether or not $$\delta_{m(n)} = \delta_{M(n-1)}.$$

When it is determined that present steering shaft turning position δm(n) is equal to previous neutral position δM(n−1) of steering shaft 83, the procedure proceeds to step H18 where next steering angle neutral position is learned.

When, in step H26, it is determined that present steering shaft turning position δm(n) is not equal to previous neutral position δM(n−1) of steering shaft 83 due to play or the like in the steering system, in this embodiment, present steering shaft turning position δm(n) is not regarded as it is as neutral position δM(n) of steering shaft 83. However, when the absolute value of a difference between these values is greater than a predetermined correction limit Δδ, correction limit Δδ is subtracted from, or added to, previous steering shaft turning position δm(n−1) to obtain a new neutral δM(n) of steering shaft 83, which is stored in a memory in TCL 76.

TCL 76 determines in H27 whether or not steering shaft turning position δm(n), subtracted by neutral position δM(n−1), is smaller than a predetermined negative correction limit −Δδ. When, in step H27, it is determined that the subtracted value is smaller than negative correction limit −Δδ, in H28, new neutral position δM(n) of steering shaft 83 is changed to $$\delta_{M(n)} = \delta_{M(n-1)} - \Delta\delta,$$

from previous neutral position δM(n−1) of steering shaft 83 and negative correction limit Δδ, to prevent the learning and correction amount, at one time, from unconditionally becoming a large negative value.

With this arrangement, even when an abnormal signal is outputted from steering angle sensor 84 for some reason, neutral position δM does not change rapidly, and measures to correct this abnormality can be taken immediately.

On the other hand, when, in step H27, it is determined that the subtracted value is greater than negative correction limit −Δδ, a determination is made in H29 as to whether or not present steering shaft turning position δm(n) subtracted by neutral position δM(n−1) of steering shaft 83 is greater than positive correction limit Δδ. When, in step H29, it is determined that the subtracted value is greater than positive correction limit Δδ, in H30, new neutral position δM(n) of steering shaft 83 is changed to $$\delta_{M(n)} = \delta_{M(n-1)} + \Delta\delta,$$

from previous neutral position δM(n−1) of steering shaft 83 and positive correction limit Δδ, to prevent the learning and correction amount, at one time, from unconditionally becoming a large positive value.

With this arrangement, even when an abnormal signal is outputted from steering angle sensor 84 for some reason, neutral position δM does not change rapidly, and measures to correct this abnormality can be taken immediately.

However, when it is determined in step H29 that the subtracted value is smaller than positive correction limit Δδ, in H31, present steering shaft turning position δm(n) is read, as is, as neutral position δM(n) of steering shaft 83.

As described above, in this embodiment, when learning and correcting the neutral position δM of steering shaft 83, in addition to the use of only rear wheel speed difference |VRL−VRR|, a detection signal from steering shaft reference position sensor 86 can also be used to learning correct the neutral position δM of steering shaft 83, a relatively short time after starting vehicle 82. Further, even when steering shaft reference position sensor 86 malfunctions for some reason, neutral position δM of steering shaft 83 can be learning corrected with only rear wheel speed difference |VRL−VRR|, thus providing improved safety.

After neutral position δM of steering shaft 83 is learning corrected, target driving torque Tos for slip control to regulate driving torque of engine 11 is calculated according to detection signals from front wheel rotation sensor 66 and rear wheel rotation sensors 80 and 81.

Since a friction coefficient between the tire and the road surface can be regarded as equivalent to the rate of change in vehicle speed V (hereinafter referred to as longitudinal direction acceleration) GX applied to vehicle 82, in this embodiment, longitudinal direction acceleration GX is calculated according to detection signals from rear wheel rotation sensors 80 and 81. Further, reference driving torque TB of engine 11 corresponding to a maximum value of longitudinal direction acceleration GX is corrected according to a difference between front wheel speed VF detected by front wheel rotation sensor 66 and target front wheel speed VO corresponding to vehicle speed V (hereinafter referred to as slip amount), to calculate target driving torque Tos.

Figure 33:
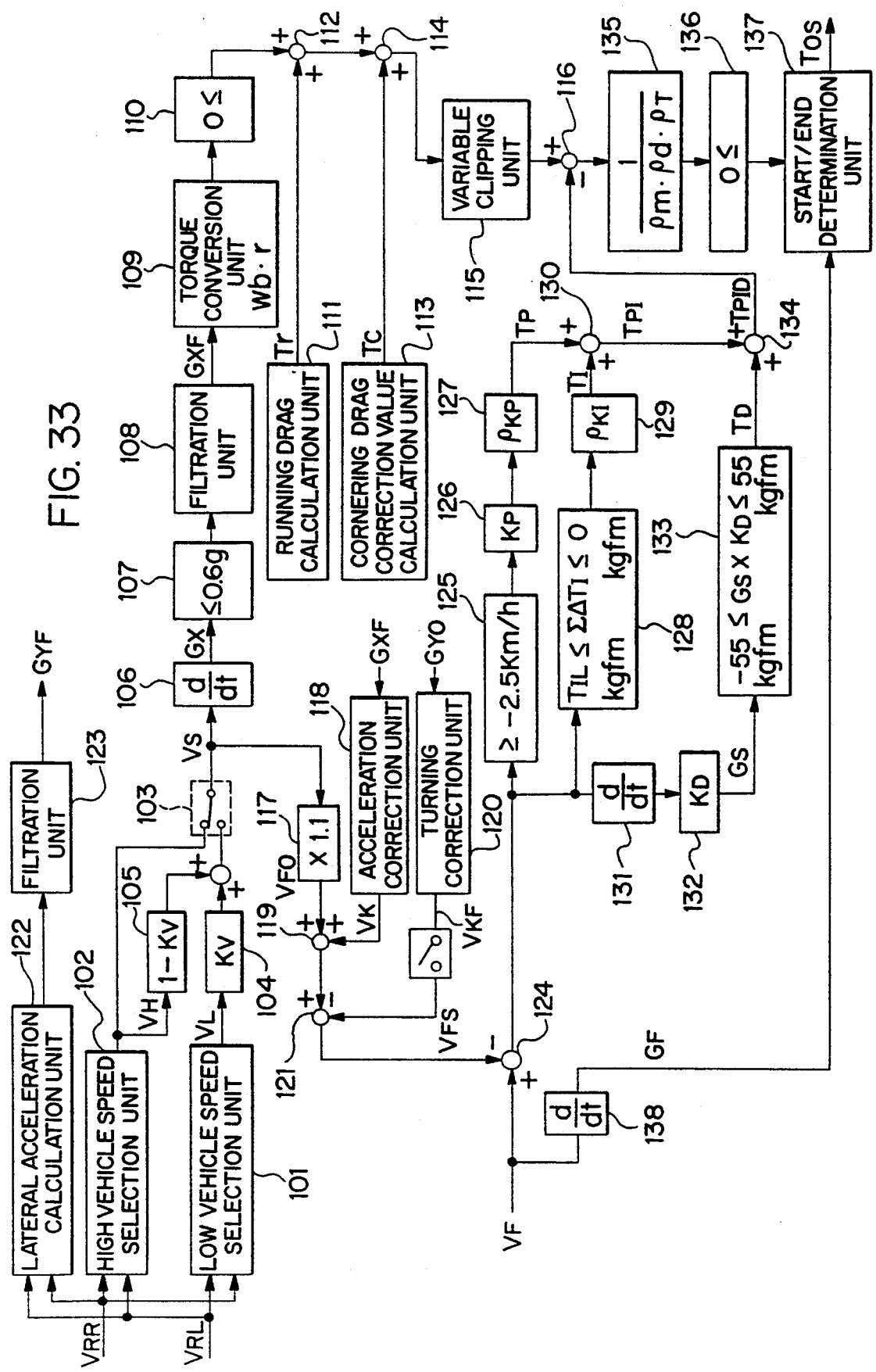
FIG. 33 is a block diagram showing the slip control target driving torque calculation procedure.

Referring to FIG. 33, illustrating a calculation block diagram to calculate target driving torque Tos of engine 11, TCL 76 first calculates vehicle speed Vs for slip control according to detection signals from rear wheel rotation sensors 80 and 81. Specifically, in this embodiment, the smaller value of the two rear wheel speeds VRL and VRR is selected as a first vehicle speed Vs by low vehicle speed selection unit 101, the greater value of the two rear wheel speeds VRL and VRR is selected as a second vehicle speed Vs by high vehicle speed selection unit 102, and the output of one of the two selection units 101 and 102 is further selected by select switch 103.

In this embodiment, first vehicle speed Vs selected by low vehicle speed selection unit 101 is obtained by multiplying the smaller value VL of the two rear wheel speeds VRL and VRR, in multiplication unit 104, by a weighting factor KV corresponding to vehicle speed V calculated by equation (1), and adding a product of the greater value VH of the two rear wheel speeds VRL and VRR multiplied, in multiplication unit 105, by (1−KV).

Thus, when the driving torque of engine 11 is actually reduced by slip control, that is, when slip control flag Fs is set, whichever value of the two rear wheel speeds VRL and VRR is smaller is selected as vehicle speed VS by select switch 103. Further, when the driving torque of engine 11 is not reduced, that is, when slip control flag Fs is reset, whichever value of the two rear wheel speeds VRL and VRR is greater is selected as vehicle speed VS, even if the driver desires slip control.

This is to make it difficult for the driving torque of engine 11 to move from an unreduced state to a reduced state, and, at the same time, also to make the reverse movement difficult. For example, this is to prevent such a case wherein, when the smaller value of the two rear wheel speeds VRL and VRR, occurring during turning of vehicle 82, is selected as vehicle speed VS, it may be determined as an occurrence of a slip even no slip occurs in front wheels 64 and 65. Thus, the driving torque of engine 11 is reduced. Further, once the driving torque of engine 11 is reduced, this state is continued in view of running safety of vehicle 82.

When vehicle speed VS is calculated in low vehicle speed selection unit 101, the reason why the smaller value VL, of the two rear wheel speeds VRL and VRR, is multiplied in multiplication unit 104 by weighting factor KV and added with the greater value VH of the two rear wheel speeds VRL and VRR, multiplied in multiplication unit 105 by (1−KV), to calculate vehicle speed VS is that, when, for example, running on a small curvature road such as that which occurs when turning to the right or left at a crossroad, an average value of the peripheral speeds of front wheels 64 and 65 largely differs from the smaller value VL of the two rear wheel speeds VRL and VRR, and the driving torque correction by feedback tends to become too large, thereby deteriorating acceleration of vehicle 82.

Figure 34:
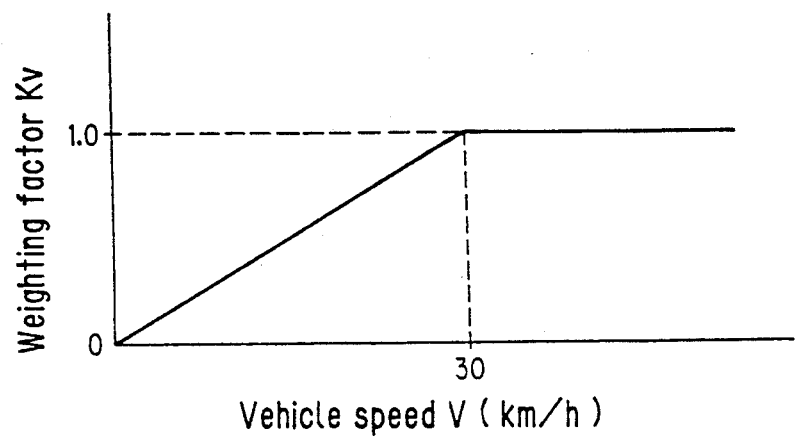
FIG. 34 is a graph showing the relationship between vehicle speed and correction factor.

In this embodiment, weighting factor KV is read from a graph shown in FIG. 34 according to vehicle speed V of equation (1), which is an average value of the peripheral speeds of rear wheels 78 and 79.

To calculate longitudinal direction acceleration GX according to the thus calculated vehicle speed VS for slip control, first, present running acceleration GX(n) of vehicle 82 is calculated in differentiation unit 106 from presently calculated vehicle speed VS(n) and previously calculated vehicle speed VS(n−1) by the following equation:

$$G_{X(n)} = \frac{V_{S(n)} - V_{S(n-1)}}{3.6 \cdot \Delta t \cdot g}.$$

When the calculated longitudinal direction acceleration GX(n) is more than 0.6 g, longitudinal direction acceleration GX(n) is clipped by clipping unit 107 so that a maximum value of longitudinal direction acceleration GX(n) does not exceed 0.6 g in view of safety reduction from miscalculation or the like. Furthermore, filtering occurs by filtration unit 108 to remove noise and allow calculation of corrected longitudinal direction acceleration GXF.

This filtration is to correct longitudinal direction acceleration GX(n) so that slip rate S of the tires is maintained at target slip rate So, or at a smaller value within its vicinity, corresponding to a maximum value of a friction coefficient between the tire and road surface. This occurs even when a maximum value of longitudinal direction acceleration GX(n) of vehicle 82 varies and slip rate S of the tires tends to come out of target slip rate So, or of a smaller value within its vicinity, corresponding to the maximum value of a friction coefficient between the tire and road surface. This is because longitudinal direction acceleration GX(n) of vehicle 82 can be regarded as equivalent to the friction coefficient between the tire and road surface. This is performed as follows.

When present longitudinal direction acceleration GX(n) is greater than the filtered previously corrected longitudinal direction acceleration GXF(n−1), that is, when vehicle 82 continues increasing speed, the present corrected longitudinal direction acceleration GXF(n) is delayed as $$G_{XF(n)} = \frac{28}{256} \cdot \Sigma(G_{X(n)} - G_{XF(n-1)})$$

to remove noise, causing corrected longitudinal direction acceleration GXF(n) to follow longitudinal direction acceleration GXF(n) relatively rapidly.

When the present longitudinal direction acceleration GX(n) is less than filtered previous corrected longitudinal direction acceleration GXF(n−1), that is, when vehicle 82 is not increasing speed, the following treatment is made every sampling period Δt of the main timer.

When slip control flag Fs is not set, that is, when the driving torque of engine 11 is not reduced by slip control, vehicle 82 is decreasing speed, and reduction of corrected longitudinal direction acceleration GXF(n) is suppressed as $$G_{XF(n)} = G_{XF(n-1)} - 0.002.$$

This thereby ensures a response to the driver's demand to increase the speed of vehicle 82.

Also when the driving torque of engine 11 is reduced by slip control, and slip amount s is positive, that is, when a slip occurs in front wheels 64 and 65, since vehicle 82 is decreasing speed and has no safety problem, reduction of corrected longitudinal direction acceleration GXF is suppressed as $$G_{XF(n)} = G_{XF(n-1)} - 0.002.$$

This thereby ensures a response to the driver's demand to increase the speed of vehicle 82.

Furthermore, when the driving torque of engine 11 is reduced by slip control and slip amount s of front wheels 64 and 65 is negative, that is, when vehicle 82 is decreasing speed, the maximum value of corrected longitudinal direction acceleration GXF is maintained. This thereby ensures a response to the driver's demand to increase the speed of vehicle 82.

Similarly, when the driving torque of engine 11 is reduced by slip control, and hydraulic automatic transmission 13 is shifting up by hydraulic control device 16, the maximum value of corrected longitudinal direction acceleration GXF is maintained to ensure a feeling of acceleration for the driver.

Corrected longitudinal direction acceleration GXF with noise reduced by filtration unit 108 is torque converted by torque conversion unit 109. Since the value calculated by torque conversion unit 109 should be a positive value, the value is clipped to that above zero by clipping unit 110 to prevent miscalculation. Further, running drag TR, calculated by running drag calculation unit 111, is added by addition unit 112. Further, cornering drag correction torque TC, calculated by cornering drag correction value calculation unit 113 according to a detection signal from steering angle sensor 84, is added by addition unit 114, to calculate reference driving torque TB by equation (4):

$$T_B = G_{FO} \cdot W_b \cdot r + T_R + T_C \qquad (18).$$

Figure 35:
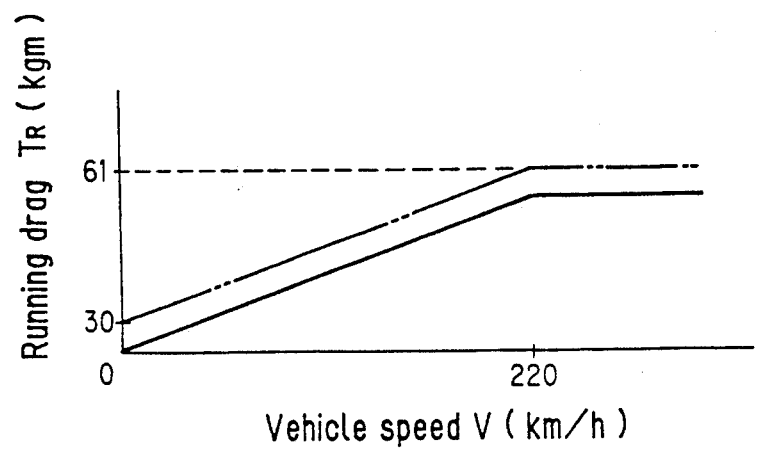
FIG. 35 is a graph showing the relationship between vehicle speed and running drag.

Running drag TR can be calculated as a function of vehicle speed V. However, in this embodiment, it is determined from a graph as shown in FIG. 35. In this case, since running drag TR differs between a level road and an ascending slope, the graph contains a solid line curve for a level road and a two-dot-bar curve for an ascending road. One of these is selected according to a detection signal from an inclination sensor (not shown) incorporated in vehicle 82. However, running drag TR can also be set in detail by including a descending slope and the like.

Figure 36:
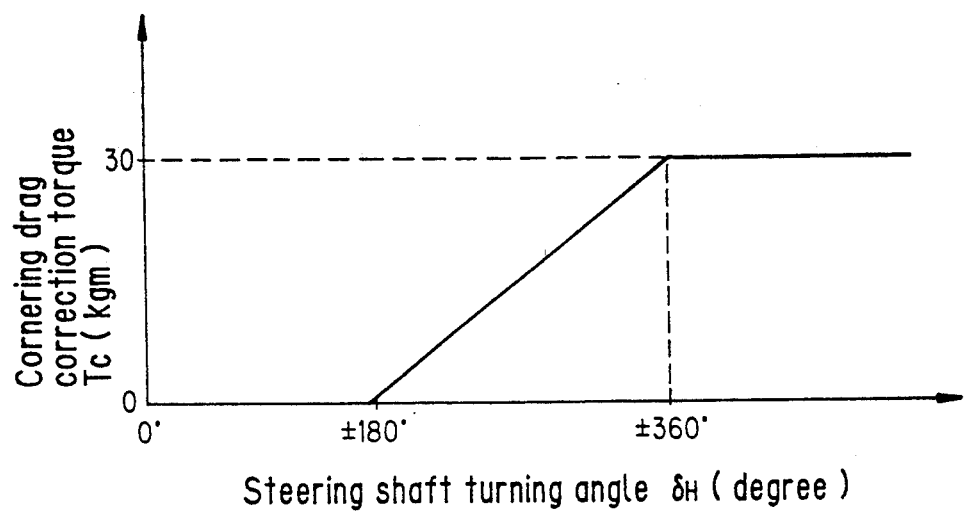
FIG. 36 is a graph showing the relationship between steering shaft turning amount and correction torque.

In this embodiment, cornering drag correction torque TC is determined from a graph as shown in FIG. 36, which can set reference driving torque TB of engine 11 approximate to the actual running condition. Reference torque TB of engine 11, immediately after passing through a curve, is set slightly higher, thereby improving the feeling of acceleration of vehicle 82 after passing through a curved road.

Figure 37:
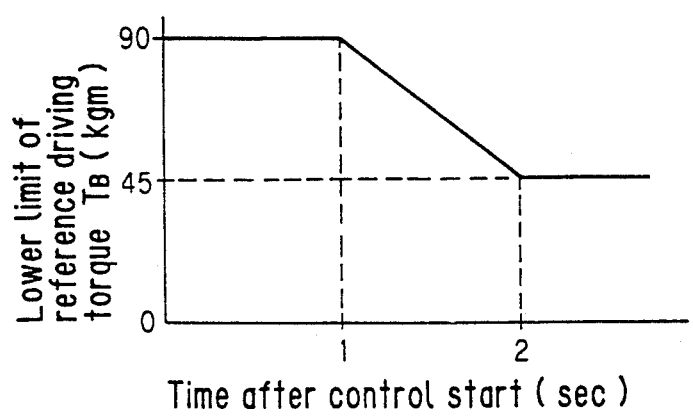
FIG. 37 is a graph for regulating the lower limit of target driving torque immediately after beginning slip control.

For reference driving torque TB calculated by equation (18), in this embodiment, a lower limit value is set by variable clipping unit 115 to prevent reference driving torque TB, subtracted by final correction torque TPID (described later) by subtraction unit 116, from becoming a negative value. The lower limit value for reference driving torque TB is reduced, step by step over time, from the beginning of slip control, as shown in a graph in FIG. 37.

TCL 76 calculates actual front wheel speed VF according to a detection signal from front wheel rotation sensor 66. Further, as previously described, by feedback control of reference driving torque TOS using slip amount s, which is a difference between target front wheel speed VFO set according to front wheel speed VF and vehicle speed VS for slip control and target front wheel speed VFS for correction torque calculation, calculates target driving torque TOS of engine 11.

To achieve effective utilization of the driving torque generated in engine 11 during acceleration of vehicle 82, as shown by solid lines in FIG. 7, it is preferable to adjust slip rate S of the tires of front wheels 64 and 65, during running, to a smaller then, or a value within the vicinity of target slip rate SO corresponding to the friction coefficient between the tire and road surface, thereby preventing energy loss and preventing operability and acceleration performance from being deteriorated.

Since it is known that target slip rate SO fluctuates in the range from 0.1 to 0.25 depending on the road condition, it is preferable to generate a slip amount s of about 10% in front wheels 64 and 65, as driving wheels, to the road surface during running of vehicle 82. In view of the above, target front wheel speed VFO is set by multiplication unit 117 as follows:

$$V_{FO} = 1.1 \cdot V.$$

Figure 38:
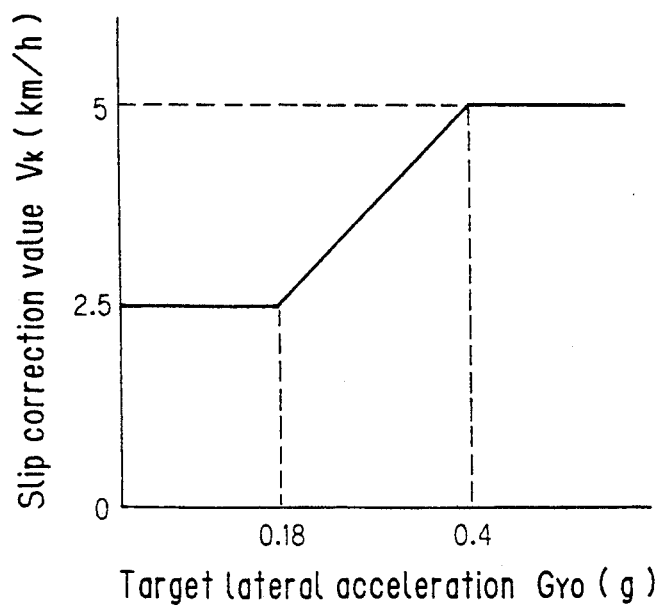
FIG. 38 is a graph showing the relationship between target lateral acceleration and slip correction amount associated with acceleration.

TCL 76 reads slip correction amount VK corresponding to previously described corrected longitudinal direction acceleration GXF from a graph as shown in FIG. 38 by acceleration correction unit 118, and adds it to reference torque calculation target front wheel speed VFO in addition unit 119. Slip correction amount VK has a tendency to increase, step by step, as corrected longitudinal direction acceleration GXF increases. Further, in this embodiment, this graph is prepared through running experimental tests or the like.

As a result, correction torque calculation target front wheel speed VFS is increased, and slip rate S during acceleration is set to target slip rate SO shown by solid lines in FIG. 7 or to a smaller value within its vicinity.

On the other hand, referring to the dot-bar lines in FIG. 7 showing the relationship between the friction coefficient between the tire and road surface during turning and the slip rate S of the tire, it can be seen that slip rate S of the tire, which becomes the maximum value of the friction coefficient between the tire and road surface during turning, is far smaller than target slip rate SO of the tire, which becomes a maximum value of the friction coefficient between the tire and road surface during straightforward running. Therefore, during turning of vehicle 82, it is preferable to set target front wheel speed VFO to a value smaller value than that of straightforward running, so that vehicle 82 can make smooth turning.

Figure 39:
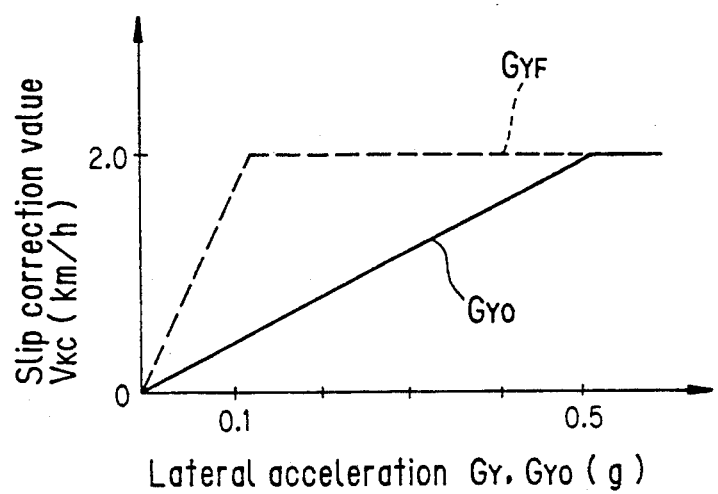
FIG. 39 is a graph showing the relationship between lateral acceleration and slip correction amount associated with turning.

Then, slip correction value VKC corresponding to target lateral acceleration GYO is read from a graph as shown by solid lines in FIG. 39 by turning correction unit 120, and the result is subtracted from reference torque calculation target front wheel speed VFO in subtraction unit 121. This is, provided, however, that before the first learning of neutral position δM of steering shaft 83 is made after ignition key switch 75 is turned on, turning angle δH of steering shaft 83 is not reliable, and slip correction value VKC is read from a graph as shown by broken lines in FIG. 39 according to lateral acceleration GY actually applied to vehicle 82 by peripheral speeds VRL and VRR of rear wheels 78 and 79.

Target lateral acceleration GYO is determined by calculating steering angle δ by equation (8) according to a detection signal from steering angle sensor 84 and calculating from steering angle δ by equation (9), and neutral position δM is learning corrected.

Therefore, when an abnormality occurs in steering angle sensor 84 or steering shaft reference position sensor 86, target lateral acceleration GYO may become a very wrong value. Then, when an abnormality occurs in steering angle sensor 84 or the like, actual lateral acceleration GY generated in vehicle 82 is calculated by using the rear wheel speed difference $|V_{RL} - V_{RR}|$, which is used in place of target lateral acceleration GYO.

Specifically, actual lateral acceleration GY is calculated from the rear wheel speed difference $|V_{RL} - V_{RR}|$ and vehicle speed V by lateral acceleration calculation unit 122, incorporated in TCL 76 using equation (19) below, and noise filtered by filtration unit 123 into corrected lateral acceleration GYF which is used.

$$G_Y = \frac{|V_{RL} - V_{RR}| \cdot V}{3.6^2 \cdot b \cdot g} \qquad (19)$$

In filtration unit 123, present corrected lateral acceleration $G_{YF(n)}$ is low-pass filtered by the following digital calculation from presently calculated lateral acceleration $G_{Y(n)}$ and previously calculated corrected lateral acceleration $G_{YF(n-1)}$.

$$G_{YF(n)} = \Sigma \frac{20}{256} \{G_{Y(n)} - G_{YF(n-1)}\}$$

Figure 40:
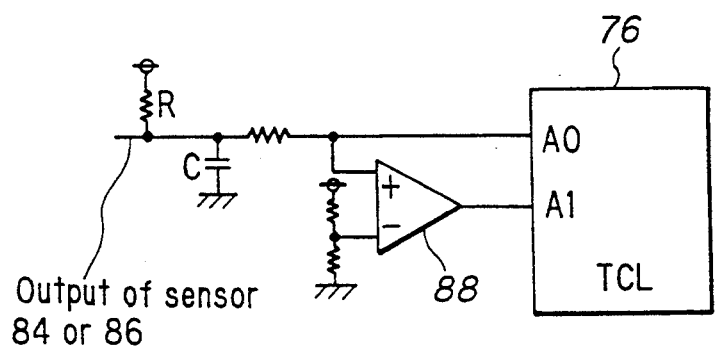
FIG. 40 is a circuit diagram for detecting abnormality of steering angle sensor.

Whether or not an abnormality occurs in steering angle sensor 84 or steering shaft reference position sensor 86, can be detected by TCL 76, for example, using an open circuit detection circuit or the like as shown in FIG. 40. Specifically, output of steering angle sensor 84 and steering shaft reference position sensor 86 is pulled up by resistor R and grounded by capacitor C, and the output is inputted to terminal AO of TCL 76 for use in various controls, and also to terminal A1 through comparator 88. The negative terminal of comparator 88 is applied with a reference voltage of 4.5 V. When an open circuit occurs in steering angle sensor 84, input voltage to terminal AO exceeds the reference value, the comparator is turned on, and input voltage to terminal A1 is continuously at high level H. The program of TCL 76 is set so that when the input voltage to terminal A1 is at high level H for a predetermined period of time, for example, 2 seconds, it is determined as an open circuit. This thereby detects an occurrence of an abnormality of steering angle sensor 84 or steering shaft reference position sensor 86.

In the above-described embodiment, an abnormality of steering angle sensor 84 or the like is detected by hardware. However, such an abnormality can naturally be detected by software.

Figure 41:
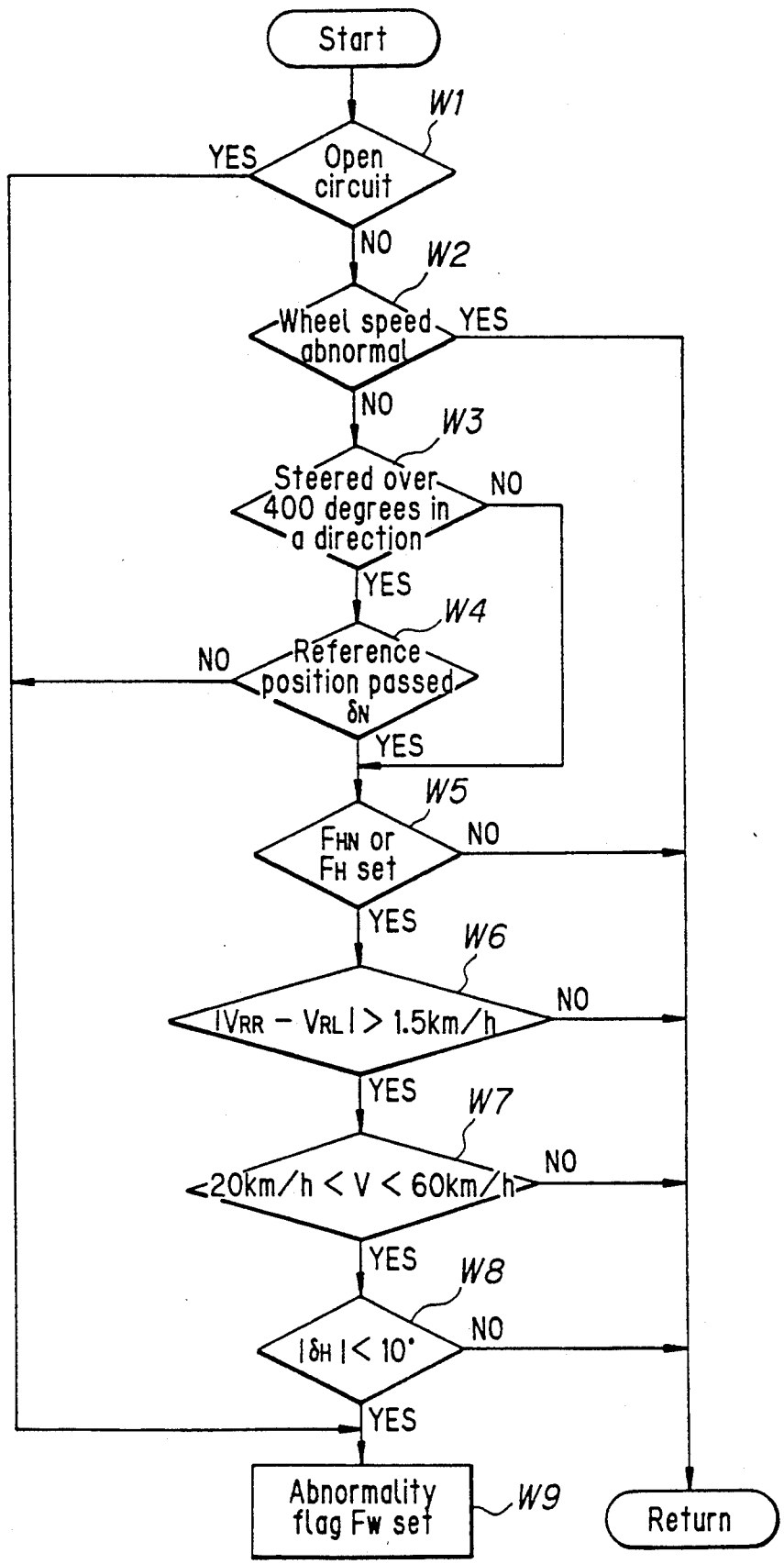
FIG. 41 is a flow chart showing abnormality detection flow of steering angle sensor.

For example, referring to FIG. 41 showing an example of an abnormality detection procedure, TCL 76 first detects an abnormality by an open circuit as shown in FIG. 40 in W1. When it is not determined to be an abnormality, it is then determined in W2 whether or not there is an abnormality in front wheel rotation sensor 66 and rear wheel rotation sensors 80 and 81. When, in step W2, rotation sensors 66, 80, and 81 are determined as not having an abnormality, a determination is made in W3 as to whether or not steering shaft 83 has rotated more than one turn, for example, more than 400 degrees, in the same direction. When it is determined in step W3 that steering shaft 83 has been steered more than 400 degrees in the same direction, a determination is made in W4 as to whether or not there is a signal to notice reference position $\delta_N$ of steering shaft 83 from steering shaft reference position sensor 86.

When, in step W4, it is determined that there is no signal to notice reference position $\delta_N$ of steering shaft 83, since there should be at least one signal to notice reference position $\delta_N$ of steering shaft 83 if steering shaft reference position sensor 86 is normal, steering angle sensor 84 is determined as being abnormal in W4, and an abnormality occurrence flag $F_W$ is set.

When, in step W3, it is determined that steering shaft 83 has not been steered more than 400 degrees in the same direction, or when, in step W4, it is determined that there is a signal to notice reference position $\delta_N$ of steering shaft 83 from steering shaft reference position sensor 86, a determination is made in W6 as to whether or not neutral position $\delta_M$ has been learned. That is, it is determined whether or not at least one of the two steering angle neutral position learned flags, $F_{HN}$ or $F_H$, is set.

When, in step W6, it is determined that learning of neutral position $\delta_M$ of steering shaft 83 has finished, and when it is determined that in W7 that rear wheel speed difference $|V_{RL} - V_{RR}|$ exceeds, for example, 1.5 km per hour, vehicle speed V is between, for example, 20 km per hour and 60 km per hour in W8, and absolute value of turning angle $\delta_H$ of steering shaft 83 is, for example, less than 10 degrees in W9, that is, when vehicle 82 is turning at a certain degree of speed, the absolute value of turning angle $\delta_H$ should be more than 10 degrees if steering angle sensor 84 is functioning normally, then steering angle sensor 84 is determined as being abnormal in W10.

Figure 42:
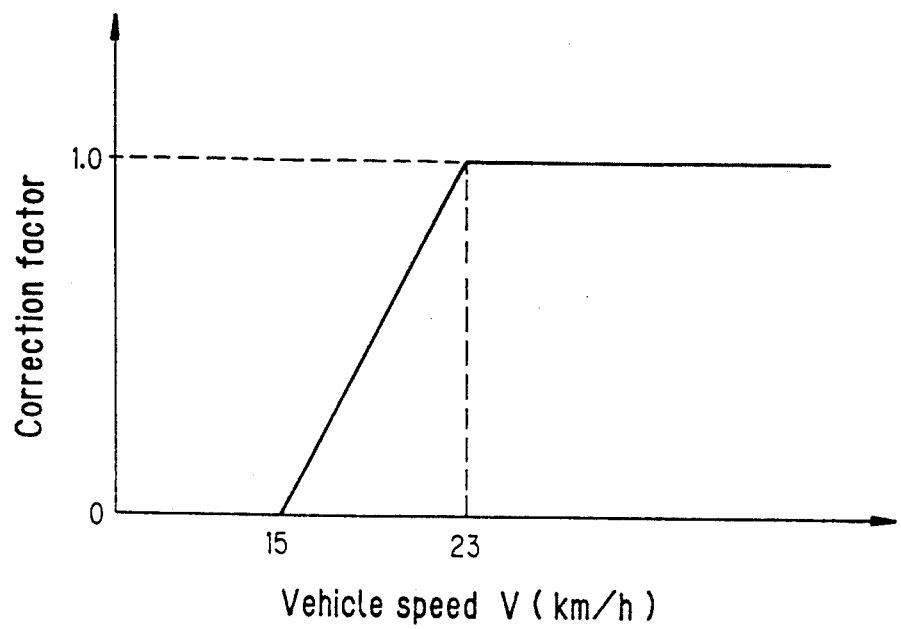
FIG. 42 is a graph showing the relationship between vehicle speed and correction factor.

Slip correction amount $V_{KC}$ corresponding to target lateral acceleration $G_{YO}$ is set to a value smaller than slip correction amount $V_{KC}$ corresponding to corrected lateral acceleration $G_{YF}$ in the range of small target lateral acceleration $G_{YO}$ in view of an additional turning of steering wheel 85 by the driver. Since it is preferable to ensure acceleration of vehicle 82 in the range of small vehicle speed V, and, to the contrary, it is necessary to consider ease of turning at a vehicle speed V of more than a certain value, slip correction amount $V_{KC}$ read from FIG. 39 is multiplied by a correction factor corresponding to vehicle speed V read from the graph of FIG. 42, to calculate corrected slip correction amount $V_{KF}$.

This reduces correction torque calculation target front wheel speed $V_{FO}$, slip rate S during turning becomes smaller than target slip rate $S_O$ during straightforward running, and acceleration performance of vehicle 82 becomes slightly lowered, but good turning performance is assured.

Figure 43:
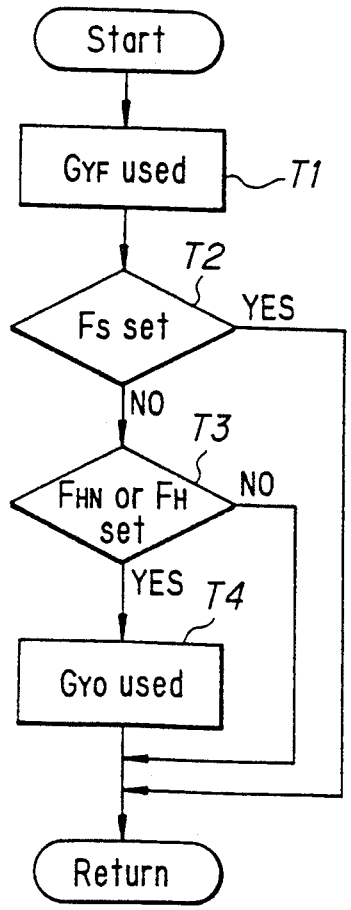
FIG. 43 is a flow chart showing the flow of the lateral acceleration selection procedure.

Referring to FIG. 43 showing the selection procedure of target lateral acceleration $G_{YO}$ and actual lateral acceleration $G_Y$, TCL 76 adopts in T1 corrected lateral acceleration $G_{YF}$ from filtration unit 123 as lateral acceleration to calculate slip correction amount $V_{KC}$. A determination is then made in T2 as to whether or not slip control flag $F_S$ is set.

When, in step T2, it is determined that slip control flag $F_S$ is set, corrected lateral acceleration $G_{YF}$ is adopted. This is because, when lateral acceleration to determine slip correction amount $V_{KC}$ is changed from corrected lateral acceleration $G_{YF}$ to target lateral acceleration $G_{YO}$, slip correction amount $V_{KC}$ tends to be largely changed and the behavior of vehicle 82 tends to become disturbed.

When, in step T2, it is determined that slip control flag $F_S$ is not set, a determination is made in T3 as to whether or not any one of two steering angle neutral position learned flags $F_{HN}$ and $F_H$ is set. In this case, when both steering angle neutral position learned flags $F_{HN}$ and $F_H$ are determined as not being set, corrected lateral acceleration $G_{YF}$ is adopted, as is. When it is determined in step T3 that one of steering angle neutral position learned flags $F_{HN}$ and $F_H$ is set, target lateral acceleration $G_{YO}$ is adopted as the lateral acceleration to calculate slip correction amount $V_{KC}$ in T4.

As a result, target front wheel speed $V_{FS}$ for correction torque calculation is $$V_{FS} = V_{FO} + V_K - V_F.$$

Then, slip amount s, which is the difference between actual front wheel speed $V_F$ obtained from filtration to remove noise from the detection signal from front wheel rotation sensor 66, and correction torque calculation target front wheel speed VFS, is calculated by reduction unit 124. When slip amount s is less than the negative setting value, for example, −2.5 km per hour, the −2.5 km per hour is clipped as slip amount s in clipping unit 125, and the clipped slip amount s is subjected to proportional correction described later. This prevents overcontrol in proportional correction and the occurrence of hunting in the output.

Furthermore, slip amount s before clipping is integration corrected using $\Delta T_I$, to be described later, and then is differentiation corrected to calculate final correction torque $T_{PID}$.

Figure 44:
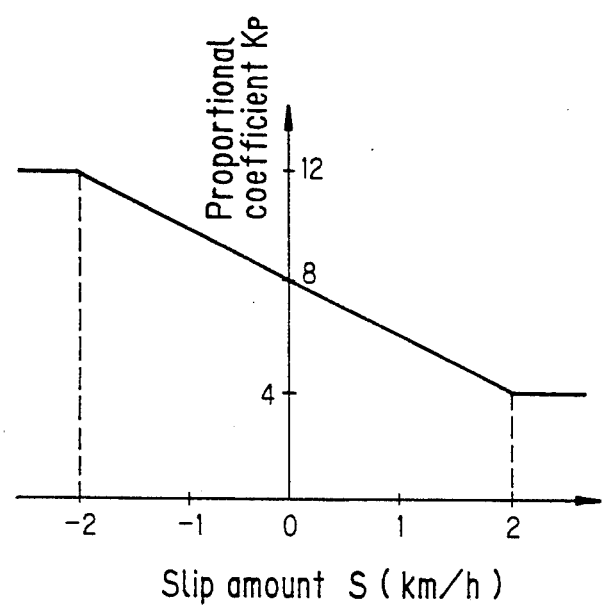
FIG. 44 is a graph showing the relationship between slip amount and proportional coefficient.

In the proportional correction, slip amount s is multiplied by proportional coefficient $K_P$ in multiplication unit 126 to obtain a basic correction amount. It is then multiplied in multiplication unit 127 by correction factor $\rho_{KP}$, previously set from speed change ratio $\rho_m$ of hydraulic automatic transmission 13, to obtain proportional correction torque $T_P$. Proportional coefficient $K_P$ is read from a graph shown in FIG. 44 according to clipped slip amount s.

To achieve correction according to moderate changes in slip amount s as the integration correction, a basic correction amount is calculated by integration calculation unit 128, and the correction amount is multiplied by correction factor $\rho_{KI}$ predetermined according to speed change ratio $\rho_m$ of hydraulic automatic transmission 13 in multiplication unit 129 to obtain integration correction torque $T_I$. In this embodiment, constant small integration correction torque $\Delta T_I$ is integrated, and small integration correction torque $\Delta T_I$ is added when slip amount s is positive, every 15-millisecond sampling period, or, small integration correction torque $\Delta T_I$ is subtracted when slip amount s is negative.

Figure 45:
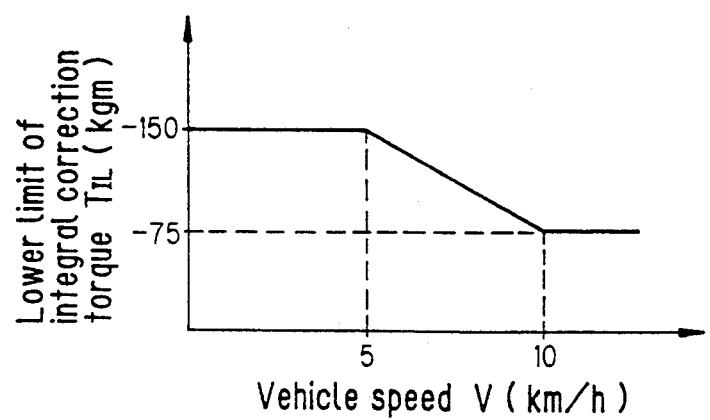
FIG. 45 is a graph showing the relationship between vehicle speed and the lower limit of integral correction torque.

However, for this integration correction torque $T_I$ is set to lower limit value $T_I$ as shown in a graph in FIG. 45 which is variable according to vehicle speed V. By this clipping, large integration correction torque $T_I$ is applied at the starting of vehicle 82, especially at the start of an ascending slope, to ensure the driving torque of engine 11. Further, when vehicle speed V is increased after the starting of vehicle 82, integration correction torque $T_I$ is reduced because control tends to become unstable if correction is too large. Furthermore, an upper limit value, for example, 0 kgm, is set to enhance the convergence of control, and integration torque $T_I$ varies as shown in FIG. 46 by this clipping.

The thus calculated proportional correction torque $T_P$ is added to integration correction torque $T_I$ in addition unit 130 to calculate proportional integration correction torque $T_{PI}$.

Figures 46, 47:
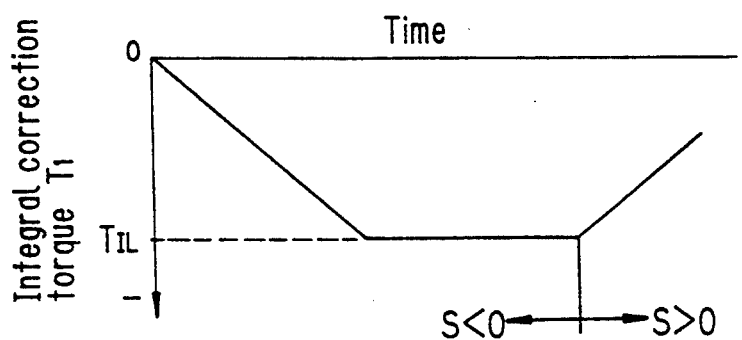
FIG. 46 is a graph showing a variable region of integral correction torque.
FIG. 47 is a graph showing the relationship between various speeds of a hydraulic automatic transmission and correction factors corresponding to various correction torques.

Correction factors $\rho_{KP}$ and $\rho_{KI}$ are read from a graph as shown in FIG. 47, which is previously set in relation to speed change ratio $\rho_m$ of hydraulic automatic transmission 13.

Furthermore, in this embodiment, changing rate $G_S$ of slip amount s is calculated in differentiation calculation unit 131, and multiplied by differentiation coefficient $K_D$ in multiplication unit 132 to calculate a basic correction amount for rapid changes in slip amount s. Further, an upper limit value and a lower limit value are individually set for the above obtained value, and differentiation correction torque $T_D$ is clipped in clipping unit 133 to prevent it from becoming an extremely large value, to obtain differentiation correction torque $T_D$. Since, during the running of vehicle 82, wheel speeds $V_F$, $V_{RL}$, and $V_{RR}$ may become instantaneously skidded or locked, depending on the road condition or the running condition of vehicle 82, changing rate $G_S$ of slip amount s may become an extremely larger positive or negative value. Further, control tends to diverge, resulting in degraded response. The lower limit value is clipped, for example, to −55 kgm and the upper limit value clipped to 55 kgm, to prevent the differentiation correction torque $T_D$ from becoming to extremely large in value.

Thereafter, proportional integration correction torque $T_{PI}$ is added to differentiation correction torque $T_D$ in addition unit 134, resulting final correction torque $T_{PID}$ is subtracted in subtraction unit 116 from reference driving torque $T_B$, and further multiplied in multiplication unit 135 by a reciprocal of the total reduction ratio between engine 11 and wheel shafts 89 and 90 of front wheels 64 and 65, to obtain target driving torque $T_{OS}$ for slip control shown in equation (20) below:

$$T_{OS} = \frac{T_B - T_{PID}}{\rho_m \cdot \rho_d \cdot \rho_T}. \tag{20}$$

In the equation (20), $\rho_d$ is a differential gear reduction ratio, and $\rho_T$ is a torque converter ratio, and, when hydraulic automatic transmission 13 performs an up-shift operation, speed change ratio $\rho_m$ of the high speed gear side is outputted after the completion of the speed shift operation. That is, during up-shift operation of hydraulic automatic transmission 13, if speed change ratio $\rho_m$ of the high speed gear side is adopted at the output of speed shift signal, as can be seen from equation (20), target driving torque $T_{OS}$ tends to increase, resulting in racing of the engine 11 during the speed change. So, from the output of a signal to begin speed change, to the completion of the speed shift operation, for example, for 1.5 second, speed change ratio $\rho_m$ of the low speed gear side can be maintained where a low target driving torque $T_{OS}$ is maintained, and, speed change ratio $\rho_m$ of high speed gear side is adopted 1.5 second after the output of the speed shift starting signal. For the same reason, during a down-shift operation of hydraulic automatic transmission 13, speed change ratio $\rho_m$ of the low speed side is immediately adopted at the time the speed change signal is outputted.

Since target driving torque $T_{OS}$ calculated by equation (6) should naturally be a positive value, target driving torque $T_{OS}$ is clipped to a value above zero in clipping unit 136 in order to prevent miscalculation. Information on target driving torque $T_{OS}$ is outputted to ECU15 according to determination processing in start/end determination unit 137 to determine the start or end of slip control.

Start/end determination unit 137 determines the start of slip control when all conditions of (a) through (e) below are met, sets slip control flag $F_S$, operates select switch 103 to select the output from low vehicle speed selection unit 101 as slip control vehicle speed $V_S$, outputs information on target driving torque $T_{OS}$ to ECU 15, determines the end of slip control, and repeats the procedures until the end of slip control is determined and slip control flag $F_S$ is reset.

(a) The driver desires slip control by operating a manual switch (not shown).

(b) Driving torque $T_d$ required by the driver is greater than the smallest torque necessary to run vehicle 82, for example, 4 kgm or more.

In this embodiment, required driving torque $T_d$ is read from a graph as shown in FIG. 16 previously set according to engine rotation speed NE calculated from a detection signal from crank angle sensor 62 and accelerator opening θA calculated from a detection signal from accelerator opening sensor 76.

(c) Slip amount s is more than 2 km per hour.

(d) Changing rate Gs of slip amount s is more than 0.2 g.

(e) Actual front wheel acceleration GF, which is actual front wheel speed VF time-differentiated in differentiation calculation unit 138 is more than 0.2 g.

When any of the conditions of (f) and (g) below is met, after start/end determination unit 137 determines start of slip control, it is determined as the completion of slip control, slip control flag Fs is reset, transmission of target driving torque Tos to ECU 15 is discontinued, and select switch 103 is operated to select the output from high vehicle speed selection unit 102 as the vehicle speed Vs for slip control.

(f) A condition in which target driving torque Tos is more than required driving torque Td, and slip amount s is less than a predetermined value, for example, less than −2 kg per hour has continued for more than a predetermined period of time, for example, more than 0.5 seconds.

(g) A condition in which idle switch 68 is turned from off to on, that is, the driver releases accelerator pedal 31, has continued for more than a predetermined period of time, for example, more than 0.5 seconds.

Vehicle 82 is provided with a manual switch (not shown) for the driver to select slip control, and, when the driver operates this manual switch to select slip control, the following slip control operation is carried out.

Figure 48:
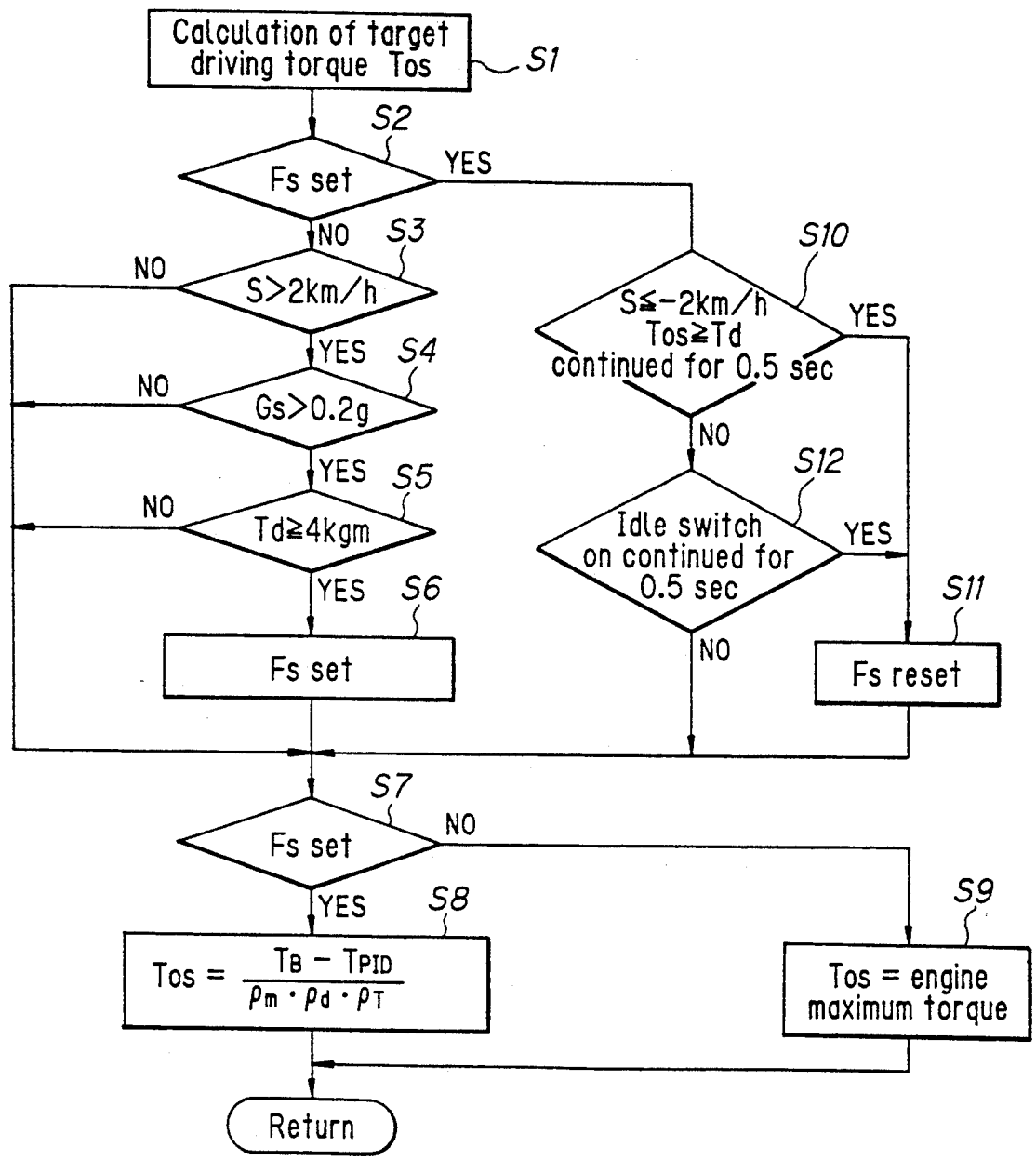
FIG. 48 is a flow chart showing slip control flow.

Referring to FIG. 48 which shows the slip control flow, TCL 75 in S1 calculates target driving torque Tos by the detection of the above-described various data and calculation, but this calculation operation is performed independently from operation of the manual switch.

Then, in S2, a determination is made as to whether or not slip control flag Fs is set. However, since a slip control flag Fs is not initially set, TCL 76 determines in S3 whether or not slip amount s of front wheels 64 and 65 is greater than a predetermined threshold value, for example, 2 km per hour.

When, in step S3, it is determined that slip amount s is greater than 2 km per hour, TCL 76 determines in S4 whether or not changing rate Gs of slip amount s is greater than 0.2 g.

In this step S4, when it is determined that slip amount changing rate Gs is greater than 0.2 g, TCL 76 determines in S5 whether or not driver's required driving torque Td is greater than a minimum driving torque necessary to run vehicle 82, for example, greater than 4 kgm. That is, it determines whether or not the driver intends to run vehicle 82.

When, in step S5, it is determined that the required driving torque Td is greater than 4 kgm, that is, the driver intends to run vehicle 82, slip control flag Fs is set in S6, and a determination is again made in S7 as to whether or not slip control flag Fs is set.

When, in step S7, it is determined that slip control flag Fs is set, slip control target driving torque Tos, previously calculated by equation (20), is adopted in S8 as target driving torque Tos for engine 11.

When, in step S7, it is determined that slip control flag Fs is reset, TCL 76 in S9 outputs a maximum torque of engine 11 as target driving torque Tos, thereby reducing the duty ratio of torque control electromagnetic valves 51 and 56 to the 0% side. As a result, engine 11 outputs a driving torque according to the amount of pressure applied to the accelerator pedal 31 by the driver.

When, in step S3, it is determined that slip amount s of front wheels 64 and 65 is smaller than 2 km per hour; or, in step S4, it is determined that slip amount changing rate Gs is smaller than 0.2 g; or, in step S5, it is determined that required driving torque Td is smaller than 4 kgm, the processing goes to step S7. Further, in step S9, TCL 76 outputs the maximum torque of engine 11 as target driving torque Tos, and ECU 15 reduces the duty ratio of torque control electromagnetic valves 51 and 56 to the 0% side. As a result, engine 11 generates a driving torque according to the amount of pressure applied to the accelerator pedal 31 by the driver.

On the other hand, when, in step S2, it is determined that slip control flag Fs is set, a determination is made in S10 as to whether or not the condition that slip amount s of front wheels 64 and 65 is below −2 km, which is the above-described threshold value, and as to whether the required driving torque Td is below target driving torque Tos, calculated in S1, and has continued for 0.5 seconds or more.

When, in step S10, it is determined that the condition that slip amount s is smaller than 2 km per hour and the required driving torque Td is below target driving torque Tos and has continued for 0.5 seconds or more, that is, the driver no longer requires acceleration of vehicle 82, in step S11, slip control flag Fs is reset, and processing proceeds to step S7.

When, in step S10, it is determined that the condition that slip amount s is greater than 2 km per hour, or the condition that the required driving torque Td is below target driving torque Tos, and has not continued for 0.5 seconds or more, that is, the driver requires acceleration of vehicle 82, TCL 76 in S12 determines whether or not the condition that idle switch 68 is on, that is, throttle valve 20 is fully closed, has continued for 0.5 seconds or more.

When, in step S12, it is determined that idle switch 68 is on, since the driver is not pressing down on accelerator pedal 31, processing proceeds to step S11 where slip control flag Fs is reset. To the contrary, when it is determined that idle switch 68 is off, since the driver is pressing down on accererator pedal 31, processing again proceeds to step S7.

When the driver does not operate the manual switch to select slip control, TCL 76 calculates slip control target driving torque Tos, and then calculates the target driving torque of engine 11 for turning control.

Lateral acceleration GY of vehicle 82 can be actually calculated by equation (11) using rear wheel speed difference $|V_{RL} - V_{RR}|$. However, since lateral acceleration GY applied to vehicle 82 can be forecast using steering shaft turning angle δH, rapid control can be achieved.

Specifically, for turning control of vehicle 82, TCL 76 calculates target lateral acceleration GYO of vehicle 82 from steering shaft turning angle δH and vehicle speed V, and an acceleration in the longitudinal direction of vehicle 82 of non-extreme under-steering. That is, the target longitudinal direction acceleration GXO is set according to the target lateral acceleration GYO. Further, target driving torque TOC of engine 11 corresponding to this target longitudinal direction acceleration GXO is calculated.

Figure 49:
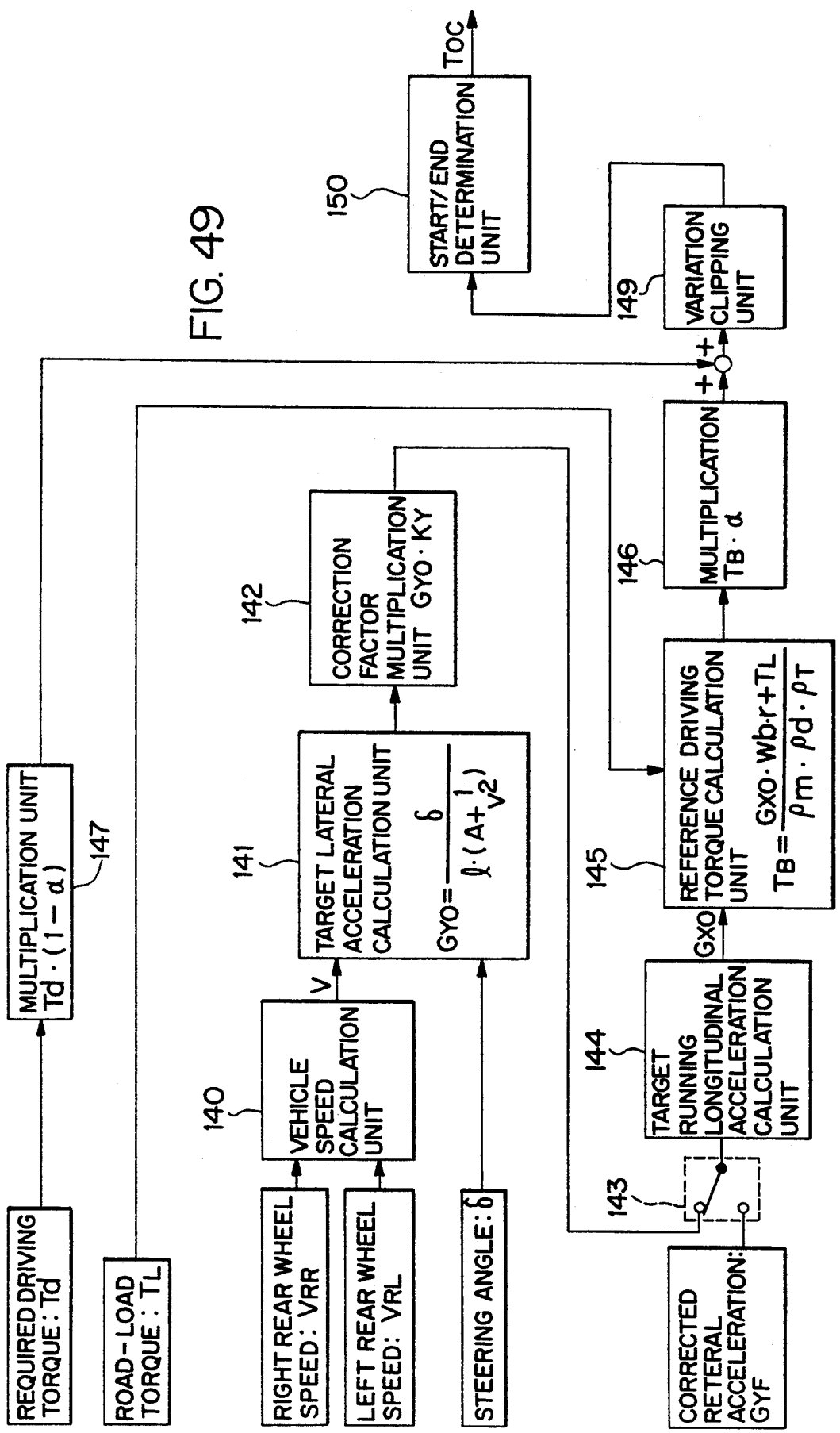
FIG. 49 is a block diagram showing turning control target driving torque calculation procedure.
Figure 50:
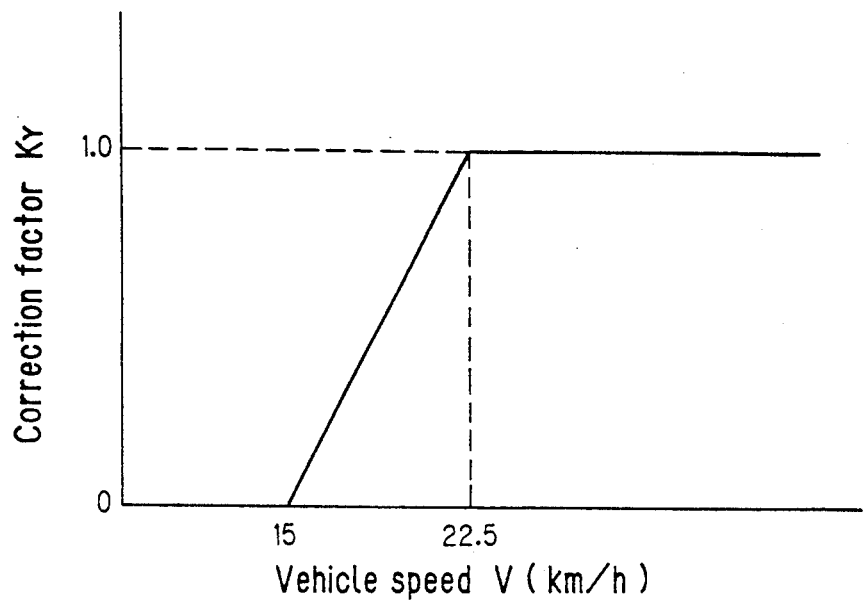
FIG. 50 is a graph showing the relationship between vehicle speed and correction factor.

As shown in FIG. 49 which is a turning control calculation block diagram, TCL 76 calculates vehicle speed V in vehicle speed calculation unit 140 by equation (1) from the output of a pair of rear wheel rotation sensors 80 and 81, and further calculates steering angle $\delta$ of front wheels 64 and 65 by equation (8) according to a detection signal from steering angle sensor 84. Also, in target lateral acceleration calculation unit 141, target lateral acceleration $G_{YO}$ of vehicle 82, at this time, is also calculated by equation (9). In this case, in an area of small vehicle speed V, for example, less than 15 km per hour, sufficient turning can be achieved only by the driver's manipulation, and it is often better, in view of safety, to prohibit turning control, since a sufficient acceleration can be obtained when turning to the right or left at crowded crossroads. Therefore, in this embodiment, in correction factor multiplication unit 142, target lateral acceleration $G_{YO}$ is multiplied by correction factor $K_Y$ as shown in FIG. 27, according to vehicle speed V.

Since, in the state where learning of steering shaft neutral position $\delta_H$ is not performed, it is problematic in view of reliability to calculate target lateral acceleration $G_{YO}$ by equation (9) according to steering angle $\delta$, it is desirable not to start turning control until learning of steering shaft neutral position $\delta_H$ is performed. When vehicle 82 traverses a curved road immediately after the beginning of running, vehicle 82 requires turning control. However, since the learning start condition of steering angle neutral position is not readily satisfied, a problem occurs in that turning control is not yet started. Then, in this embodiment, select switch 143 is operated to enable turning control using corrected lateral acceleration $G_{YF}$ from filtration unit 123 by equation (19), until learning of steering shaft neutral position $\delta_H$ is performed. Thus, when both steering angle neutral position learned flags $F_{HN}$ and $F_H$ are reset, corrected lateral acceleration $G_{YF}$ is selected by select switch 143. Further, when at least one of steering angle neutral position learned flags $F_{HN}$ and $F_H$ is set, target lateral acceleration $G_{YO}$ from correction factor multiplication unit 142 is selected by select switch 143.

For a slippery road surface such as frozen road, which is a low $\mu$ road, stability factor A may be set, for example, to about 0.005. In this case, since target lateral acceleration $G_{YO}$ is greater than actual lateral acceleration $G_Y$ on a low $\mu$ road, a determination is made as to whether or not target lateral acceleration $G_{YO}$ is greater than a predetermined threshold value, for example, $(G_{YF}-2)$. Further, when target lateral acceleration $G_{YO}$ is greater than the threshold value, vehicle 82 is determined as running on a low $\mu$ road. Thus, low $\mu$ road turning control may be performed as needed. Specifically, by adding 0.05 g to corrected lateral acceleration $G_{YF}$ calculated by equation (19), a determination is made as to whether or not target lateral acceleration $G_{YO}$ is greater than a predetermined threshold value since target lateral acceleration $G_{YO}$ is greater than actual lateral acceleration $G_y$ on a low $\mu$ road. When it is determined that target lateral acceleration $G_{YO}$ is greater than the threshold value, vehicle 82 is determined as running on a low $\mu$ road.

Figure 51:
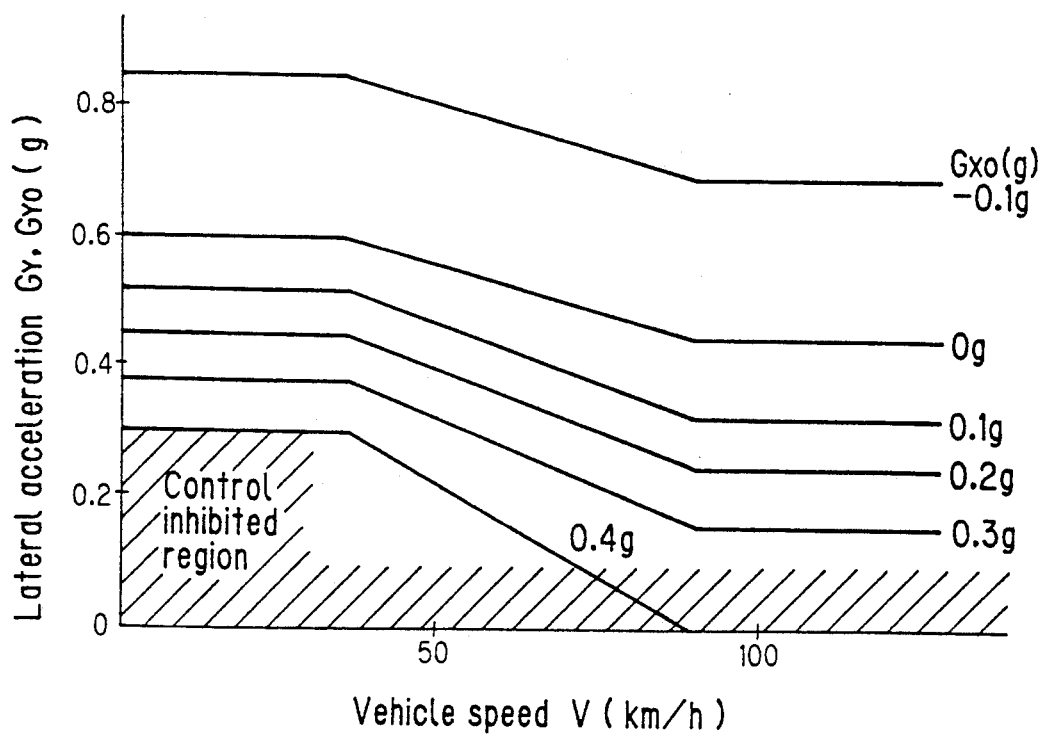
FIG. 51 is a graph showing the relationship between target lateral acceleration, target longitudinal direction acceleration and the vehicle.

After target lateral acceleration $G_{YO}$ is thus calculated, target longitudinal direction acceleration $G_{XO}$ of vehicle 82 previously set according to target lateral acceleration $G_{YO}$ and vehicle speed V is read by target longitudinal direction acceleration calculation unit 144 from a graph as shown in FIG. 51 which is previously stored in TCL 76. Reference driving torque $T_B$ of engine 11 according to target longitudinal direction acceleration $G_{XO}$ is calculated in reference driving torque calculation unit 145 by equation (7).

$$T_B = \frac{G_{XO} \cdot W_b \cdot r + T_L}{\rho m \cdot \rho d \cdot \rho T} \tag{21}$$

In this case, by only calculating the target driving torque of engine 11 from steering shaft turning angle $\delta_H$ and vehicle speed V, the intention of the driver is not at all reflected, and the driver tends to feel dissatisfaction in his drivability of vehicle 82. Therefore, it is desirable to determine required driving torque $T_d$ of engine 11 which the driver desires from the amount of pressure applied to accelerator pedal 31 and to set the target driving torque of engine 11 in consideration of the required driving torque $T_d$.

Then, in this embodiment, to determine adoption ratio of reference driving torque $T_B$, reference driving torque $T_B$ is multiplied, in multiplication unit 146, by a weighting factor $\alpha$ to determine a corrected reference driving torque. This weighting factor $\alpha$ is experimentally set by turning running vehicle 82. A value of approximately 0.6 is used for a high $\mu$ road.

Furthermore, required driving torque $T_d$ required by the driver, is determined from a graph as shown in FIG. 16 according to engine speed $N_E$ detected by crank angle sensor 55 and accelerator opening $\theta_A$ detected by accelerator opening sensor 77. Then, a corrected required driving torque according to weighting factor $\alpha$ is calculated by multiplying required driving torque $T_d$ by $(1-\alpha)$ in multiplication unit 147. For example, when $\alpha=0.6$ is set, the adoption ratio of reference driving torque $T_B$ and required driving torque $T_d$ is 6:4.

Therefore, target driving torque $T_{OC}$ of engine 11 is calculated by equation (22) in addition unit 148.

$$T_{OC} = \alpha \cdot T_B + (1-\alpha) \cdot T_d \tag{22}$$

Since, when fluctuation of target driving torque $T_{OC}$ of engine 11, set every 15 milliseconds, is very large, shocks tend to occur in association with acceleration and retardation of vehicle 82 which causes a deteriorated driving feeling. When a fluctuation of target driving torque $T_{OC}$ of engine 11 becomes so large that it causes a deteriorated drive feeling, it is desirable to regulate changes in target driving torque $T_{OC}$.

In this embodiment, when absolute value $|\Delta T|$ of the difference between target driving torque $T_{OC(n)}$ presently calculated by changing value clipping unit 149 and previously calculated target driving torque $T_{OC(n-1)}$, is smaller than allowance value $T_K$, presently calculated target driving torque $T_{OC(n)}$ is adopted as is. However, the difference $\Delta T$ between presently calculated target driving torque $T_{OC(n)}$ and previously calculated target driving torque $T_{OC(n-1)}$ is not greater than negative allowance value $T_K$, and present target driving torque $T_{OC(n)}$ is set by the following equation.

$$T_{OC(n)} = T_{OC(n-1)} - T_K$$

Thus, the decrease to previously calculated target driving torque $T_{OC(n-1)}$ is regulated by change allowance $T_K$ to reduce retardation shock associated with the decreasing driving torque of engine 11. Furthermore, when difference $\Delta T$ between presently calculated target driving torque $T_{OC}$ and previously calculated target driving torque $T_{OC(n-1)}$ is greater than change allowance $T_K$, present target driving torque $T_{OC}$ is corrected by the following equation $$T_{OC} = T_{OC(n-1)} + T_K$$

Thus, when the difference $\Delta T$ between presently calculated target driving torque $T_{OC}$ and previously calculated target driving torque $T_{OC(n-1)}$ exceeds change allowance $T_K$, an increase to previously calculated target driving torque $T_{OC(n-1)}$ is regulated by change allowance $T_K$ to reduce acceleration shock associated with increasing driving torque of engine 11.

Then, according to the determination processing in start/end determination unit 150 to determine beginning or completion of turning control, information on target driving torque $T_{OC}$ is outputted to ECU 15.

Start/end determination unit 150 determines the beginning of turning control when all conditions of (a) through (d) below are met, turning control flag $F_C$ being set, outputs information on target driving torque $T_{OC}$ to ECU 15, and continues this procedure until the completion of turning control is determined and turning control flag $F_C$ is reset.

(a) Target driving torque $T_{OC}$ is less than a value of required driving torque $T_d$ subtracted by a threshold value, for example, 2 kgm.
(b) The driver desires turning control by operating a manual switch (not shown).
(c) Idle switch 68 is off.
(d) Control system for turning is normal.

On the other hand, when start/end determination unit 150 determines the beginning of turning control, and when any one of the conditions (e) and (f) below is met, it is determined as the completion of turning control, turning control flag $F_C$ is reset, and transmission of target driving torque $T_{OC}$ to ECU 15 is discontinued.

(e) Target driving torque $T_{OS}$ is greater than required driving torque $T_d$.
(f) The control system for turning has an abnormality such as a malfunction or an open circuit.

There is naturally a proportional relationship between output voltage of accelerator opening sensor 77 and accelerator opening $\theta_A$, and accelerator opening sensor 77 is mounted to throttle body 21 so that the output voltage of accelerator opening sensor 77 is, for example, 0.6 volts when accelerator opening $\theta_A$ is fully closed. However, it is substantially impossible to restore the original mounting condition of accelerator opening sensor 77 after accelerator opening sensor 77 is removed from throttle body 21 and replaced, such as, in necessary due to servicing of vehicle 82, and the position of accelerator opening sensor 77 may change with time, relative to throttle body 21.

Then, in this embodiment, the full-close position of accelerator opening sensor 77 is learning corrected, thereby ensuring reliability of accelerator opening $\theta_A$ calculated according to a detection signal from accelerator opening sensor 77.

Figure 52:
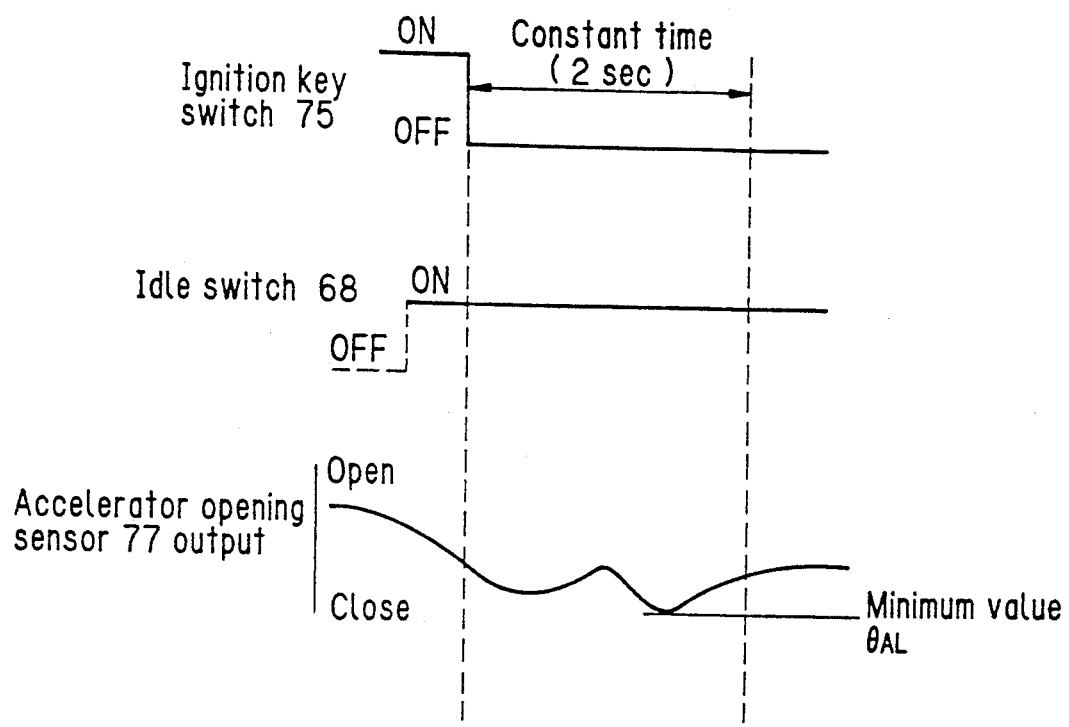
FIG. 52 is a graph showing an example of learning correction procedure of a fully closed position of an accelerator opening sensor.

Referring to FIG. 52 showing the full-close position learning procedure of accelerator opening sensor 77, after idle switch 68 is on and ignition key switch 75 is turned from on to off, output of accelerator opening sensor 77 is monitored for a predetermined period of time, for example, for 2 seconds. Subsequently, a lowest value of accelerator opening sensor 77 output is taken in as a full-close position of accelerator opening sensor 77, which is stored in a RAM with backup (not shown) incorporated in ECU 15, and accelerator opening $\theta_A$ is corrected with respect to the lowest output of accelerator opening sensor 77 until the next learning.

Figure 53:
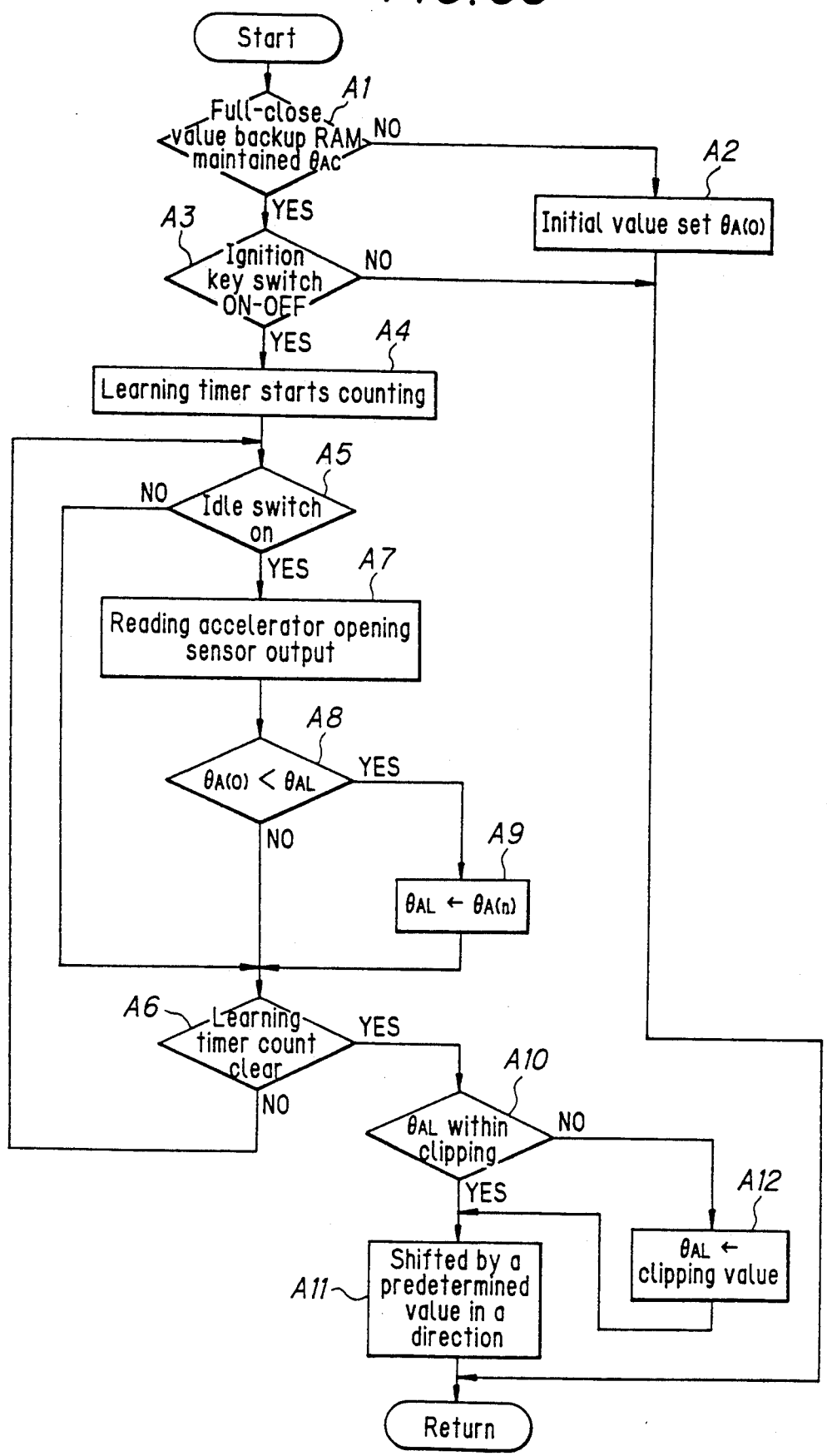
FIG. 53 is a flow chart showing another example of a learning correction procedure of a fully closed position of an accelerator opening sensor.

However, when a battery (not shown) incorporated in vehicle 82 is removed, memory of the RAM is lost. In such a case, learning procedure shown in FIG. 53 is adopted.

Thus, TCL 76 determines in A1 whether or not full-close position value $\theta_{AC}$ of accelerator opening $\theta_A$ is stored in the RAM. Further, when it is determined in step A1 that full-close position value $\theta_{AC}$ of accelerator opening $\theta_A$ is not stored in the RAM, initial value $\alpha\theta_{A(O)}$ is stored in the RAM in A2.

On the other hand, when it is determined in step A1 that full-close position value $\theta_{AC}$ of accelerator opening $\theta_A$ is stored in the RAM, a determination is made in A3 as to whether or not ignition key switch 75 is on. When it is determined that ignition key switch 75 is changed from on to off, counting of a learning timer (not shown) is started in A4. After counting of the learning timer is started, a determination is made in A5 as to whether or not idle switch 68 is on.

When it is determined in step A5 that idle switch 68 is off, a determination is made in A6 that the count of the learning timer has reached a predetermined value, for example, 2 seconds, and processing reverts back to step A5. When it is determined in step A5 that idle switch 68 is on, output of accelerator opening sensor 77 is read in A7 at a predetermined period, and determination is made in A8 whether or not present accelerator opening $\theta_{A(n)}$ is smaller than minimum value $\theta_{AL}$ of previous accelerator opening $\theta_A$.

When it is determined that present accelerator opening $\theta_{A(n)}$ is greater than minimum value $\theta_{AL}$ of previous accelerator opening $\theta_A$, minimum value $\theta_{AL}$ of previous accelerator opening $\theta_A$ as is maintained. On the contrary, however, when it is determined that present accelerator opening $\theta_{A(n)}$ is smaller than minimum value $\theta_{AL}$ of previous accelerator opening $\theta_A$, present accelerator opening $\theta_{A(n)}$ is adopted in A9 as new minimum value $\theta_{AL}$. This procedure is repeated until the count of the learning timer reaches the predetermined value, for example, 2 seconds, in step A6.

When count of the learning timer reaches the predetermined value, a determination is made in A10 as to whether or not minimum value $\theta_{AL}$ of accelerator opening $\theta_A$ is between predetermined clipping values, for example, between 0.3 V and 0.9 V. When it is determined that minimum value $\theta_{AL}$ of accelerator opening $\theta_A$ is within the clipping range, initial value $\theta_{A(O)}$ or full-close position value $\theta_{AC}$ of accelerator opening $\theta_A$ is brought closer in the direction of minimum value $\theta_{AL}$ by a constant value, for example, by 0.1 V, and the result is adopted in A11 as full-close position value $\theta_{AC(n)}$ of accelerator opening $\theta_A$ of the present learning. Thus, when initial value $\theta_{A(O)}$ or full-close position value $\theta_{AC}$ of accelerator opening $\theta_A$ is greater than its minimum value $\theta_{AL}$, it is set as $$\theta_{AC(n)} = \theta_{AC(O)} - 0.1$$

or $$\theta_{AC(n)} = \theta_{AC(n-1)} - 0.1$$

or, to the contrary, when initial value $\theta_{A(O)}$ or full-close position value $\theta_{AC}$ of accelerator opening $\theta_A$ is smaller than its minimum value $\theta_{AL}$, $$\theta_{AC(n)} = \theta_{AC(0)} + 0.1$$

or $$\theta_{AC(n)} = \theta_{AC(n-1)} + 0.1.$$

When it is determined in step A10 that minimum value $\theta_{AL}$ of accelerator opening $\theta_A$ is out of the predetermined clipping range, in A12, the clipping value which is out of the range is replaced as minimum value $\theta_{AL}$ of accelerator opening $\theta_A$, and processing goes to step A11 where full-close position value $\theta_{AC}$ of accelerator opening $\theta_A$ is learning corrected.

Thus, by setting upper and lower limit values of minimum value $\theta_{AL}$ of accelerator opening $\theta_A$, incorrect learning due to a malfunction of accelerator opening sensor 77 can be prevented. Further, by setting the amount of learning, at one time, to a constant value, incorrect learning due to external disturbance such as noise can be prevented.

In the above-described embodiment, the timing for starting the learning of full-close position value $\theta_{AC}$ of accelerator opening $\theta_A$ is set with respect to the time at which ignition key switch 75 is changed from on to off. However, alternatively, a seat sensor incorporated in a seat (not shown) may be used, wherein the driver leaving the seat is detected using changes in seat pressure or is position detected by the seat sensor, even when ignition key switch 75 is on, to begin learning of step A4 and beyond. Alternatively, it is also possible that a door-lock system (not shown), externally manipulated, is detected, or, a key entry system is used to detect that the door-lock system is manipulated, to begin learning of full-close position value $\theta_{AC}$ of accelerator opening sensor 77. In addition, learning may be performed when a shift lever (not shown) of hydraulic automatic transmission 13 is positioned at the neutral or parking position (neutral position for a vehicle with a manual transmission), and an air-conditioning system is off, that is, when the vehicle is not in an idle up state.

Vehicle 82 is provided with a manual switch (not shown) for the driver to select turning control. When the driver selects this switch for turning control, the following turning control operation is performed.

Figure 54:
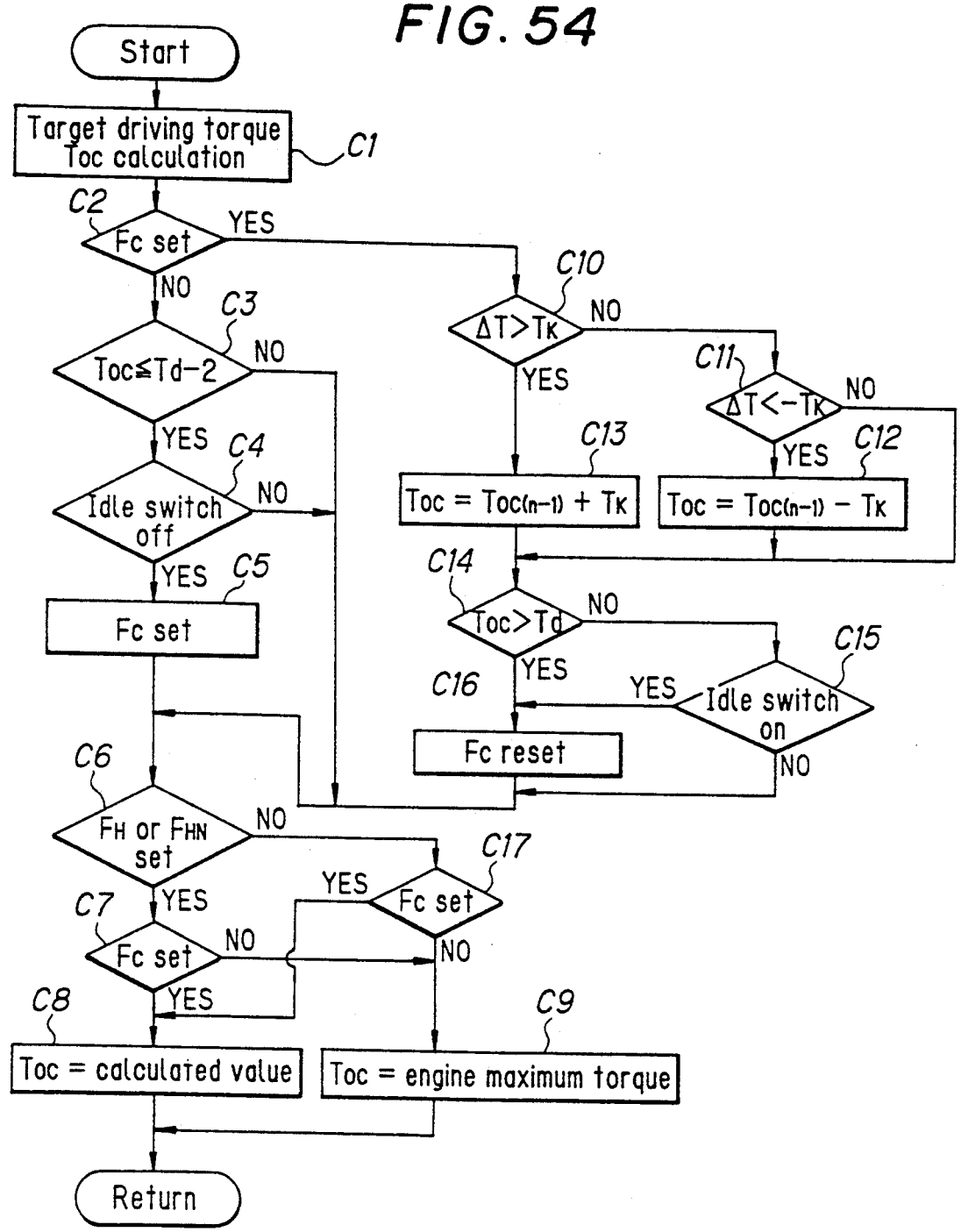
FIG. 54 is a flow chart showing turning control flow.

Referring to FIG. 54 showing control flow to determine target driving torque $T_{OC}$ for turning control, target driving torque $T_{OC}$ is calculated in C1 by detection and calculation of various data, independent of operation of the manual switch.

Then, a determination is made in C2 as to whether or not vehicle 82 is under turning control, that is, whether or not turning control flag $F_C$ is set. Since initially, vehicle 82 is not under turning control, and turning control flag $F_C$ is determined as being in the reset state, a determination is made in C3 as to whether or not it is smaller than $(T_d-2)$. That is, target driving torque $T_{OC}$ can be calculated even when vehicle 82 is running straightforward, but the value is normally greater than the required driving torque $T_d$ of the driver. However, since the required driving torque $T_d$ is generally small during the turning of vehicle 82, the time when target driving torque $T_{OC}$ becomes a value below the threshold value $(T_d-2)$ is determined as the starting condition for turning control.

This threshold value is set to $(T_d-2)$ as a hysteresis to prevent the hunting of control.

When it is determined in step C3 that target driving torque $T_{OC}$ is below the threshold value $(T_d-2)$, TCL 76 determines in C4 whether or not idle switch 68 is off.

When it is determined in step C4 that idle switch 68 is off, that is, accelerator pedal 31 is pressed down by the driver, turning control flag $F_C$ is set in C5. Then, a determination is made in C6 as to whether or not at least one of two steering angle neutral position learned flags $F_{HN}$ and $F_H$ is set, that is, authenticity of steering angle $\delta$ detected by steering angle sensor 84 is determined.

When it is determined in step C6 that at least one of two steering angle neutral position learned flags $F_{HN}$ and $F_H$ is set, a determination is made again in step C7 as to whether or not turning control flag $F_C$ is set.

In the above procedures, since turning control flag $F_C$ is set in step C5, it is determined that in step C7 that turning control flag $F_C$ is set, and previously calculated target driving torque $T_{OC}$ in C1 is adopted, as is, in C8 as target driving torque $T_{OH}$.

On the other hand, even when it is determined in step C6 that both steering angle neutral position learned flags $F_{HN}$ and $F_H$ are not set, a determination is again made in C17 as to whether or not turning control flag $F_C$ is set. When it is determined in C17 that turning control flag $F_C$ is set, processing goes to step C8, but target driving torque $T_{OC}$ of equation (22) according to corrected lateral acceleration of equation (19) is adopted as turning control target driving torque $T_{OC}$, since steering angle $\delta$ calculated by equation (8) is incredible.

When it is determined in step C17 that turning control flag $F_C$ is not set, target driving torque $T_{OC}$ calculated by equation (22) is not adopted. TCL 76 outputs in C9 a maximum torque of engine 11 as target driving torque $T_{OC}$, which causes ECU 15 to reduce the duty ratio of torque control electromagnetic valves 51 and 56 to the 0% side, and engine 11 generates driving torque according to the amount of pressure applied to the accelerator pedal 31 by the driver.

When it is determined in step C3 that target driving torque $T_{OC}$ is not smaller than threshold value $(T_d-2)$, processing does not go to turning control, but goes to step C6 or steps C7 to C9, where TCL 76 outputs a maximum torque of engine 11 as target driving torque $T_{OC}$. This causes ECU 15 to reduce the duty ratio of torque control electromagnetic valves 51 and 56 to the 0% side, and engine 11 generates driving torque according to the amount of pressure applied to the accelerator pedal 31 by the driver.

Similarly, when it is determined in step C4 that idle switch 68 is on, that is, the accelerator pedal 31 is not pressed by the driver, TCL 76 outputs a maximum driving torque of engine 11 as target driving torque $T_{OC}$. This causes ECU 15 to reduce the duty ratio of torque control electromagnetic valves 51 and 56 to the 0% side, and engine 11 generates a driving torque according to the amount of pressure applied to the accelerator pedal 31 by the driver, and does not go to turning control.

When, in step C2, it is determined that turning control flag $F_C$ is set, a determination is made in C10 as to whether or not difference $\Delta T$ between presently calculated target driving torque $T_{OC}$ and previously calculated target driving torque $T_{OC(n-1)}$ is greater than a predetermined change allowance $T_K$. This change allowance $T_K$ is a torque change such that the passenger feels no speed change shock, for example. When target longitudinal direction acceleration $G_{XO}$ of vehicle 82 is to be suppressed to 0.1 g per second, it is given using above equation (21) as $$T_K = 0.1 \cdot \frac{W_b \cdot r}{pm \cdot pd \cdot pT} \cdot \Delta t.$$

When, in step C10, it is determined that difference ΔT between presently calculated target driving torque T$_{OC}$ and previously calculated target driving torque T$_{OC(n-1)}$ is not greater than a predetermined change allowance T$_K$, a determination is made in C11 as to whether or not difference ΔT between presently calculated target driving torque T$_{OC}$ and previously calculated target driving torque T$_{OC(n-1)}$ is greater than the negative change allowance T$_K$.

When, in step C11, it is determined that difference ΔT between present target driving torque T$_{OC}$ and previously calculated target driving torque T$_{OC(n-1)}$ is greater than negative change allowance T$_K$, since the absolute value of difference |ΔT| between presently calculated target driving torque T$_{OC}$ and previously calculated target driving torque T$_{OC(n-1)}$ is smaller than a change allowance T$_K$, presently calculated target driving torque T$_{OC}$ is adopted, as is, as target driving torque T$_{OC}$ in step C8.

When, in step C11, it is determined that a difference ΔT between presently calculated target driving torque T$_{OC}$ and previously calculated target driving torque T$_{OC(n-1)}$ is not greater than a negative change allowance T$_K$, present target driving torque T$_{OC}$ is corrected in C12 by the following equation, and adopted as calculated value in C8.

$$T_{OC} = T_{OC(n-1)} - T_K$$

That is, decrease of previously calculated target driving torque T$_{OC(n-1)}$ is regulated by the change allowance T$_K$ to reduce the retardation shock associated with decreasing driving torque of engine 11.

On the other hand, when, in step C10, it is determined that a difference ΔT between presently calculated target driving torque T$_{OC}$ and previously calculated target driving torque T$_{OC(n-1)}$ is greater than a change allowance T$_K$, present target driving torque T$_{OC(n)}$ is corrected in C13 by the following equation, and adopted as calculated value in C8.

$$T_{OC} = T_{OC(n-1)} + T_K$$

In the case of increasing driving torque, similar to the case of decreasing driving torque described above, when a difference ΔT between presently calculated target driving torque T$_{OC}$ and previously calculated target driving torque T$_{OC(n-1)}$ exceeds change allowance T$_K$, increase to a previously calculated target driving torque T$_{OC(n-1)}$ is regulated by the change allowance T$_K$, to reduce acceleration shock associated with increasing driving torque of engine 11.

Once target driving torque T$_{OC}$ is set, TCL 76 determines whether or not this target driving torque T$_{OH}$ is greater than required driving torque T$_d$ of the driver.

Since target driving torque T$_{OC}$ is not greater than driving torque T$_d$ required by the driver when turning control flag F$_C$ is set, a determination is made in C15 as to whether or not idle switch 68 is on.

When, in step C15, it is determined that idle switch 68 is on, processing goes to step C6 because turning control is required.

When, in step C14, it is determined that target driving torque T$_{OC}$ is greater than required driving torque T$_d$ of the driver, which means completion of turning of vehicle 82, in C16, TCL 76 resets turning control flag F$_C$. Similarly, when it is determined in step C15 that idle switch 68 is on, that is, the accelerator pedal is not pressed down, processing proceeds to step C16 where turning control flag F$_C$ is reset.

When, in step C16, turning control flag F$_C$ is reset, TCL 76 outputs a maximum driving torque of engine 11 as target driving torque T$_{OC}$. This causes ECU 15 to reduce the duty ratio of torque control electromagnetic valves 51 and 56 to the 0% side, and engine 11 generates driving torque according to the amount of pressure applied to the accelerator pedal 31 by the driver.

After target driving torque T$_{OC}$ for turning control is calculated, TCL 76 selects optimum final target driving torque T$_O$ from among these two target driving torques T$_{OS}$ and T$_{OC}$, and outputs this to ECU 15. In this case, the smaller target driving torque is preferentially outputted, in view of running safety of vehicle 82. However, in general, since slip control target driving torque T$_{OS}$ is always smaller than turning control target driving torque T$_{OC}$, final target driving torque T$_O$ may be selected in the order of slip control and turning control.

Figure 55:
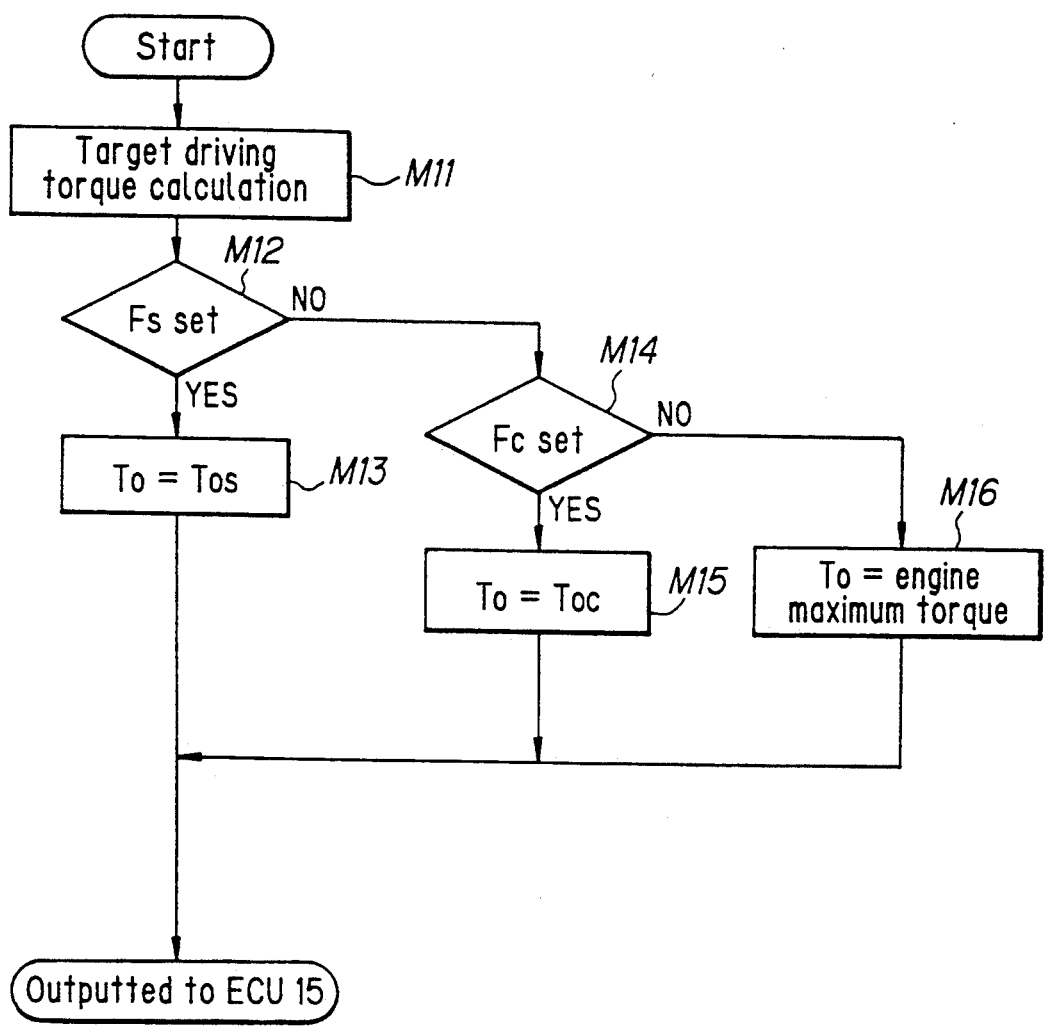
FIG. 55 is a flow chart showing final target torque selection flow.

As shown in FIG. 55 which shows this processing flow, after slip control target driving torque T$_{OS}$ and turning control target driving torque T$_{OC}$ are calculated in M11, a determination is made in M12 as to whether or not slip control flag F$_S$ is set. When it is determined that slip control flag F$_S$ is set, slip control target driving torque T$_{OS}$ is selected in M13 as final target driving torque T$_O$, and outputted to ECU 15.

When, in step M12, it is determined that slip control flag F$_S$ is not set, a determination is made in M14 as to whether or not turning control flag F$_C$ is set. When it is determined that turning control flag F$_C$ is set, turning control target driving torque T$_{OC}$ is selected in M15 as final target driving torque T$_O$, and outputted to ECU 15.

When, in step M14, it is determined that turning control flag F$_C$ is not set, TCL 76 in M16 outputs a maximum torque of engine 11 as final target driving torque T$_O$ to ECU 15.

In addition to the selection of final target driving torque T$_O$ as above, for a case where the vehicle starts abruptly or the road condition suddenly changes from a dry state to a frozen state, such that output reduction of engine 11 may be not fast enough by fully closing throttle valve 20 through actuator 41, TCL 76 sets in a retard angle ratio to basic retard angle value p$_S$ of ignition timing P set by ECU 15, which is outputted to ECU 15.

Basic retard angle value p$_S$ is a maximum value of the retard angle that presents no problem relating to operation of engine 11, which is set according to intake air amount and engine speed N$_E$ of engine 11. As the retard angle ratio, there are set four levels in this embodiment, level O in which basic retard angle value is 0, level I in which basic retard angle value p$_S$ is compressed to two-thirds, level II in which basic retard angle value p$_S$ is outputted as is, and level III which basic retard angle value p$_S$ is outputted as is and throttle valve 20 is fully closed. Graphs of retard angle ratio, in which the basic retard angle value increases as changing rate of slip amount s increases are stored in TCL 76.

Figure 56:
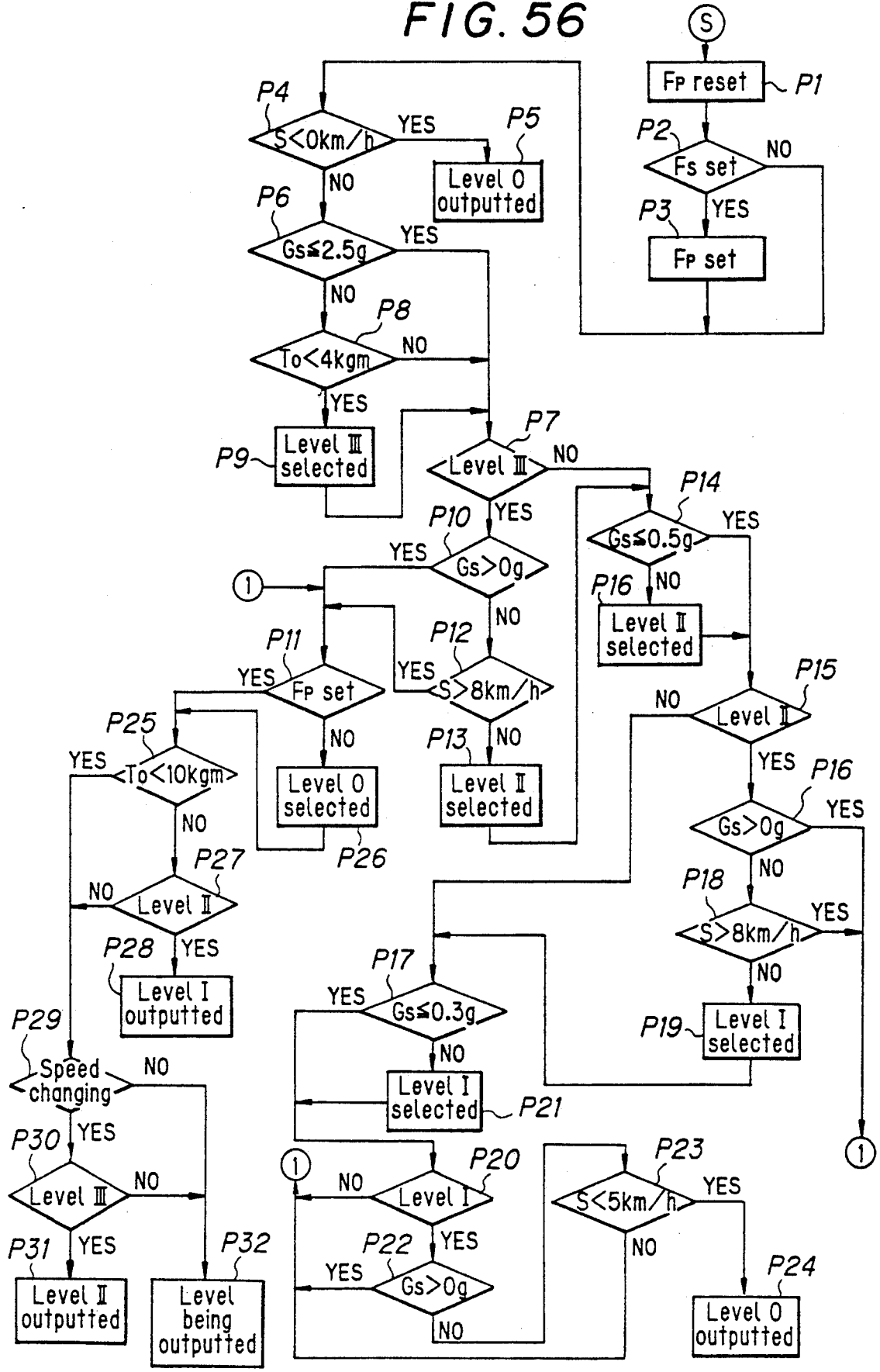
FIG. 56 is a flow chart showing retard angle ratio selection flow.

Referring to FIG. 56 which shows procedure to read the retard angle ratio, TCL 76 first resets ignition timing control flag F$_P$ in P1, and a determination is made in P2 as to whether or not slip control flag Fs is set. When it is determined in step P2 that slip control flag Fs is set, ignition timing control flag FP is set in P3, and a determination is made in P4 as to whether or not slip amount s is smaller than 0 km per hour. When it is determined in step P2 that slip control flag Fs is not set, processing proceeds to step P4.

When it is determined in step P4 that slip amount s is smaller than 0 km per hour, that is, increasing driving torque of engine 11 presents no problem, retard angle ratio is set to level O in P5, which is outputted to ECU 15. To the contrary, when it is determined in step P4 that slip amount s is greater than 0 km per hour, a determination is made in P6 as to whether or not slip amount changing rate Gs is smaller than 2.5 g. When it is determined in step P6 that slip amount changing rate Gs is smaller than 2.5, a determination is made in P7 as to whether or not retard angle ratio is at level III.

When it is determined in step P6 that slip amount changing rate Gs exceeds 2.5 g, that is, front wheels 64 and 65 considerably slip, a determination is made in P8 as to whether or not final target driving torque To is smaller than 4 kgm. When it is determined that final target driving torque To is smaller than 4 kgm, that is, the driving torque of engine 11 must be rapidly suppressed, retard angle ratio is set in P9 to level III, and processing proceeds to step P7. To the contrary, when it is determined in step P8 that final target driving torque To is greater than 4 kgm, nothing is done and processing proceeds to step P7.

When it is determined in step P7 that retard angle ratio is that of level III, a determination is made in P10 as to whether or not slip amount changing rate Gs exceeds 0 g. When it is determined that slip amount changing rate Gs exceeds 0 g, that is, slip amount s tends to increase, a determination is made in P11 as to whether or not ignition timing control flag FP is set. When it is determined in step P10 that slip amount changing rate Gs is smaller than 0 g, that is, slip amount s tends to decrease, a determination is made in P12 as to whether or not slip amount s exceeds 8 km per hour.

When it is determined in step P12 that slip amount s exceeds 8 km per hour, processing proceeds to step P11. When it is determined that slip amount s is smaller than 8 km per hour, retard angle ratio is switched from level III to level II in P13, and a determination is made in P14 as to whether or not slip amount changing rate Gs is smaller than 0.5 g. Similarly, when it is determined in step P7 that retard angle ratio is not at level III, processing also goes to step P14.

When it is determined in step P14 that slip amount changing rate Gs is smaller than 0.5 g, that is, the change in slip amount s is not very rapid, a determination is made in P15 as to whether or not retard angle ratio is at level II. When it is determined in step P14 that slip amount changing rate Gs is not smaller than 0.5 g, retard angle ratio is set in P16 to level II, and processing proceeds to step P15.

When it is determined in step P15 that retard angle ratio is at level II, a determination is made in P16 as to whether or not slip amount changing rate Gs exceeds 0 g. On the contrary, when it is determined that retard angle ratio is not at level II, a determination is made in P17 as to whether or not slip amount changing rate Gs is smaller than 0.3 g. When it is determined in step P16 that slip amount changing rate Gs does not exceed 0 g, that is, slip amount s tends to decrease, a determination is made in P18 as to whether or not slip amount s exceeds 8 km per hour. When it is determined in step P18 that slip amount s is smaller than 8 km per hour, retard angle ratio is switched in P19 from level II to level I, and processing proceeds to step P17. When it is determined in step P16 that slip amount changing rate Gs is greater than 0 g, that is slip amount s tends to increase, and when it is determined that slip amount s is large, in the individual cases, processing proceeds to step P11.

When it is determined in step P17 that slip amount changing rate Gs is smaller than 0.3 g, that is, slip amount s almost does not tend to increase, a determination is made in P20 as to whether or not retard angle ratio is at level I. To the contrary, when it is determined in step P17 that slip amount changing rate Gs exceeds 0.3 g, that is, slip amount s tends to increase to some extent, retard angle ratio is set to level I in P21.

When it is determined in P20 that retard angle ratio is at level I, a determination is made in P22 as to whether or not slip amount changing rate Gs exceeds 0 g. Further, when it is determined less than 0 g, that is, slip amount s tends to decrease, a determination is made in P23 as to whether or not slip amount s is smaller than 5 km per hour. When it is determined in step P23 that slip amount s is smaller than 5 km per hour, that is, front wheels 64 and 65 are almost not slipping, the retard angle ratio is set to level 0 in P24, which is outputted to ECU 15. When it is determined in step P20 that the retard angle ratio is not at level I; or, when it is determined in step P22 that slip amount changing rate Gs exceeds 0 g, that is, slip amount s tends to increase; or, when it is determined in step P23 that slip amount s is greater than 5 km per hour, that is, slip amount s is relatively large, the processing proceeds to step P11.

On the other hand, when it is determined in step P11 that ignition timing control flag FP is set, a determination is made in P25 as to whether or not final target driving torque To is smaller than 10 kgm. When it is determined in step P11 that ignition timing control flag FP is not set, retard angle ratio is set to level 0 in P26 and processing goes to step P25.

When it is determined in P25 that final target driving torque To is greater than 10 kgm, that is engine 11 generates a relatively high driving torque, a determination is made in P27 as to whether or not retard angle ratio is at level II. Further, when the retard angle ratio is determined at level II, retard angle ratio is decreased to level I in P28, which is outputted to ECU 15.

When it is determined in step P25 that final target driving torque To is smaller than 10 kgm, or, when it is determined in step P27 that the retard angle ratio is not at level II, a determination is made in P29 as to whether or not hydraulic automatic transmission 13 is speed changing. When it is determined that hydraulic automatic transmission 13 is speed changing, a determination is made in P30 whether or not retard angle ratio is at level III. When it is determined in step P30 that the retard angle ratio is at level III, the retard angle ratio is decreased to level II in P31, which is outputted to ECU 15. When it is determined in step P29 that hydraulic automatic transmission 13 is not speed changing, or, when it is determined in step P30 that the retard angle ratio is not at level III, the set retard angle ratio is outputted, as is, to ECU 15.

For example, when retard angle ratio of level III is set in step P9, when it is determined that slip amount changing rate Gs exceeds 0 g and slip amount s exceeds 8 km per hour, that is, the increasing rate of slip amount s is rapid, and final target driving torque To is smaller than 10 kgm, and it is difficult to efficiently suppress slipping of front wheels 64 and 65 only by the retard angle operation of ignition timing, the retard angle ratio of level III is selected and opening of throttle valve 20 is forcibly fully closed. This thereby efficiently suppresses the occurrence of slip at its initial stage.

ECU 15 reads ignition timing P and basic retard angle pS according to a detection signal from crank angle sensor 62 and a detection signal from air flow sensor 70 from a graph (not shown) on ignition timing P and basic retard angle pS preset according to engine speed NE and intake air amount of engine 11, which are corrected according to a retard angle ratio transmitted from TCL 76 to calculate target retard angle pO. In this case, an upper limit value of target retard angle pO is set according to an upper limit temperature not damaging to exhaust gas cleaning catalyst (not shown), and the exhaust gas temperature is detected from a detection signal from exhaust gas temperature sensor 74.

When the cooling water temperature detected by water temperature sensor 71 is lower than a predetermined value, since retardation of ignition timing P may induce knocking or stalling of engine 11, the retard angle operation of ignition timing P shown below is not performed.

Figure 57:
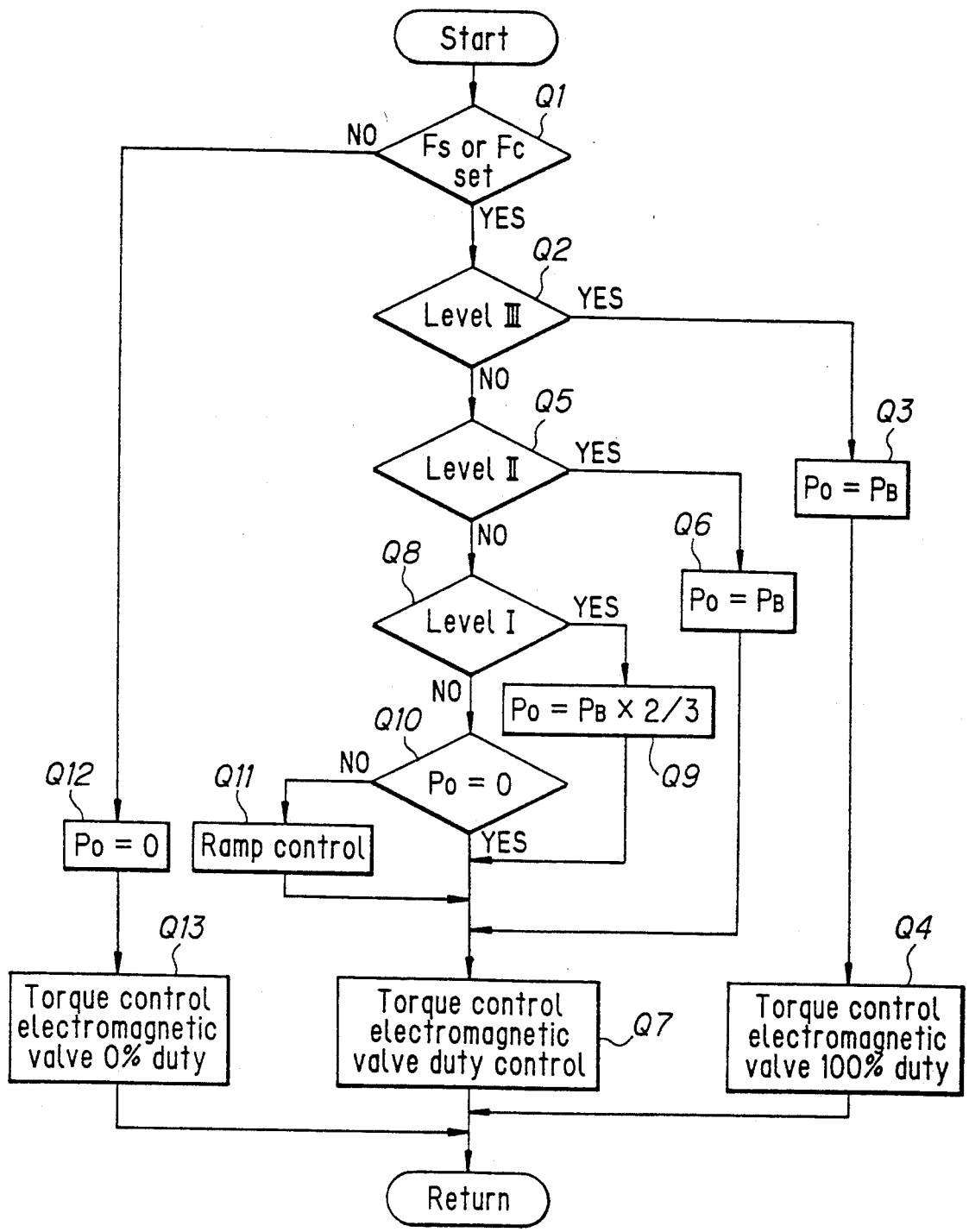
FIG. 57 is a flow chart showing an engine output control procedure.

Referring to FIG. 57, showing calculation procedure of the target retard angle pO in retard angle control, ECU 15 first determines in Q1 whether or not slip control flag Fs is set. When it is determined that slip control flag Fs is set, a determination is made in Q2 as to whether or not retard angle ratio is set to level III.

When it is determined in step Q2 that retard angle ratio is at level III, basic retard angle pS read from the graph is used, as is, as target retard angle pO, and ignition timing P is retarded by target retard angle pO. Furthermore, the duty ratio of torque control electromagnetic valves 51 and 56 is set to 100% so that throttle valve 20 is fully closed independent of final target driving torque TO, thereby forcibly achieving full-close state of throttle valve 20.

When it is determined in step Q2 that retard angle ratio is not at level III, a determination is made in Q5 as to whether or not retard angle ratio is set to level II. When it is determined in Q5 that the retard angle ratio is at level II, retard angle pO read from the graph is used as is in Q6 as target retard angle pO, as in step Q3, and ignition timing P is retarded by target retard angle pO. Furthermore, ECU 15 sets in Q7 the duty ratio of torque control electromagnetic valves 51 and 56 according to target driving torque TOS, to reduce the driving torque of engine 11 independent of the amount of pressure applied to the accelerator pedal 31 by the driver.

ECU 15 stores graphs to determine throttle opening θT from engine speed NE and driving torque of engine 11 as parameters, and ECU 15 reads target throttle opening θTO according to present engine speed NE and target driving torque TOS from the graphs.

Then ECU 15 determines deviation between target throttle opening θTO and actual throttle opening θT outputted from throttle opening sensor 67, sets the duty ratio of the pair of torque control electromagnetic valves 51 and 56 to a value, according to the deviation, to supply current to solenoids of plungers 52 and 57 of individual torque control electromagnetic valves 51 and 56, and controls actual throttle opening θT to decrease to target throttle opening θTO by the operation of actuator 41.

When a maximum driving torque of engine 11 is outputted as target driving torque TOS to ECU 15, ECU 15 reduces the duty ratio of torque control electromagnetic valves 51 and 56 to the 0% side. This causes engine 11 to generate a driving torque according to the amount of pressure applied to the accelerator pedal 31 by the driver.

When it is determined in step Q5 that retard angle ratio is not at level II, a determination is made in Q8 as to whether or not retard angle ratio is set to level I. When it is determined in step Q8 that retard angle ratio is set to level I, target retard angle pO is set to the following equation to retard ignition timing P by target retard angle pO, and processing proceeds to step Q7.

$$pO = pS \cdot \frac{2}{3}$$

On the other hand, when it is determined in step Q8 that retard angle ratio is not at level I, a determination is made in Q10 as to whether or not retard angle pO is 0. When it is determined as 0, processing proceeds to step Q7 where ignition timing P is not retarded, and the duty ratio of torque control electromagnetic valves 51 and 56 is set according to target driving torque TO to reduce the driving torque of engine 11 independent of the amount of pressure applied to the accelerator pedal 31 by the driver.

When it is determined in step Q10 that retard angle pO is not 0, target retard angle pO is subtracted in Q11 by ramp control, for example, by one degree every sampling period Δt of the main timer, until pO=0, to reduce shocks associated with driving torque changes of engine 11. Processing then proceeds to step Q7.

When it is determined in step Q1 that slip control flag Fs is reset, ordinary running control is performed in which driving torque of engine 11 is not reduced, pO=0 is set in Q12 and ignition timing P is not retarded. The duty ratio of torque control electromagnetic valves 51 and 56 is set to 0% in Q13 to cause engine 11 to generate a driving torque according to the amount of pressure applied to the accelerator pedal 31 by the driver.

The above-described retard angle ratio setting area can be varied according to running characteristics and the like of vehicle 82.

Figure 58:
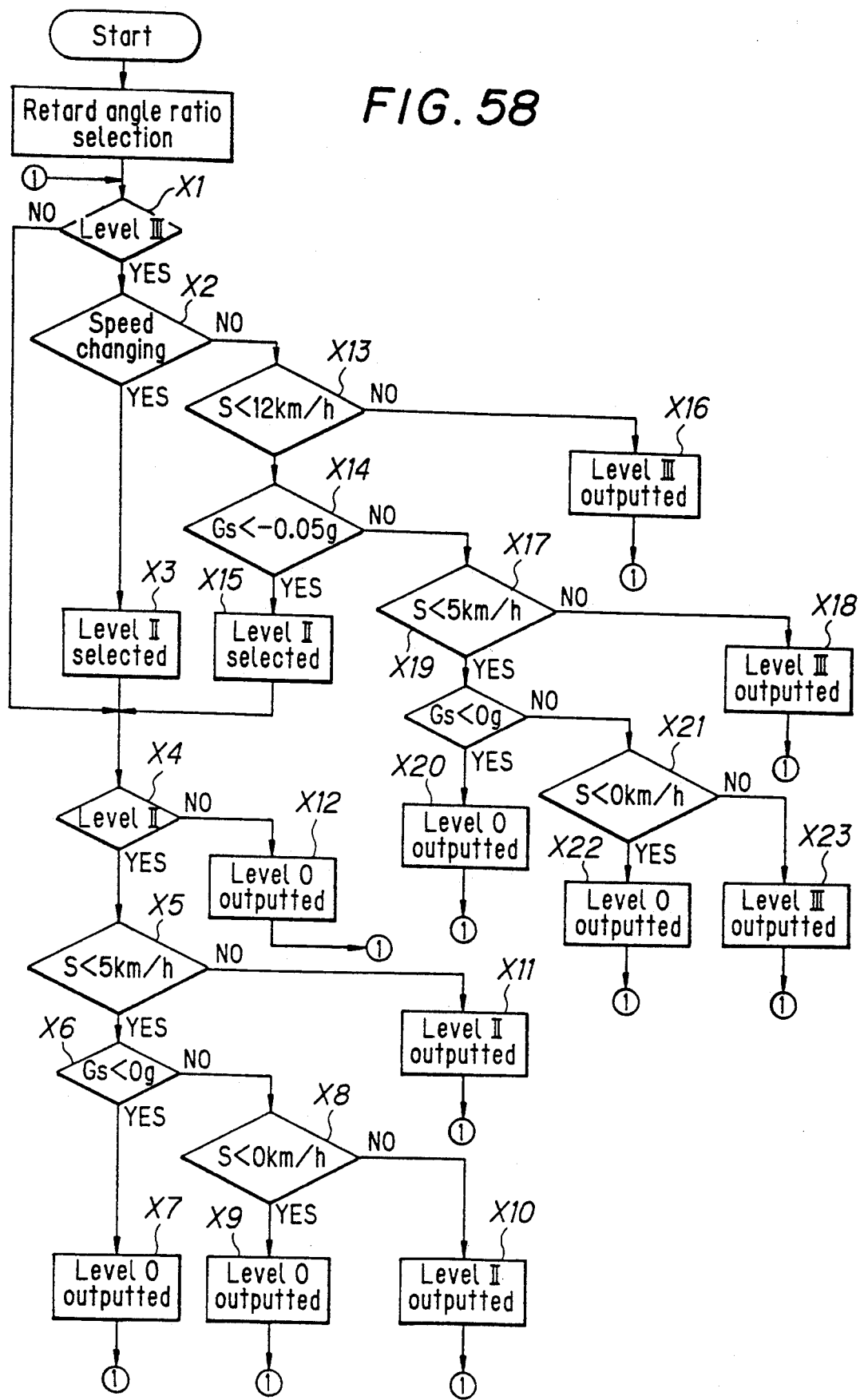
FIG. 58 is a flow chart showing another example of engine output control flow.

For example, referring to FIG. 58 showing an example of retard angle ratio reading procedure, TCL 75 first selects a retard angle ratio according to present changing rate Gs of slip amount s of engine 11. A determination is made in X1 as to whether or not the retard angle ratio selected is at level III. When it is determined in X2 that the retard angle ratio is at level III, a determination is made in X2 as to whether or not hydraulic automatic transmission 13 is changing in speed through hydraulic control device 16.

When it is determined in step X2 that hydraulic automatic transmission 13 is changing in speed, the retard angle ratio is re-set to level II to prevent engine 11 from stalling due to extreme output reduction. A determination is again made in X4 as to whether or not the retard angle ratio is at level II. In this case, since retard angle ratio is at level II, processing proceeds to next step X5 where a determination is made as to whether or not slip amount s of front wheels 64 and 65 is smaller than 5 km per hour. When it is determined in step X5 that slip amount s is above 5 km per hour, that is front wheels 64 and 65 are slipping, a determination is made in X6 as to whether or not changing rate Gs of slip amount s is smaller than 0 g.

When it is determined in step X6 that changing rate Gs of slip amount s is smaller than 0 g, the retard angle ratio is set to level 0 in X7. This is outputted to ECU 15, and processing returns to step X1. To the contrary, when it is determined in step X6 that changing rate Gs of slip amount s is greater than 0 g, a determination is made in X8 as to whether or not slip amount s of front wheels 64 and 65 is less than 0 km per hour.

When it is determined in step X8 that slip amount s of front wheels 64 and 65 is less than 0 km per hour, retard angle ratio is re-set to level 0 in X9. This is outputted to ECU 15, and processing returns to step X1. On the other hand, when it is determined in step X8 that slip amount s of front wheels 64 and 65 is greater than 0 km per hour, that is, front wheels 64 and 65 are more or less slipping, the retard angle ratio maintained at level II is outputted to ECU 15 in X10, and processing returns to step X1.

When it is determined in step X5 that slip amount s is greater than 5 km per hour, that is, front wheels 64 and 65 are slipping, the retard angle ratio at level II is outputted to ECU 15 in X11, and processing returns to step X1. When it is determined in step X1 that the retard angle ratio is not at level III, processing proceeds to step X4. When it is determined in X4 that the retard angle ratio is not at level II, retard angle ratio at level 0 is outputted to ECU 15 in X12, and processing returns to step X1.

On the other hand, when it is determined in step X2 that hydraulic automatic transmission 13 is not changing in speed, a determination is made in X13 as to whether or not slip amount s of front wheels 64 and 65 is less than 12 km per hour. When it is determined as less than 12 km per hour, a determination is made in X14 as to whether or not changing rate Gs of slip amount s is less than −0.05 g. When it is determined in step X14 that changing rate Gs of slip amount s is less than −0.05 g, the retard angle ratio is re-set to level II, and processing proceeds to step X4.

When it is determined in step X13 that slip amount s of front wheels 64 and 65 is greater than 12 km per hour, that is, a considerable slip occurs, the retard angle ratio is maintained at level III. This is outputted to ECU 15, and processing returns to step X1. When it is determined in step X14 that changing rate Gs of slip amount s is greater than −0.05 g, that is, slip tends to increase, a determination is made in X17 as to whether or not slip amount s is less than 5 km per hour.

When it is determined in step X17 that slip amount s is greater than 5 km per hour, that is, slip amount s is greater than 5 km per hour and less than 12 km per hour, the retard angle ratio is maintained at level III in X18. This is outputted to ECU 15, and processing returns to step X1. However, when it is determined that slip amount s is less than 5 km per hour, a determination is made in X19 as to whether or not changing rate Gs of slip amount s is less than 0 g, that is, vehicle 82 is retarding.

When it is determined in step X19 that changing rate Gs of slip amount s is less than 0 km per hour, that is, slip does not occur, the retard angle ratio is re-set to level 0 in X22. This is outputted to ECU 15, and processing returns to step X1. When it is determined in step X21 that slip amount s is greater than 0 km per hour, the retard angle ratio is maintained at level III because it is possible the slip will increase. This is outputted to ECU 15, and processing returns to step X1.

Figure 59:
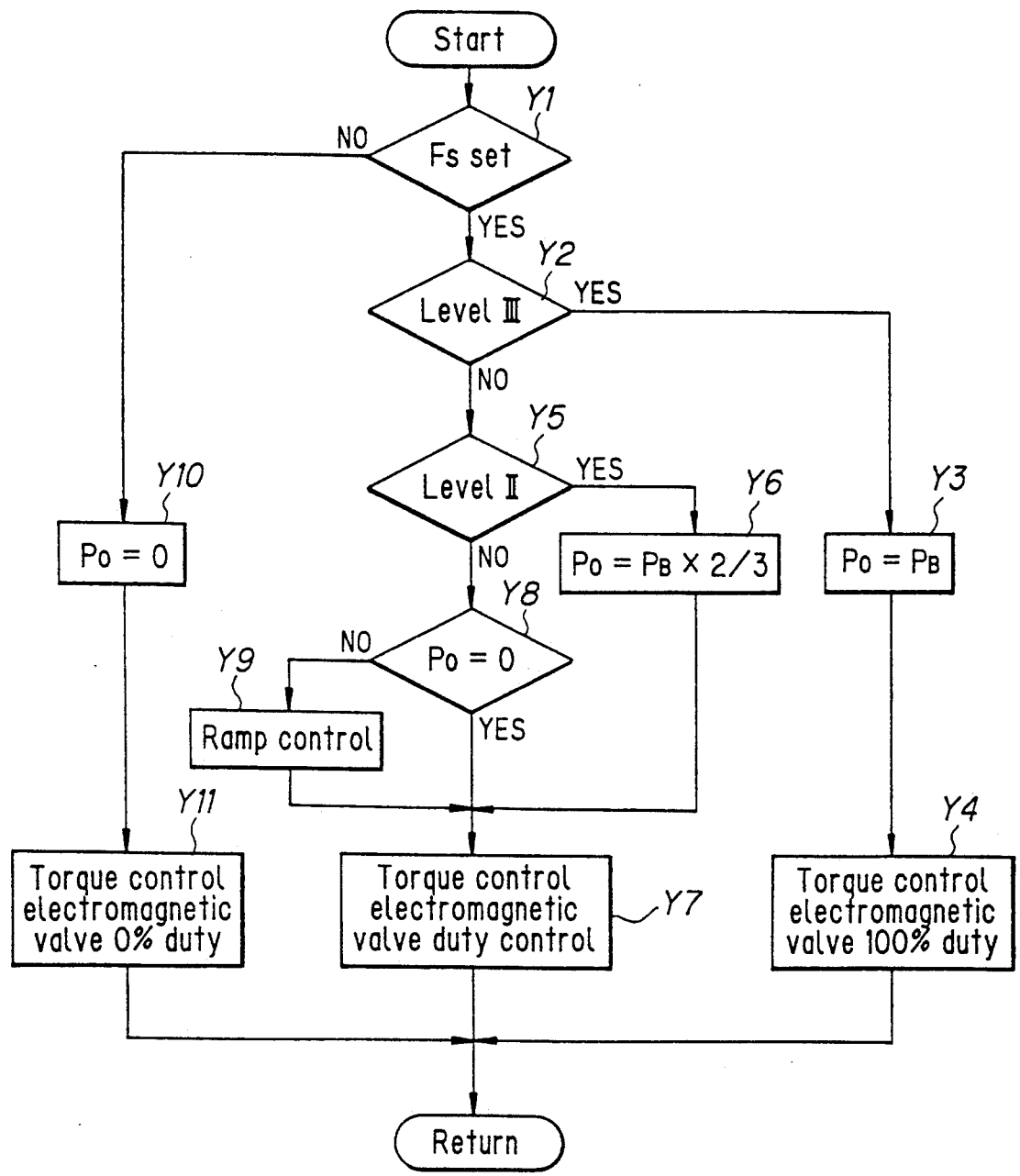
FIG. 59 is a flow chart showing another example of engine output control procedure.

Referring to FIG. 59 showing calculation procedure of target retard angle pO in this retard angle control, ECU 15 first determines in Y1 whether or not slip control flag Fs is set. When it is determined that slip control flag Fs is set, a determination is made in Y2 as to whether or not the retard angle ratio is set at level III.

When it is determined in step Y2 that the retard angle ratio is at level III, basic retard angle pS read from a graph is used, as is, as target retard angle pO, and ignition timing P is retarded by target retard angle pO. Furthermore, the duty ratio of torque control electromagnetic valves 51 and 56 is set to 100% in Y4 so that throttle valve 20 is fully closed independent of the value of final target driving torque To. This thereby forcibly achieves an idling condition of the engine 11.

When it is determined in step Y2 that the retard angle ratio is not at level III, a determination is made in Y5 as to whether or not the retard angle ratio is set to level II.

When it is determined in step Y5 that the retard angle ratio is at level II, target retard angle pO is set by the following equation, and ignition timing P is retarded by target retard angle pO.

$$p_O = p_S \cdot \frac{2}{3}$$

Furthermore, ECU 15 sets the duty ratio of torque control electromagnetic valves 51 and 56 in Y7 according to target driving torque Tos, thereby reducing the driving torque of engine 11 independent of the amount of pressure applied to the accelerator pedal 31 by the driver.

ECU 15 stores graphs to determine throttle opening $\theta_T$ from engine speed NE and driving torque of engine 11 as parameters, and ECU 15 reads target throttle opening $\theta_{TO}$ according to present engine speed NE and target driving torque Tos from the graphs.

Then ECU 15 determines deviation between target throttle opening $\theta_{TO}$ and actual throttle opening $\theta_T$ outputted from throttle opening sensor 67, sets the duty ratio of the pair of torque control electromagnetic valves 51 and 56 to a value according to the deviation to supply current to solenoids of plungers 52 and 57 of individual torque control electromagnetic valves 51 and 56, and controls actual throttle opening $\theta_T$ to decrease to the target throttle opening $\theta_{TO}$ by the operation of actuator 41.

When a maximum driving torque of engine 11 is outputted as target driving torque Tos to ECU 15, ECU 15 reduces the duty ratio of torque control electromagnetic valves 51 and 56 to the 0% side. This causes engine 11 to generate a driving torque according to the amount of pressure applied to the accelerator pedal 31 by the driver.

When it is determined in step Y5 that retard angle ratio is not at level II, a determination is made in Y8 as to whether or not target retard angle pO is 0. When it is determined as 0, processing proceeds to step Y7 where ignition timing P is not retarded. The duty ratio of torque control electromagnetic valves 51 and 56 is then set according to target driving torque Tos, thereby reducing the driving torque of engine 11 independent of the amount of pressure applied to the accelerator pedal 31 by the driver.

When it is determined in step Y8 that target retard angle pO is not 0, target retard angle pO is subtracted in Y9 by ramp control, for example, by one degree every sampling period Δt of the main timer. This is done until pO=0 to reduce shocks associated with driving torque changes of engine 11. Processing then proceeds to step Y7.

When it is determined in step Y1 that slip control flag Fs is reset, ordinary running control is performed in which driving torque of engine 11 is not reduced, pO=0 is set in Y10 and ignition timing P is not retarded, and the duty ratio of torque control electromagnetic valves 51 and 56 is set to 0% in Y11. This causes engine 11 to generate a driving torque according to the amount of pressure applied to the accelerator pedal 31 by the driver.

What is claimed is:

1. A turning control apparatus for a vehicle comprising:
    torque control means for controlling a driving torque of a vehicle engine independent of manipulation by the driver;
    a steering angle sensor for detecting a steering angle of a vehicle steering wheel;
    a vehicle speed sensor for detecting traveling speed of the vehicle;
    a torque calculation unit for setting a target lateral acceleration of the vehicle as a lateral acceleration, estimated as traveling on a road having a predetermined frictional coefficient according to said steering angle detected by said steering angle sensor and said vehicle speed detected by said vehicle speed sensor, and for converting said target lateral acceleration to a target driving torque of the vehicle engine according to a preset relation using solely said target lateral acceleration as a lateral acceleration of the vehicle only upon detecting a steering angle by said steering angle sensor; and
    an electronic control unit for controlling operation of said torque control means so that the driving torque of the vehicle engine is equal to said target driving torque set by said torque calculation unit.

2. The turning control apparatus for a vehicle of claim 1 wherein said torque calculation unit limits the varying of the setting of said target driving torque to a value below a predetermined variance from said previously set target driving torque.

3. The turning control apparatus for a vehicle of claim 1 wherein said electronic control unit interrupts control of the operation of the torque control means when the detected traveling speed is less than a predetermined value.

4. The turning control apparatus for a vehicle of claim 1 wherein said electronic control unit controls operation of said torque control means when said calculated target lateral acceleration is greater than a predetermined value.

5. The turning control apparatus for a vehicle of claim 1 further comprising:
    lateral acceleration detection means for detecting lateral acceleration applied to the vehicle, wherein said torque calculation unit sets the target driving torque of the vehicle engine according solely to an actual lateral acceleration detected by said lateral acceleration detection means as the lateral acceleration of the vehicle in place of the target lateral acceleration only upon the steering angle sensor failing to detect a steering angle, and further alternatively sets the target driving torque of the vehicle engine according solely to the target lateral acceleration as the lateral acceleration of the vehicle only upon detecting a steering angle by the steering angle sensor.

6. The turning control apparatus for a vehicle of claim 1 further comprising:
    a pair of wheel speed sensors for detecting right and left driven wheel speeds;
    steering angle neutral position determination means for determining a neutral steering angle according to said detected right and left wheel speeds and said detected steering angle; and
    lateral acceleration detection means for detecting actual lateral acceleration applied to the vehicle, wherein said torque calculation unit sets the target driving torque of the vehicle according to the actual lateral acceleration detected until the neutral steering angle is determined, and sets the target driving torque of the vehicle according the target lateral acceleration after the neutral steering angle is determined.

7. The turning control apparatus for a vehicle of claim 6 further comprising:
    learning correction interruption means for interrupting determining of the neutral steering angle while said electronic control unit is controlling operation of said torque control means, after determining said neutral steering angle.

8. The turning control apparatus for a vehicle of claim 1 further comprising:
    slip condition detection means for detecting a slip condition of right and left driving wheels of the vehicle; and
    a slip prevention torque calculation unit for calculating a slip prevention target driving torque of the vehicle engine for slip prevention according to said detected slip condition, wherein said electronic control unit controls operation of said torque control means so that driving torque of the vehicle engine is equal to any one of the target driving torque, according to target lateral acceleration, set by said torque calculation unit and the slip prevention target driving torque set by said slip prevention torque calculation unit.

9. A turning control apparatus for a vehicle comprising:
    torque control means for reducing a driving torque of a vehicle engine independent of manipulation by a vehicle driver;
    a steering angle sensor for detecting a steering angle of a vehicle steering wheel;
    a vehicle speed sensor for detecting traveling speed of the vehicle;
    acceleration calculation means for setting a target lateral acceleration of the vehicle as a lateral acceleration, estimated as traveling on a road having a predetermined frictional coefficient according to said steering angle detected by said steering angle sensor and said vehicle traveling speed detected by said vehicle speed sensor, and for converting said target lateral acceleration to a target longitudinal direction acceleration of the vehicle according to a preset relation using solely said target lateral acceleration as a lateral acceleration of the vehicle only upon detecting a steering angle by the steering angle sensor;
    a torque calculation unit for setting a target driving torque according to said target longitudinal direction acceleration converted by said acceleration calculation means; and an electronic control unit for controlling operation of said torque control means so that the driving torque of the vehicle engine is equal to the target driving torque set by said torque calculation unit.

10. The turning control apparatus for a vehicle of claim 9 wherein said target lateral acceleration $G_{YO}$ is calculated by the following equation:

$$G_{YO} = \frac{\delta}{l \cdot \left(A + \frac{1}{V^2}\right)}$$

wherein l is a wheel base of the vehicle, A is a stability factor, V is the detected vehicle traveling speed, and $\delta$ is the detected steering angle.

11. The turning control apparatus for a vehicle of claim 9, wherein said target driving torque is set lower as the set target lateral acceleration increases.

12. The turning control apparatus for a vehicle of claim 9 wherein said target driving torque is set lower as the detected vehicle speed increases.

13. The turning control apparatus for a vehicle of claim 9 wherein said torque calculation unit sets target driving torque according to the calculated target longitudinal direction acceleration and a road-load torque.

14. The turning control apparatus for a vehicle of claim 13 wherein said road-load torque includes a rolling drag component and a cornering drag component of the vehicle.

15. The turning control apparatus for a vehicle of claim 14 further comprising:

lateral acceleration detection means for detecting actual lateral acceleration applied to the vehicle, wherein said cornering drag component varies with the detected actual lateral acceleration of the vehicle.

16. The turning control apparatus for a vehicle of claim 9 further comprising:

longitudinal direction acceleration detection means for detecting actual longitudinal direction acceleration applied to the vehicle, wherein said electronic control unit sets the target driving torque according to a deviation between the calculated target longitudinal direction acceleration and an actual longitudinal direction acceleration applied to the vehicle.

17. The turning control apparatus for a vehicle of claim 9 further comprising:

stability factor calculation means for calculating a stability factor of the vehicle according to said detected steering angle and said detected vehicle traveling speed, wherein said acceleration calculation means calculates target lateral acceleration of the vehicle according to said stability factor and calculates target longitudinal direction acceleration of the vehicle according to said calculated target lateral acceleration.

18. A turning control apparatus for a vehicle comprising:

torque control means for controlling a driving torque of a vehicle engine independent of manipulation by a vehicle driver;

a vehicle speed sensor for detecting traveling speed of the vehicle;

a steering angle sensor for detecting a steering angle of a vehicle steering wheel;

lateral acceleration detection means for detecting actual lateral acceleration applied to the vehicle during turning of the vehicle;

lateral acceleration calculation means for setting a target lateral acceleration of the vehicle as a lateral acceleration, estimated as traveling on a road having a predetermined friction coefficient according to said steering angle detected by said steering angle sensor and said vehicle speed detected by said vehicle speed sensor;

friction coefficient estimation means for estimating a friction coefficient of a road surface by comparing said target lateral acceleration set by said lateral acceleration calculation means and the actual lateral acceleration detected by said lateral acceleration detection means;

a plurality of graphs indicating a relationship between target lateral acceleration set by said lateral acceleration calculation means and a target driving torque relative to the friction coefficient of the road surface;

a torque calculation unit for selecting one of said plurality of graphs corresponding to the friction coefficient estimated by said friction coefficient estimation means and for converting said target lateral acceleration set by said lateral acceleration calculation means to a target driving torque according to said selected one of a plurality of graphs using solely said target lateral acceleration set by said lateral acceleration calculation means as a lateral acceleration of the vehicle only upon detecting a steering angle by said steering angle sensor; and an electronic control unit for controlling operation of said torque control means so that the driving torque of the vehicle engine is equal to the target driving torque set by said torque calculation unit.

19. A method of turning control for a vehicle comprising the steps of:

(a) detecting a steering angle of a vehicle steering wheel;

(b) detecting a traveling speed of the vehicle;

(c) setting a target lateral acceleration of the vehicle as a lateral acceleration, estimated as traveling on a road having a predetermined friction coefficient according to the steering angle and the vehicle speed detected respectively in steps (a) and (b);

(d) converting said target lateral acceleration set in step (c) to a target driving torque of a vehicle engine using solely said target lateral acceleration as a lateral acceleration of the vehicle according to a preset relation only upon detecting a steering angle in step (a); and (e) controlling a driving torque of the vehicle engine equal to said target driving torque set in step (d).

20. The turning control method of claim 19 wherein the reduction of the driving torque of the vehicle engine is limited to a value below a predetermined variance from the previous driving torque.

21. The turning control method of claim 19 wherein reduction of the driving torque does not occur when the detected traveling speed is less than a predetermined value.

22. The turning control method of claim 19 wherein reduction of the driving torque of the vehicle engine does not occur when the calculated target lateral acceleration is greater than a predetermined value.

23. The turning control method of claim 19 further comprising the step of:
(f) detecting lateral acceleration applied to the vehicle, wherein the target driving torque of the vehicle is set according solely to the actual lateral acceleration as a lateral acceleration of the vehicle in place of the target lateral acceleration only upon failure to detect a steering angle in step (a), and the target driving torque of the vehicle is alternatively set according solely to the target lateral acceleration as a lateral acceleration of the vehicle only upon detecting a steering angle in step (a).

24. The turning control method of claim 19 further comprising the steps of:
(f) detecting right and left wheel speeds;
(g) determining a neutral steering angle according to said detected right and left wheel speeds and said detected steering angle; and
(h) detecting actual lateral acceleration applied to the vehicle, wherein the target driving torque of the vehicle is set according to the actual lateral acceleration detected until the neutral steering angle is determined, and the target driving torque of the vehicle is set according to the target lateral acceleration after the neutral steering angle is determined.

25. The turning control method of claim 24 further comprising the step of:
(i) interrupting the determining of the neutral steering angle while the driving torque is being reduced, after determining the neutral steering angle.

26. The turning control method of claim 19 further comprising the steps of:
(f) detecting a slip condition of right and left driving wheels of the vehicle; and
(g) calculating a slip prevention target driving torque of the vehicle engine for slip prevention according to the detected slip condition, wherein driving torque of the vehicle engine is equal to any one of the set target driving torque, according to target lateral acceleration, and the set slip prevention target driving torque.

27. A method of turning control for a vehicle comprising the steps of:
(a) detecting a steering angle of a vehicle steering wheel;
(b) detecting traveling speed of the vehicle;
(c) setting a target lateral acceleration of the vehicle as a lateral acceleration, estimated as traveling on a road having a predetermined friction coefficient according to said steering angle and said vehicle traveling speed detected respectively in steps (a) and (b);
(d) converting said target lateral acceleration set in step (c) to a target longitudinal direction acceleration of the vehicle according to a preset relation using solely said target lateral acceleration as a lateral acceleration of the vehicle only upon detecting a steering angle in step (a);
(e) setting a target driving torque of a vehicle engine according to said target longitudinal direction acceleration converted in step (d); and
(f) controlling driving torque of the vehicle engine equal to said target driving torque set in step (e).

28. The turning control method of claim 27 wherein target lateral acceleration GYO is calculated by the following equation:

$$G_{YO} = \frac{\delta}{l \cdot \left(A + \frac{1}{V^2}\right)}$$

wherein l is a wheel base of the vehicle, A is a stability factor, V is the detected vehicle traveling speed, and δ is the detected steering angle.

29. The turning control method of claim 27 wherein target driving torque is set lower as the set target lateral acceleration increases.

30. The turning control method of claim 27 wherein target driving torque is set lower as detected vehicle speed increases.

31. The turning control method of claim 27 wherein said target driving torque is set according to the calculated target longitudinal direction acceleration and a road-load torque.

32. The turning control method of claim 31 wherein the road-load torque includes a rolling drag component and a cornering drag component of the vehicle.

33. The turning control method of claim 32 wherein the cornering drag component varies with actual lateral acceleration of the vehicle.

34. The turning control method of claim 27 wherein the target driving torque is set according to a deviation between the calculated target longitudinal direction acceleration and an actual longitudinal direction acceleration applied to the vehicle.

35. The turning control method of claim 27 further comprising the step of:
(g) calculating a stability factor of the vehicle according to said detected steering angle and said detected vehicle speed, wherein the target lateral acceleration of the vehicle is calculated according to the stability factor and the target longitudinal direction acceleration of the vehicle is calculated according to the calculated target lateral acceleration.

36. A method of turning control for a vehicle comprising the steps of:
(a) detecting a steering angle of a vehicle steering wheel;
(b) detecting traveling speed of the vehicle;
(c) detecting actual lateral acceleration applied to the vehicle during turning of the vehicle;
(d) setting a target lateral acceleration of the vehicle as a lateral acceleration, estimated as traveling on a road having a predetermined friction coefficient according to said steering angle and said vehicle speed detected respectively in steps (a) and (b);
(e) estimating a friction coefficient of a road surface by comparing the target lateral acceleration set in step (d) with said actual lateral acceleration detected in step (c);
(f) storing a plurality of relations between target lateral acceleration set in step (d) and target driving torque of a vehicle engine relative to the friction coefficient of the road surface;
(g) selecting one of the stored plurality of relations between said target lateral acceleration and said target driving torque of the vehicle engine stored in step (f) corresponding to the friction coefficient of the road surface estimated in step (e);
(h) converting said target lateral acceleration set in step (d) to a target driving torque of the vehicle engine according to the relation selected in step (g) using solely said target lateral acceleration set in step (d) as a lateral acceleration of the vehicle; and
(i) controlling a driving torque of the vehicle engine to said target driving torque set in step (h).

* * * * *